United States Patent [19]
Kocis et al.

[11] Patent Number: 5,485,614
[45] Date of Patent: Jan. 16, 1996

[54] COMPUTER WITH POINTING DEVICE MAPPED INTO KEYBOARD

[75] Inventors: Thomas J. Kocis; Philip D. Chidester, both of Austin, Tex.

[73] Assignee: Dell USA, L.P., Austin, Tex.

[21] Appl. No.: 278,690

[22] Filed: Jul. 21, 1994

Related U.S. Application Data

[63] Continuation of Ser. No. 813,379, Dec. 23, 1991, abandoned.

[51] Int. Cl.$^6$ ....................................... H01H 13/70
[52] U.S. Cl. ..................... 361/680; 395/500; 395/893; 345/145; 345/168; 341/22
[58] Field of Search ........................ 395/275, 375, 395/500, 800; 361/680; 345/145, 157, 163, 168

[56] References Cited

U.S. PATENT DOCUMENTS

| | | | |
|---|---|---|---|
| 4,680,577 | 7/1987 | Straayer et al. | 345/160 |
| 4,786,894 | 11/1988 | Furusawa et al. | 345/160 |
| 4,903,222 | 2/1990 | Carter et al. | 364/708 |
| 4,931,781 | 6/1990 | Miyakawa | 345/160 |
| 4,974,183 | 11/1990 | Miller | 364/709.12 |
| 5,041,819 | 8/1991 | Takeda | 345/160 |
| 5,124,689 | 6/1992 | Franz et al. | 345/172 |
| 5,189,403 | 2/1993 | Franz et al. | 345/172 |
| 5,198,802 | 3/1993 | Bertram et al. | 345/146 |
| 5,245,321 | 9/1993 | Franz et al. | 340/711 |

OTHER PUBLICATIONS

PC Magazine, Mar. 27, 1990.
WordPerfect 5.0 Manual, p. 104.

*Primary Examiner*—Kevin J. Teska
*Assistant Examiner*—Dan Fiul
*Attorney, Agent, or Firm*—Gary Stanford; Jeff Hood; James Huffman

[57] ABSTRACT

A small computer architecture in which the CPU can receive multiple kinds of interrupt signals, including one kind which is assigned to indicate the occurrence of a keystroke input and another kind which is assigned to indicate the occurrence of a pointing device input. However, the computer does not include any pointing device as such. Instead, the keyboard microprocessor (i.e. a microprocessor other than the CPU) monitors user keystrokes to the computer's keyboard, and: in response to simple keystrokes, or keystroke combinations which include one of the basic chording keys, the keyboard microprocessor sends a keystroke interrupt to the CPU; and in response to keystroke combinations which include an additional chording key, the keyboard microprocessor sends a pointing-device interrupt to the CPU, and provides a data output corresponding to an emulated pointing-device movement.

20 Claims, 72 Drawing Sheets

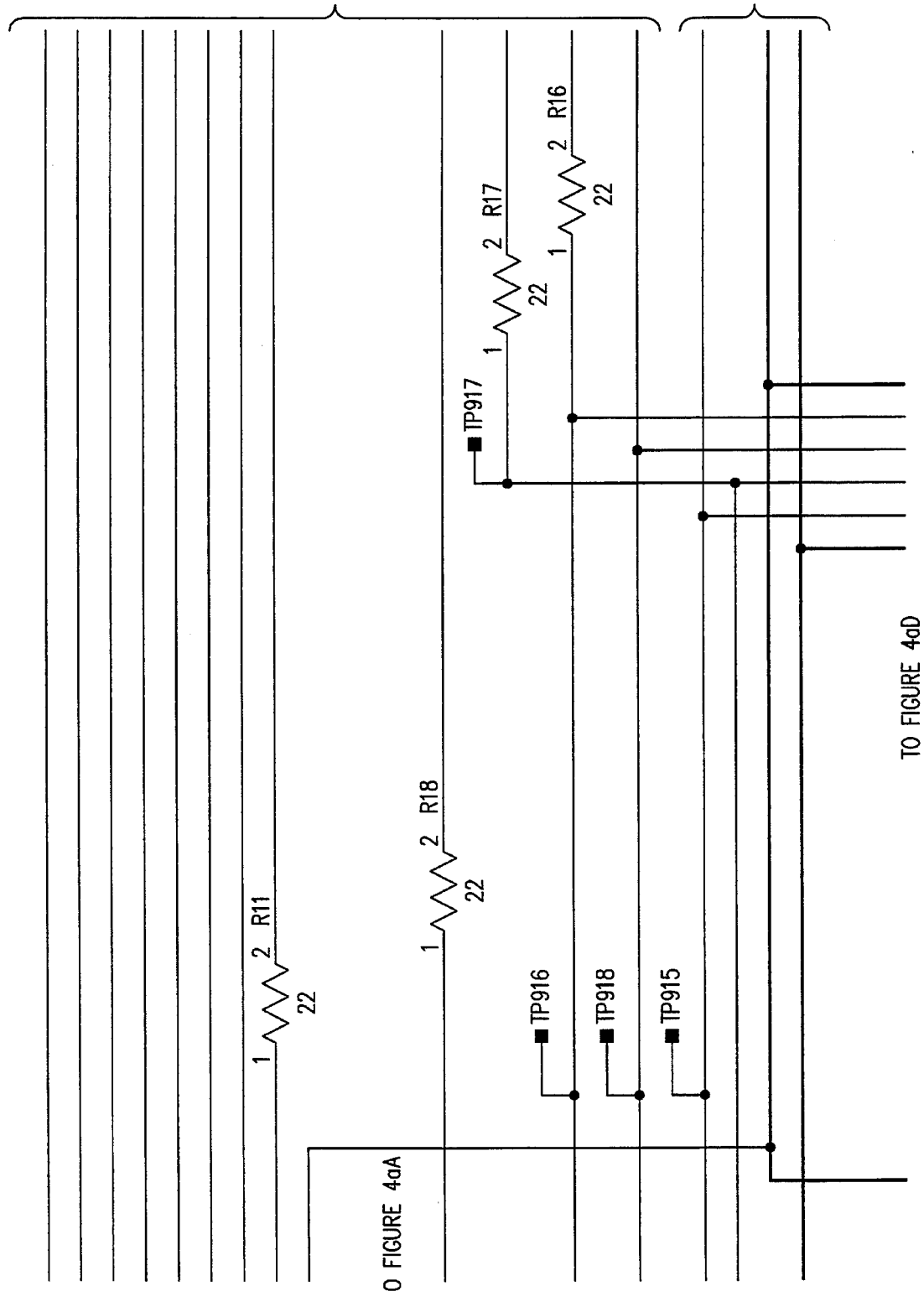

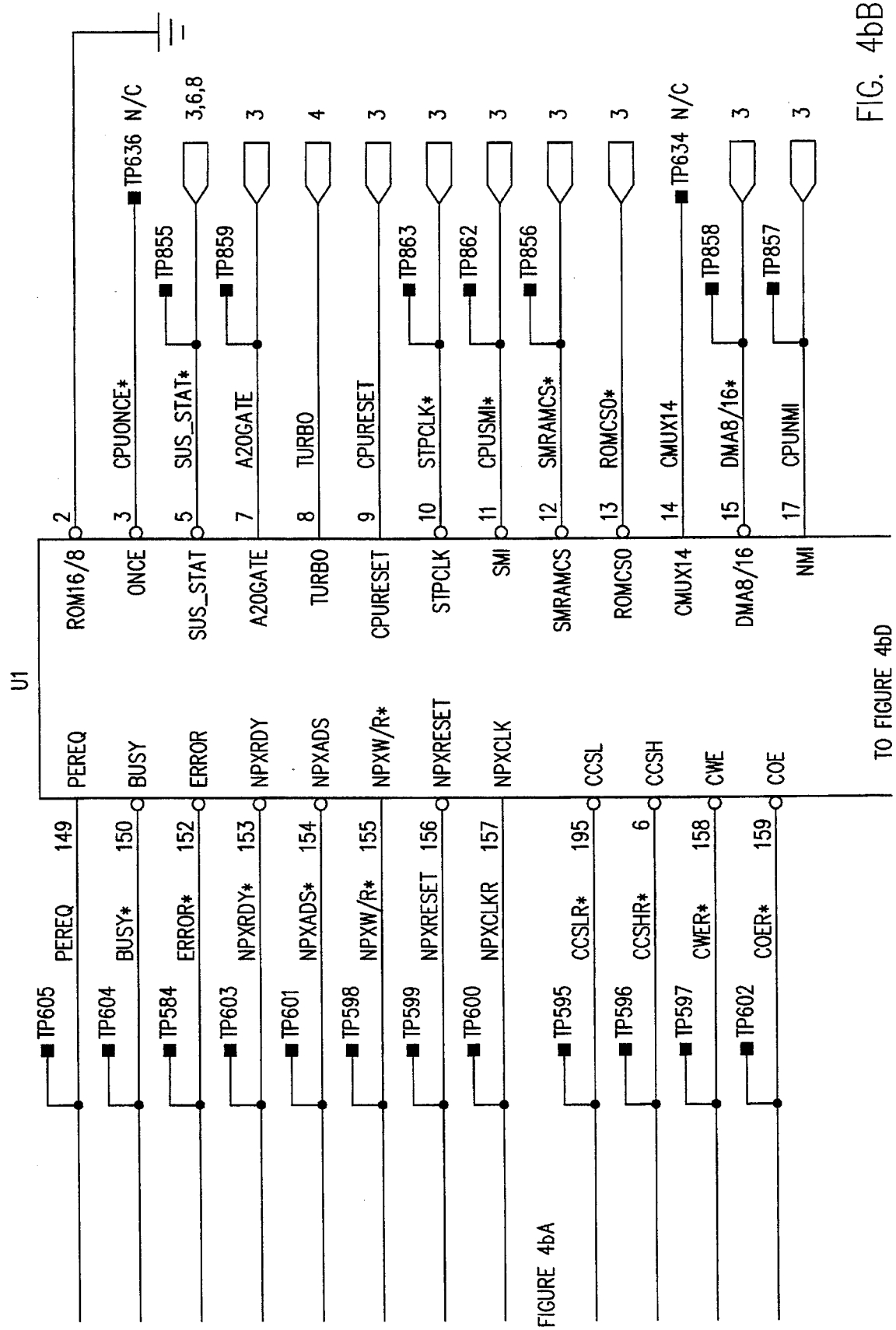

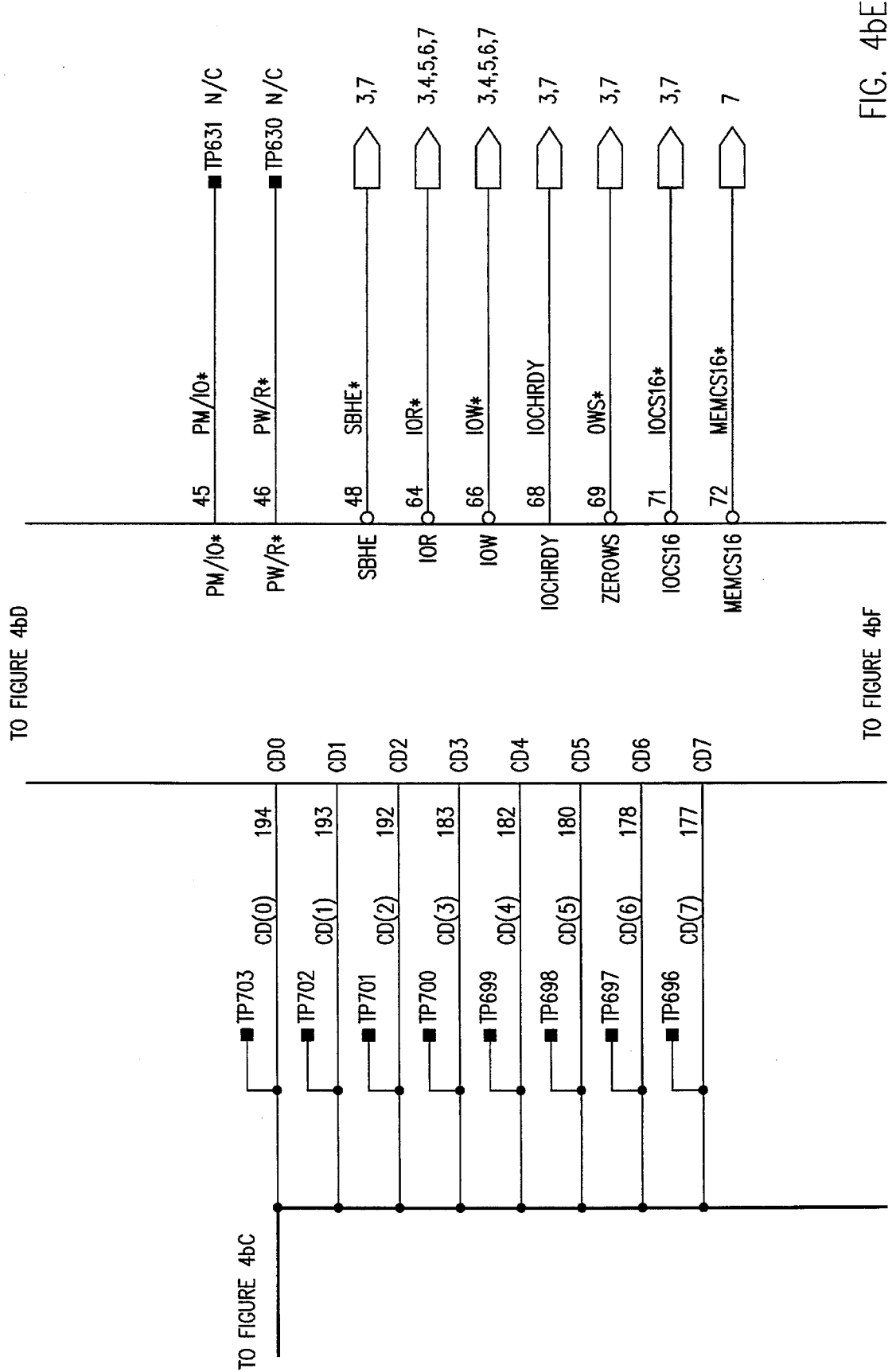

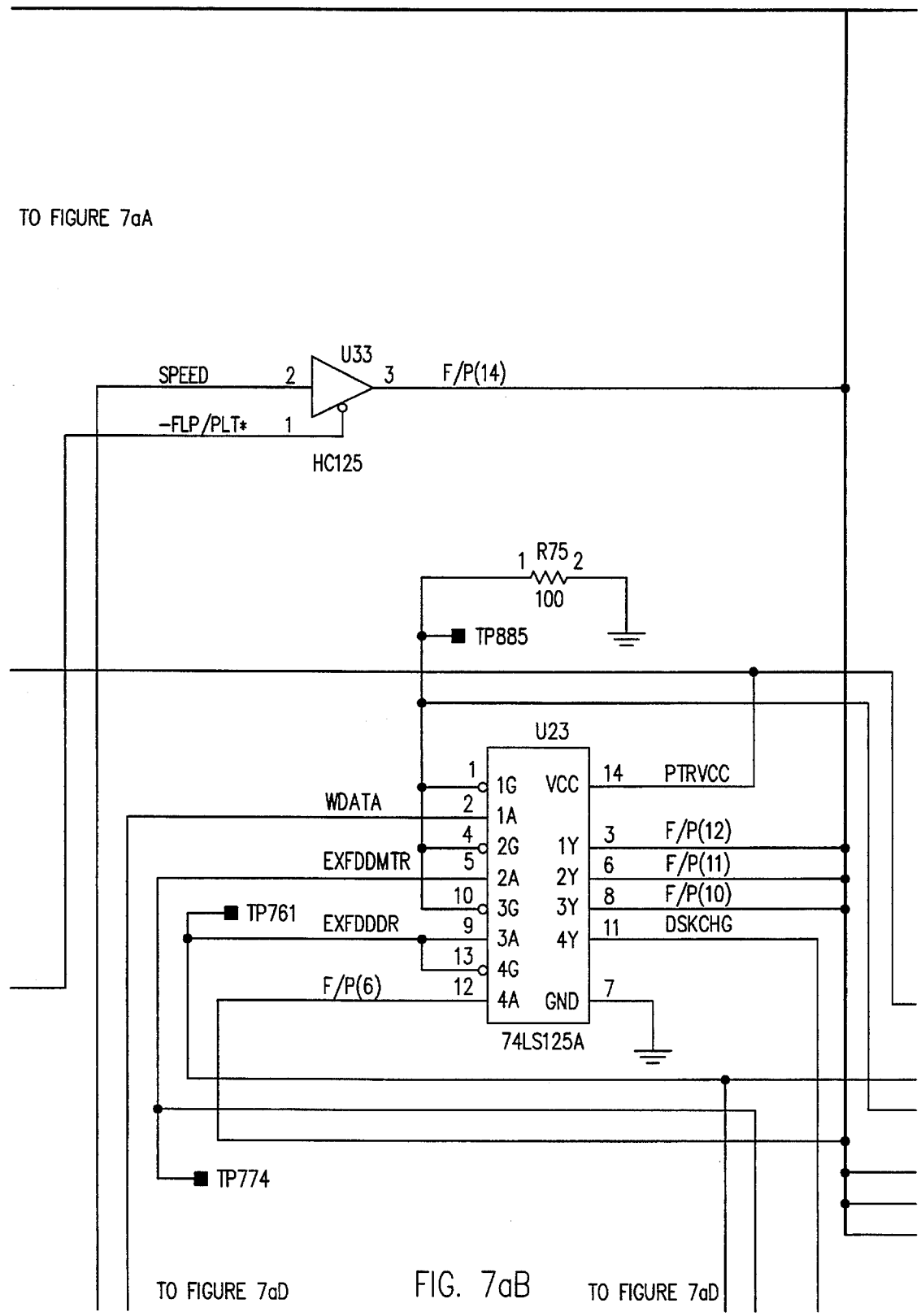

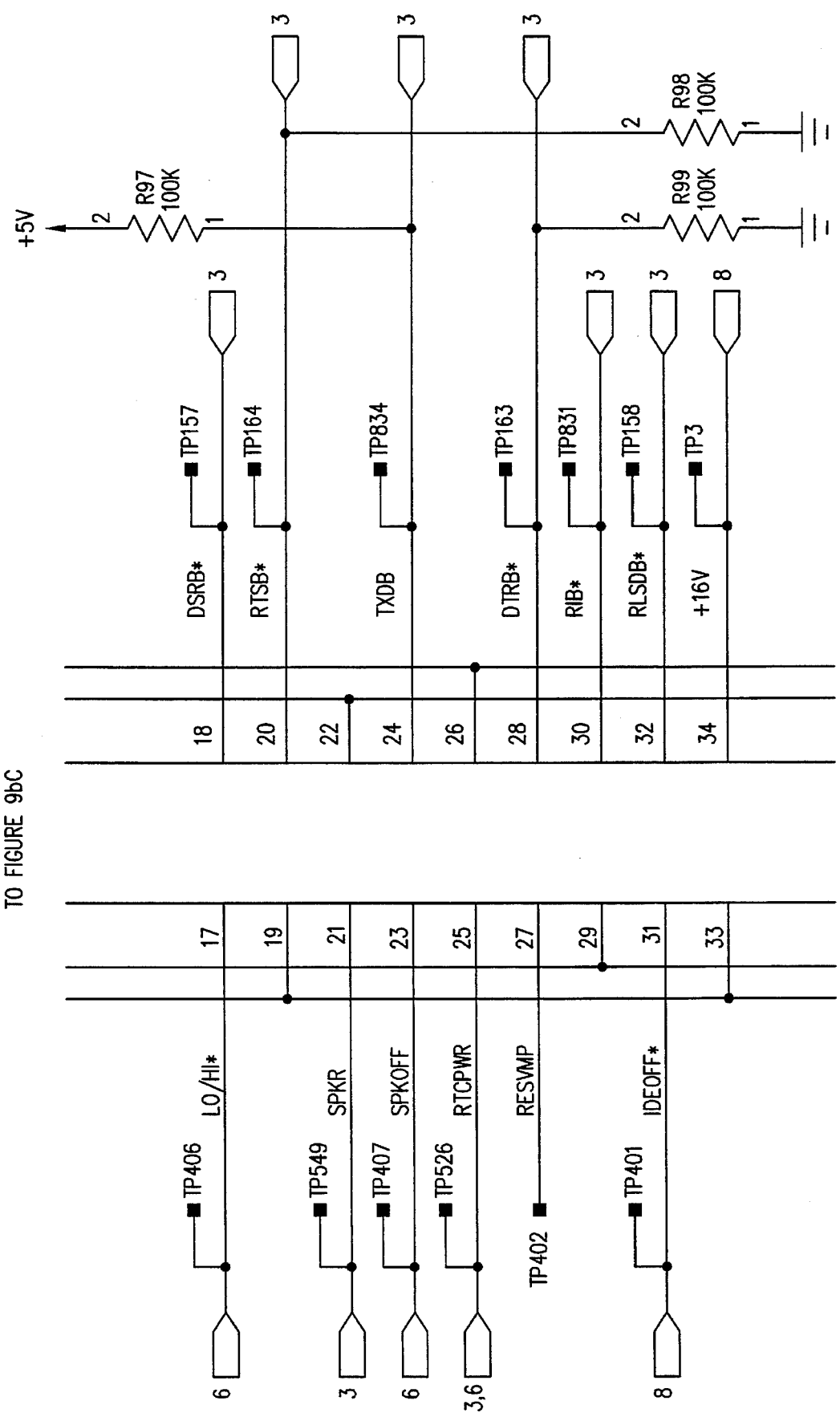

COMPUTER WITH POINTING DEVICE MAPPED INTO KEYBOARD

This is a continuation of application Ser. No. 07/813,379 filed on Dec. 23, 1991 now abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO OTHER APPLICATIONS

The following applications of common assignee contain at least some drawings in common with the present application, and are believed to have effective filing dates identical with that of the present application, and are all hereby incorporated by reference:

Ser. No. 07/813,380, filed Dec. 23, 1991, entitled "Computer with Transparent Power-Saving Manipulation of CPU Clock" (DC-264) now U.S. Pat. No. 5,369,771; and Ser. No. 07/814,390, filed Dec. 23, 1991, entitled "Computer with Three-Processor Power-Management Architecture" (DC-265) now abandoned;

both of which are hereby incorporated by reference.

BACKGROUND AND SUMMARY OF THE INVENTION

The present invention relates to computer systems (particularly small computer systems), and to methods for using them.

The innovations disclosed in the present application provide computer systems (especially very small portable personal computers) which have advantageous new capabilities. To better explain the significance and advantages of these innovations, the following paragraphs will review some technological context. This technological context is not necessarily prior art, but is intended to help in pointing out the disclosed inventions.

Handling Keyboard Inputs

One of the basic choices in an interactive computer architecture is how to detect and respond to user inputs on the computer.

Evolution of the Industry-Standard Architecture

In the original IBM PC, the keyboard was located in a separate housing from the system chassis, and was connected to the chassis by a cable with a standard interface definition (which was changed in the transition from XT to AT). The keyboard housing was powered, through its cable, from the system chassis. The keyboard housing included a separate microprocessor which was used to constantly monitor user keystrokes, and this processor relayed keystroke events to the CPU microprocessor through an interrupt-driven architecture. See generally Norton, "Inside the PC Keyboard," PC WORLD vol.1 no.4 pp.190–197 (1983), which is hereby incorporated by reference; Mefford, "An in-depth exploration of the PC keyboard and its interrupt service routines," MICROSOFT SYSTEMS JOURNAL vol.5 no.3 (May 1990) at pp.22ff, which is hereby incorporated by reference.

In this architecture, the keyboard microprocessor (which in fact is normally a microcontroller) monitors the individual keyswitches (essentially constantly) to detect any changes of state (i.e. whenever the user presses or releases any key). Whenever a keystroke is detected, the keyboard microprocessor sends a high-priority interrupt to the CPU.[1] When the CPU services this interrupt, it gets the key event code from the keyboard microcontroller, translates it to determine appropriate character and/or status codes, and loads this information into a software buffer. The application software can then read this software buffer, in due course, as needed.[2]

[1] This is INT9H.
[2] This can be done by a software interrupt (INT16H), or by a direct read to the address of the area reserved for the keyboard buffer.

This architecture has generally been retained through numerous stages of evolution of the industry-standard architecture (ISA).

In the industry-standard architecture, the keyboard microprocessor has generally been an Intel 8048, but several related chips have also been used.[3]

[3] See generally Levine, "Keyboard Mfrs. Scramble for Microcontrollers," ELECTRONIC NEWS vol.30 no.1482 p.50 (Jan. 30, 1984), which is hereby incorporated by reference. Other chips used have included the 8748 (which includes EPROM), the 8031 (ROM-less), the 8051 (mask-programmed), and the 8042 (the original keyboard controller whose interface is emulated by the more recent chips).

Recent Changes

The most significant departures from this keyboard interface architecture have occurred very recently. In laptop and smaller computers, the keyboard is often integrated into the same chassis as the CPU. Moreover, the low-power needs of such computers have forced reconsideration of all architectural blocks, including the keyboard architecture.

Thus, more recent hardware architectures have begun to handle keystroke inputs in a slightly different way. If the keyboard microprocessor is located in the system chassis, then the simple keystroke-monitoring functions can be combined with other functions too.

For example, the new Intel SL chipset[4] expects to use an 8051SL keyboard controller. This keyboard controller provides power-monitoring functions in addition to the basic keystroke-monitoring functions.

[4] See generally Wilson, "Intel wades into palmtop fray with 386 SL," Computer Design vol.29 no.21 pp.36ff (Nov. 1, 1990), which is hereby incorporated by reference; Martin, "Intel sampling 'notebook' microprocessor set," EDN vol.35 no.21A pp.3ff (Oct. 18, 1990), which is hereby incorporated by reference. See also the Intel datasheets for the 386SL, 82360SL (combination peripheral-control and power-management subsystem chip), 8051SL (keyboard controller), and 82760SL (graphics controller), all of which are available from Intel and are hereby incorporated by reference. Many of these chips contain their own power-conservation features; for example, the 8051SL puts itself to sleep if the keyboard has not been touched for a certain length of time. See also the Intel datasheets for the 82347 (power management chip), 82341 (peripheral control), and 82343 and 82344 (AT interface chipset), which are all also hereby incorporated by reference.

Pointing Devices

For any graphical user interface, a simple keyboard is an inadequate channel for user input: a user also needs some very rapid way to select a point from the two-dimensional display space.

A variety of pointing devices have been used in computer interfaces, including mice, touchpads, trackballs, joysticks, light pens, and touch-sensitive screens. All of these devices work well on the desktop where power and space are not major concerns. They do not work as well when used with a portable computer.

There are two categories of solutions for providing a pointing device in a portable computer. One is integrating a pointing device in the system unit. The other is using a third party pointing device like a mouse or a trackball which clips onto the side of the unit. Both of these solutions add cost, power, size, and weight to the total system solution.

Startup Software (POST, Bootstrap, etc.)

A computer system normally includes a number of complex hardware components (chips and subsystems). When power is first applied to a computer (or when the user triggers a reset after the system has locked up), the various hardware elements (chips and subsystems) will each have their own internal procedures (reset procedures) to regain a stable and known state. However, at some point (if the hardware is intact), these reset procedures will have ended, and at this point the CPU performs various important overhead tasks[5] under software control. This phase of operation is generally referred to as "POST" (Power-On-Self-Test).

[5]These include, for example, surveying the system configuration, performing sanity checks on system hardware, issuing diagnostic signals (such as sounding beeps through a speaker or turning on LEDs), and permitting the user to branch into an NVRAM configuration program.

After POST, a "bootstrap" program is run, to permit the CPU to begin execution of other software. For robustness, the POST and bootstrap software is normally stored in a read-only memory. The bootstrap program launches the CPU on execution of the primary operating system software;[6] the primary operating system can then be used by the user to launch an application program, either manually or automatically.

[6]Depending on how the system has been set up, the boot software may direct program execution into DOS, Unix, OS/2, a DOS variant, or another operating system. This is normally automatic and predetermined, but is manually user-selectable in some systems. However, the choice of operating system is not particularly relevant to the inventions described in the present application.

Bootstrap Programs

Any computer system must have some way to begin program execution after a cold start. The hardware architecture of a microprocessor (or other CPU) will normally provide for a "reset" operation, which places all of the hardware circuits in a known electrical state; but it is still necessary to start the CPU on execution of a desired program. For example, in the very early days of computing, some computer systems would be manually configured to read in a "bootstrap loader" program at startup. This bootstrap program was a simple program which loaded in, and started execution of, another sequence of instructions, which were the beginning of the desired program. Bootstrap programs are often referred to simply as "boot" software.

To give a more recent example, the Intel 80×86 microprocessors, after a hardware reset, will always attempt to begin program execution from a specific memory address.[7] Thus, if a branch (or conditional branch) instruction is found at this address, the microprocessor will continue its program execution from whatever address is specified.

[7]That is, the microprocessor will read the contents of that memory location, and will attempt to execute the bits it finds there as a microprocessor instruction. The specific memory location used by the 80×86 family is xxxFFFF0h, i.e. 16 bits below the top of the memory space. Other microprocessors may use a different starting address, but similar principles apply.

Thus, this initial target address is the entry point for every session of use. This address is normally used to enter execution of programs which must be run every time the computer is used.

"Basic Input/Output System" Software (BIOS)

The "basic input/output system" (BIOS) software contains frequently-used routines for interfacing to key peripherals, for interrupt handling, and so forth.[8] For system robustness, the BIOS software itself is normally packaged in nonvolatile memory[9] with other key pieces of overhead software, such as POST,[10] boot, and configuration management routines,[11] as well as a pointer to launch the computer into the operating system software.[12] (Thus, the term "BIOS" is often used more broadly, to refer to this whole collection of basic system routines in ROM or EPROM.)

[8]Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," Byte, April 1989, pp. 303ff.
[9]However, in 1991 IBM introduced a PS/2 system in which the BIOS is at least partially stored on disk.
[10]The POST routines provide an extensive check for hardware integrity.
[11]Packaging the BIOS, POST and boot routines in ROM makes a very robust firmware system. Short of hardware damage, it is very difficult for a user to distort the system to the point where it will not start up and run (if the operating system software is present).
However, this system also provides a considerable degree of flexibility. As the operating system starts up (after the POST and boot routines), the user can remap address pointers to revector BIOS calls away from the standard BIOS routines, if desired. (It is also common for users to map out the entire BIOS contents into fast RAM, for greater speed.)
[12]Depending on how the system has been set up, the BIOS software may direct program execution into DOS, Unix, PS/2, a DOS variant, or another operating system. However, the choice of operating system is not particularly relevant to the inventions described in the present application.

In many types of modern personal computers (and in all "IBM-compatible" personal computers), a key part of the system software is a "basic input/output system" (BIOS) program.[13] The BIOS program contains frequently-used routines for interfacing to key peripherals,[14] for interrupt handling, and so forth.[15]

[13]See generally, e.g., P. Norton, THE PETER NORTON PROGRAMMER'S GUIDE TO THE IBM PC (1985), which is hereby incorporated by reference.
[14]The term "peripheral" or "peripheral component" normally refers to those components of a computer system which are not on the motherboard, i.e. which must be addressed through a system bus or over a defined port. However, the usage of this term is somewhat variable; sometimes it is used to refer to any I/O device, or only to refer to components which are optional add-ons.
[15]Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," Byte, April 1989, pp. 303ff.

For system robustness, the BIOS software is normally packaged in a read-only-memory. In fact, it is normally packaged together with the startup software mentioned above. Thus, nowadays the term "BIOS" is often used, somewhat more broadly, to refer to this whole collection of basic system routines.

Operating System Software

The application software will normally interface to an operating system (such as DOS, DOS+Windows, OS/2, UNIX of various flavors, or UNIX plus X-windows). The operating system is a background software program[16] which provides an application programming interface (API) for use by the application software. Thus, the programmers writing application software can write their software to fit the API, rather than having to find out and fit the peculiarities of each particular machine.[17]

[16] Some operating systems run continuously, or at least start up at regular intervals, even while an application program is running; other operating systems merely provide capabilities which can be called on by the application software.

[17] See, e.g., Quedens, "Windows virtual machine," *PC Tech Journal* vol.5, no. 10 pp.90, 92–93, 95, 97, 99–100, 102 (Oct. 1987), which is hereby incorporated by reference.

Device Driver Software

A device driver is a lower level of operating system software. Typically a device driver interfaces to the actual peripheral hardware components, and provides routines which application software can use to access the hardware components. Thus, the application software can simply make a call to an installed software subroutine, instead of having to find the specifications of each peripheral device and branch accordingly, whenever a peripheral I/O operation is needed. This permits application software to ignore the detailed specifications of peripheral hardware.

Normally device driver software must contain a description of each target hardware platform. Thus, the software must be revised repeatedly, for reasons which are beyond the control of the companies making peripherals.

In personal computers, installable device drivers were first introduced in DOS 2.0. The role of device drivers has since been expanded, in subsequently introduced operating systems.

In particular, OS/2 provided expanded support for device drivers, including a library of "DevHlp" routines which can be called by device drivers. See generally Duncan, "An examination of the DevHlp API (writing OS-2 bimodal device drivers)," 3 *Microsoft Systems Journal* no.2 (March 1988) at 39ff; Schmitt, "Designing drivers for OS/2: I," *PC Tech Journal* vol.5, no.12, p.164 (1987); and Schmitt, "Designing drivers for OS/2: II," *PC Tech Journal* vol.6, no.2 p.136–155 (Feb. 1988), all of which are hereby incorporated by reference.

Application Software

From a system designer's point of view, the application software is (subject only to the minimal constraints of the architectural standards) wholly unpredictable.[18] Common applications include spreadsheets, word processors and publishing programs, databases, games, project managers and a wide variety of others; but inevitably users will also run customized applications, and new types of applications.

[18] Many clever people are constantly looking for new ways to exploit the standard architecture, and many innovations continually result. Thus, hardware architects must expect that the application software will not only be unpredictable, but will be as unpredictable as possible.

Laptop and Smaller Computers

Portable personal computers were introduced in the early 1980s, and proved to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Some Difficulties of Small Size

To meet the weight, volume, and power budgets of small portable computers, much effort has been made to re-engineer familiar components, within the limits of acceptable compromise with user comfort and convenience, to attain the needed portability. For example, almost no laptop or notebook computers have had more than two disk drives (typically one floppy drive and one hard drive); the keyboards are much smaller than would be optimal for touch typists; and the displays are much smaller than on common desktop models.

Where such compromises are needed to attain the overriding goal of portability, users readily accept them. However, if these compromises can be avoided some of the time, it is highly desirable to do so. Thus, for example, many users will "dock" their laptop or notebook computers, when on their desktops, in order to use better peripherals (faster, larger, more heavy-duty, and/or easier to use) than could be carried with the portable computer.

Portable computers are inherently more susceptible than desktop computers to accident, loss, and theft. Thus, if critical work is being done on a portable computer, backup is even more of a necessity than with a desktop computer.

The quantities of mass storage available on portables have steadily increased, but the cost per byte of the necessary ruggedized drives continues to be far above that of that of the drives normally used. This disparity seems likely to continue. Similarly, although some small portables use non-volatile (or nonvolatized) solid-state memory to replace disk drives, the cost per byte of such memory is likely to continue to exceed that of conventional mass storage devices.

Laptops normally have a severely limited set of external ports. This limitation is imposed by several factors: first, each external connector takes up precious square inches of surface area. Second, each external connector is a point of vulnerability to electrostatic-discharge-induced component failure. Third, each external connector is a possible point of entry for dirt and moisture. Fourth, in calculating the worst-case power budget for a system, the possible power required by all connectors must be considered.

Similar problems arise from the need for bus extension. Internal space is not available for expansion cards, as in a normal personal computer; but needs for expansion still exist. Some small computers have brought out key bus lines into an external connector, but of course this is unwieldy. Other small computers have sent signals out over a port to an independently-powered extension bus controller with bus slots which would emulate the computer's internal bus.

Continuing Advantages of Stationary Personal Computers

The capabilities and cost of both stationary and portable computers have rapidly improved over the years. However, it is likely that stationary personal computers will always have some advantages over lightweight portables: it has always been true that, for a given price, stationary computers have always had more computing horsepower, larger mass storage, better displays, and better user interfaces (including keyboard, mouse, joystick and/or track ball input devices). These advantages are due to the necessary constraints (of weight, volume, power budget, and shock-resistance, and environmental resistance) which necessarily must be met by a small portable computer, and need not be met by a stationary personal computer.

Use of Both a Portable and a Stationary Computer

As small portable computers become ever more common, an increasing number of users prefer to use two computers: one for their desktop, and one more for the road. This increasingly common pattern of usage is very convenient for users, but also generates some problems.

One problem which arises is loss of file coherency: when a user edits a file on his secondary machine, he must transfer that file back to his primary machine before he again edits the same file on the primary machine.

"Docking" a Portable Computer

Users find it very convenient to "dock" a portable computer on their desktop, to a full-size keyboard and/or display. When a portable computer is used in such a configuration, users will also wish to use many of the peripherals (such as printer, modem, fax machine, tape backup devices, or additional disk drives) which are easily available with a desktop computer.

This problem becomes more urgent as useful amounts of computing power become more available in physically small portable computers.

Thus, in general, as convenient as small portable computers are, there is some difficulty getting data into and out of them. Usually the only available data routes are through a modem or through the floppy drive.[19] This has been recognized as a problem, and many vendors have offered external drive connections for small portable computers.

[19]Some portable computers have LAN interface cards, but this is an expensive option, and requires a compatible LAN to interface to.

Innovative Computer System and Method

The disclosed inventions provide a portable-computer-plus-pointing-device solution that adds little or no additional cost, power consumption, size, or weight. The invention can be added to most portable computer systems by making only two alterations to the system design: 1) Additions must be made to the keyboard controller microcode, and 2) A pointing device interrupt output must be added to the Keyboard controller. Optionally, a key may be added to the keyboard to select pointing device mode.

In the presently preferred embodiment, a suitable additional key is available for other reasons. In this computer the keypad numeric keys[20] are overlaid onto certain of the standard alphabetic keys. That is, as may be seen from the layout of FIG. 1, when the [Fn] key is pressed, pressing the J key will output a "1". Similarly, pressing [Fn]-K will output "2", etc.

[20]Most standard computer keyboards include not only a full typewriter-style keyboard, but also a ten-key keypad to the right of the typewriter-style keyboard. This keypad permits rapid one-hand entry of numbers.

The presently preferred embodiment provides a small computer architecture in which the CPU can receive multiple kinds of interrupt signals, including one kind which is assigned to indicate the occurrence of a keystroke input and another kind which is assigned to indicate the occurrence of a pointing device input. However, the computer does not include any pointing device as such. Instead, the keyboard microprocessor (i.e. a microprocessor other than the CPU) monitors user keystrokes to the computer's keyboard, and: in response to keystroke combinations which include the special function key (e.g., the [Fn] key) and a pointer key (e.g., an arrow key), the microprocessor sends a pointing device interrupt to the CPU, and provides data output corresponding to an emulated pointing device movement; and in response to simple keystrokes or keystroke combinations other than those described in the preceding paragraph, the microprocessor sends a keystroke interrupt to the CPU.

A substantial advantage of this architecture is that the pointing-device emulation can be made completely invisible to the application software. In many cases the user will not even have to install a device driver,[21] and in any case will not have to install a non-standard device driver.[22]

[21]In the presently preferred embodiment, the keyboard pointing inputs are translated to emulate a PS/2 mouse. This is a highly standard interface, recognized by most applications. See the IBM Technical Reference Manuals for the PS/2 Models 50, 70, and 80, which are all hereby incorporated by reference.

[22]For example, if the keyboard pointing device is configured to emulate a serial mouse which requires a device driver, then of course a device driver will be required for the keyboard pointing device operation too.

A further feature of the presently preferred embodiment is that one of the simple key combinations toggles the keyboard into (or out of) pointing-device-emulation mode.

A further feature of the presently preferred embodiment is that if the user prefers, he can disable the pointing-device emulation (either sometimes or always), in favor of an external pointing device. Thus, for example, users can use an ergonomically optimal mouse (or trackball, or joystick) on their home desk, while still retaining convenient usage of GUI software on the road.

The system of the presently preferred embodiment also includes a standard dedicated mouse port, and inputs to this port are handled by the same 8051SL chip which handles keyboard inputs. Thus, it is actually possible, in the presently preferred embodiment, for the user to provide mouse inputs both through the keyboard emulation and also through a mouse plugged into the mouse port. (However, in alternative embodiments such dual-mouse operation can of course be precluded.)

Many graphics-intensive software applications can be greatly accelerated by occasional use of character input. Thus, in many graphics-intensive environments, the user should ideally be able to switch rapidly back and forth between keyboard inputs and pointing-device inputs. However, this is not possible with the conventional external pointing devices: for example, with a conventional mouse, the user loses his keyboard position when he grabs for the mouse. Even with configurations which include a tiny trackball (or "inverted mouse") on the keyboard, a hand shift is typically necessary (or desirable) between trackball use and touch typing. However, the disclosed innovations enable a computer system in which no hand shift is necessary between touch-typing position and the pointing-device-input position. For some users this will be a significant ergonomic advantage.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 11:
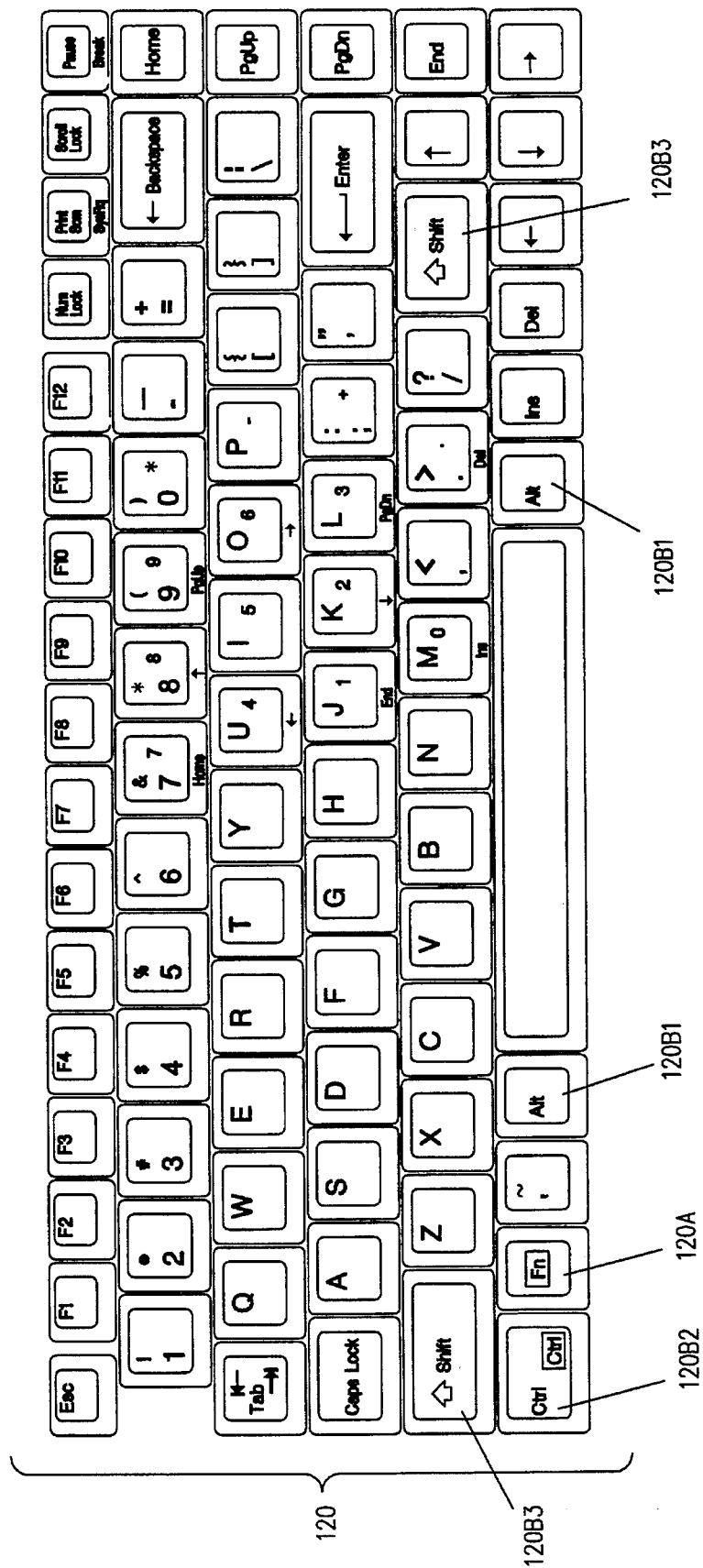
FIG. 11 shows the keyboard layout used in the presently preferred embodiment.

FIG. 11 shows the keyboard layout of the presently preferred embodiment. Of course, other specific keyboard layouts can be used instead, and this specific layout, while illustrative of the presently preferred best mode, does not limit any of the claimed inventions.

Note that, in addition to the [Control], [Alt], and [Shift] keys, this keyboard also contains a fourth overlay key, the [Fn] key. The [Fn] key too can be used in chording combinations, but it is used in a different way than the [Control], [Alt], and [Shift] keys.

Note further that, as used herein, the terms "chording key," "special function key," and "pointer key" have special meanings. "Chording key" refers to the [Control], [Alt], or [Shift] keys which are usually pressed in combination with other keys to enable the latter keys to be used for multiple functions. The term "chording" derives its meaning from its usage in music where it refers to multiple tones sounded together in harmony to produce a certain effect. A "special function key" is a key such as the [Fn] key. A "pointer key" is a key such as (1) an arrow key which may be used to emulate directional movement of a pointing-device (e.g., a mouse), or (2) any other key which may be used to emulate a pointing-device button. Because the pointer key may often be used for other functions also, it is used to emulate mouse functions only while the special function key is also pressed.

A sample specific embodiment of this invention is implemented as follows, in a notebook computer with the keyboard shown in FIG. 1. The keyboard operates in two modes: keyboard mode and pointing device mode. It may operate in both modes at once. Keyboard mode operates identically to the way it works on the current Apollo system. When operating in pointing device mode, the keyboard emulates a standard pointing device. The operating system and application software are not aware that a standard pointing device is not present. The keyboard controller communicates with standard pointing device protocol and interrupt level.

Pointing device mode is selected when the operator depresses the [Fn] key, simultaneously with the one or a combination of the six pointer keys. The six pointer keys could be [~], [Alt], [up-arrow], [down-arrow], [left-arrow], and [right-arrow]. These keys were selected for the Apollo keyboard because they are located such that using them in combination would be both intuitive and easy. Other combinations could be selected if the design of the keyboard prevented these combinations from working, or if other selections were more desirable. The key or key-combinations would have the effects shown in the following table.

| Keyboard Key Combination | Pointing Device Operation Emulated |
| --- | --- |
| [Fn]-[~] | button 1 |
| [Fn]-[Alt] | button 2 |
| [Fn]-[CapsLock] | lock/unlock pointing device mode: When pointing device mode is locked, the [Fn] does not need to be depressed as part of the combination |
| [Fn]-[up-arrow] | move pointer up |
| [Fn]-[down-arrow] | move pointer down |
| [Fn]-[left-arrow] | move pointer left |
| [Fn]-[right-arrow] | move pointer right |
| [Fn]-[up-arrow]-[right-arrow] | move pointer diagonal to top right |
| [Fn]-[up-arrow]-[left-arrow] | move pointer diagonal to top left |
| [Fn]-[down-arrow]-[right-arrow] | move pointer diagonal to bottom right |
| [Fn]-[down-arrow]-[left-arrow] | move pointer diagonal to bottom left |
| [Fn]-[~]-[up-arrow] | button 1 and move pointer up |
| [Fn]-[~]-[down-arrow] | button 1 and move pointer down |
| [Fn]-[~]-[left-arrow] | button 1 and move pointer left |
| [Fn]-[~]-[right-arrow] | button 1 and move pointer right |
| [Fn]-[~]-[up-arrow]-[right-arrow] | button 1 and move pointer diagonal to top right |
| [Fn]-[~]-[up-arrow]-[left-arrow] | button 1 and move pointer diagonal to top left |
| [Fn]-[~]-[down-arrow]-[right-arrow] | button 1 and move pointer diagonal to bottom right |
| [Fn]-[~]-[down-arrow]-[left-arrow] | button 1 and move pointer diagonal to bottom left |
| [Fn]-[Alt]-[down-arrow] | button 2 and move pointer up |
| [Fn]-[Alt]-[down-arrow] | button 2 and move pointer down |
| [Fn]-[Alt]-[left-arrow] | button 2 and move pointer left |
| [Fn]-[Alt]-[right-arrow] | button 2 and move pointer right |
| [Fn]-[Alt]-[up-arrow]-[right-arrow] | button 2 and move pointer diagonal to top right |
| [Fn]-[Alt]-[up-arrow]-[left-arrow] | button 2 and move pointer diagonal to top left |
| [Fn]-[Alt]-[down-arrow]-[right-arrow] | button 2 and move pointer diagonal to bottom right |
| [Fn]-[Alt]-[down-arrow]-[left-arrow] | button 2 and move pointer diagonal to bottom left |

Figure 1:
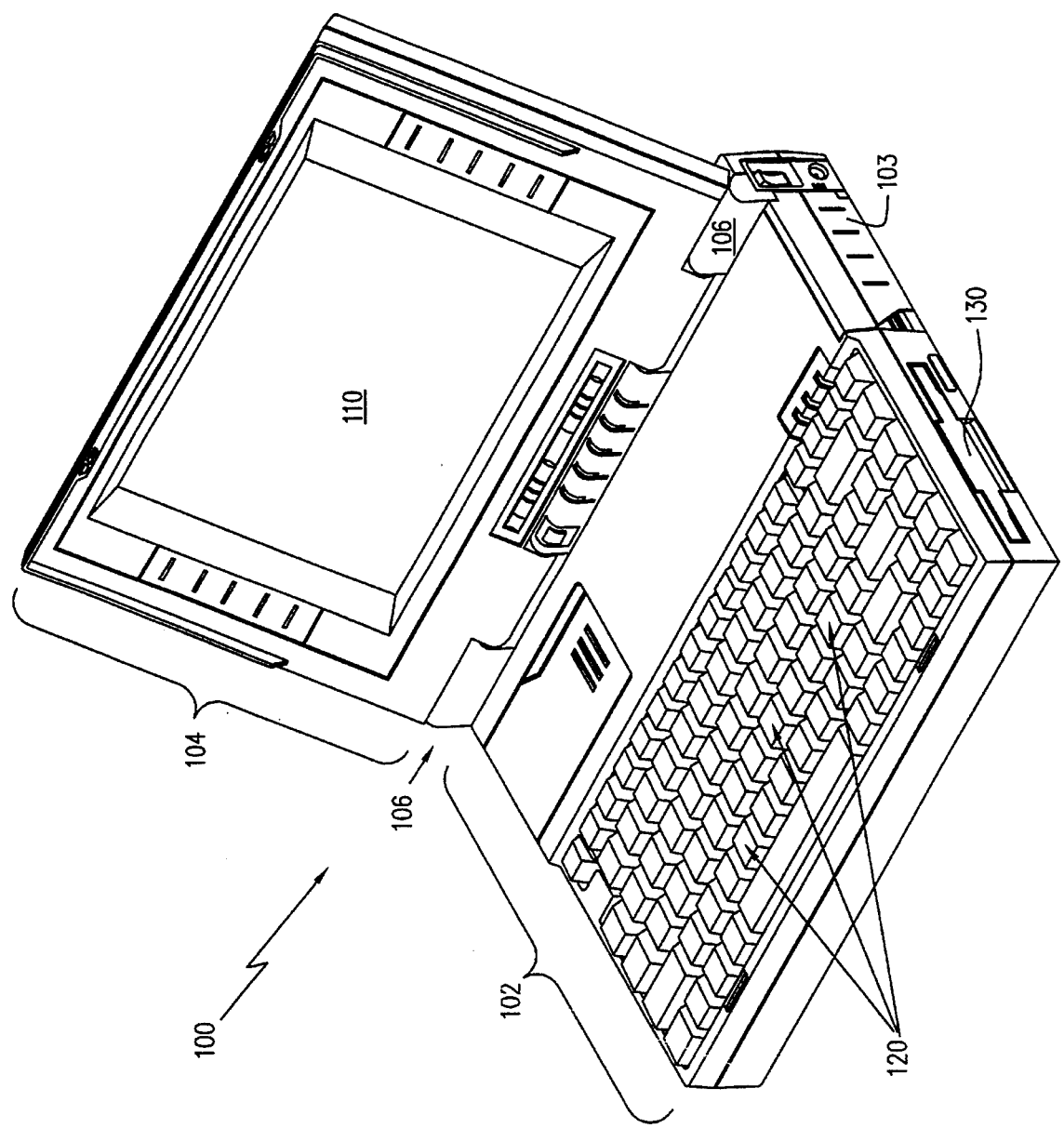
FIG. 1 shows a perspective view of the notebook computer 100 of the presently preferred embodiment in the open position.

These particular emulation assignments are adapted to the geometry of the keyboard shown in FIG. 1. However, other emulation assignments can be used. In particular, if a keyboard with a different layout is used, it may be preferable to adjust some of the emulation assignments accordingly. A significant criterion for a pointing device is that the user should be able to move the cursor position at will while looking only at the screen, and not at the pointing device.

If another key is struck while a pointing device combination is also depressed, the keyboard controller will respond with both the normal keyboard key and the pointing device operation. This may not be possible in some circumstances due to the design of the keyboard. It is thought that the occurrences of such events will be very infrequent in practice. When such an event occurs the operator will have the option of locking the pointing device mode. This will reduce the number of keys which have to be depressed at one time, and increase the likelihood that the desired operation will be recognized.

Typeamatic operation works with the combinations as well. For instance, pressing and holding the combination, [Fn]-[up-arrow] would cause the pointer to continue to move upward at a rate proportional to the typeamatic rate.

Hardware Implementation Details

Following is a sample specific implementation of hardware portions of the disclosed innovations. This example is intended to better illustrate the disclosed generally applicable innovations, and to comply with the best-mode requirements of US patent law; but of course this specific implementation is subject to change (and will certainly be changed as time goes by), and can be altered, as will be apparent to those skilled in the art, in many details.

The presently preferred embodiment will be described in its implementation in the Dell 325NC computer. This is a notebook computer, with an external closed size of about 8.5×11×2 inches.

FIG. 1 shows a perspective view of the notebook computer 100 of the presently preferred embodiment in the open position. Visible elements include case 102, cover 104, hinges 106, display screen 110, keyboard 120, floppy disk drive 130, and dust cover 103 (which covers the receptacle for the rechargeable battery pack).

FIG. 11 shows the keyboard layout used in the presently preferred embodiment. Note that, in addition to the usual chording keys ([Ctrl], [Alt], and [Shift]), this keyboard includes an additional chording, or special function key, labelled [Fn]. This key enables the keypad keys which are mapped into the keyboard, and also enables mouse emulation functions which are also mapped into the keyboard.

Figure 2:
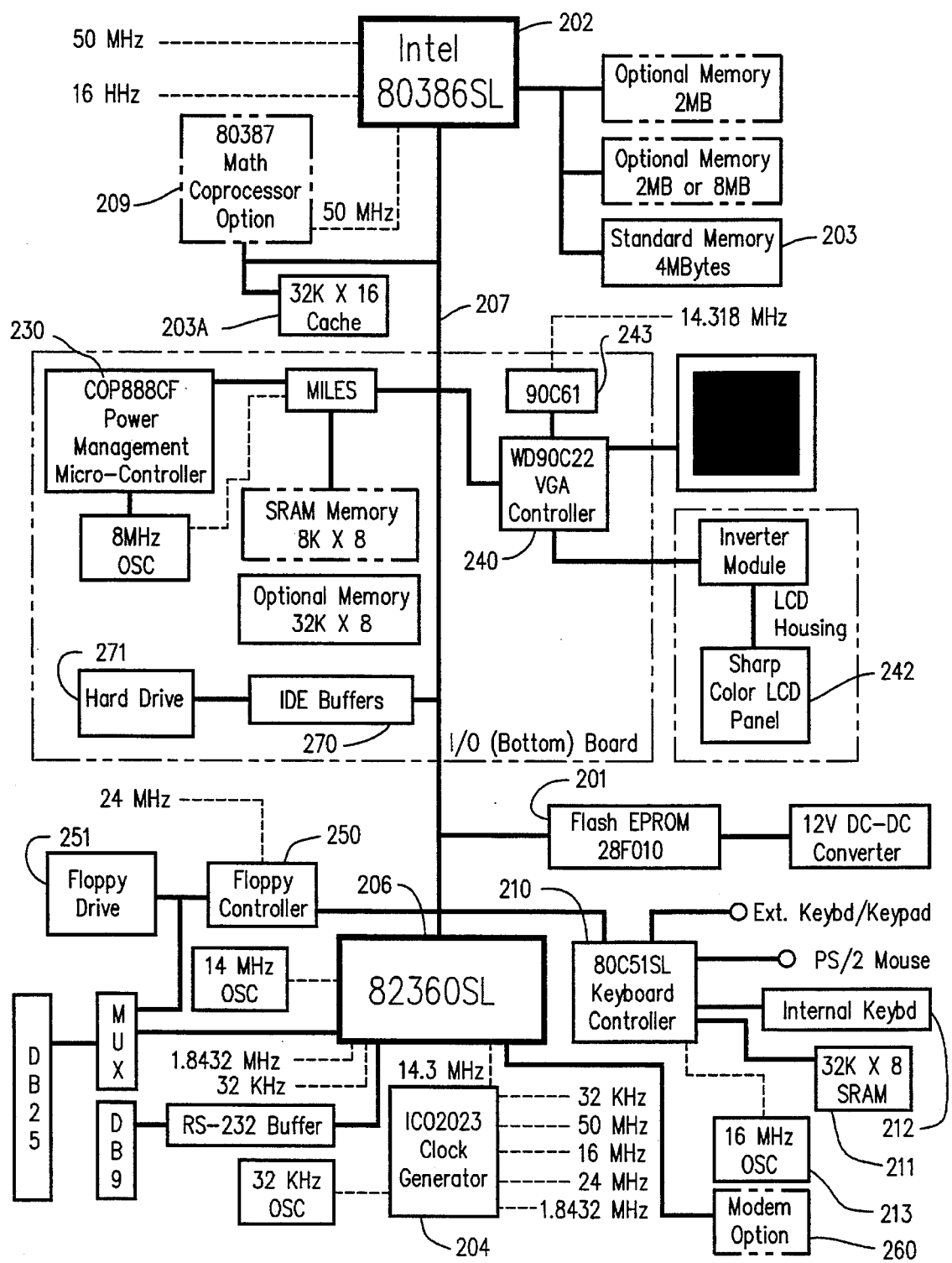
FIGS. 2–10*bc* schematically illustrate the circuitry of computer 100, in this sample embodiment.

FIGS. 2–10b schematically illustrate the circuitry of computer 100, in this sample embodiment. As shown in FIG. 2, a processor chipset 202 and 206, similar to the Intel 386SL Superset made of the 80386SL and 82360SL chips, is used. (Of course, a very wide variety of other chipsets can be used instead.) Chip 202 includes a 386SX processor core, and also includes ISA bus control logic (connected to ISA bus 207). Chip 202 also includes memory controller logic (connected to main memory 203 by 22 address lines, 16 data lines, and RAS and CAS strobe signals). Chip 202 also includes cache control tag RAMs (connected to cache RAM 203A). Chip 202 also includes math coprocessor interface logic (connected to optional math coprocessor 209). Chip 202 also includes CPU power management logic. Chip 202 receives a clock input (16 MHz and 50 MHz in this example) from clock/timing generator 204.

Chip 206 is connected to receive clock line SYSCLK from chip 202. Chip 206 also includes timer logic (approximately equivalent to two 8254s), which is connected to receive a 14.31818 MHz clock signal from clock generator 204. Chip 206 also includes interrupt controller logic (approximately equivalent to two 8259As). Chip 206 also includes DMA controller logic (approximately equivalent to two 8237s). Chip 206 also includes bus interface logic which is connected to the ISA bus 207. Chip 206 also includes power management logic, and a real-time clock (approximately equivalent to a 146818), which is connected to receive a 32.768 KHz signal from clock generator 204. Chip 206 also includes serial port control logic (approximately equivalent to two 16450s), which is connected to receive a 1.8432 MHz signal from clock generator 204.

Flash EPROM 201 contains code for BIOS and for the operating system (e.g. DOS). This chip, in the presently preferred embodiment, is a 256K×8 memory.

A microcontroller 210 (an 80C51SL, in the presently preferred embodiment) receives keyboard inputs from keyboard 212. Associated with microcontroller 210 are SRAM 211 (32K×8 in this sample embodiment) and resonant crystal oscillator 213 (16 MHz in this sample embodiment). Video signals from VGA controller 240 (which is a WD90C22 in the presently preferred embodiment), control the LCD display 242. VGA controller 240 is also connected to programmable pixel clock 243.

Also connected to bus 207 is a floppy disk drive controller 250 (connecting to floppy disk drive 251) and an IDE interface 270, which is connectible to the internal hard disk drive 271 (or to a semiconductor mass-memory drive emulation, if a diskless configuration is chosen). A power supply controlled by controller 230 is driven by a battery, and also may be powered by external power through an input socket. This power supply, in the presently preferred embodiment, provides output voltages of ±5V, ± 12V, and 18.6V. However, of course, lower logic supply voltages may be used in future embodiments.

The 82360SL chip connects to industry-standard connectors for serial ports (DB-9), parallel ports (DB-25), and optional modem unit 260.

Figure 3A:
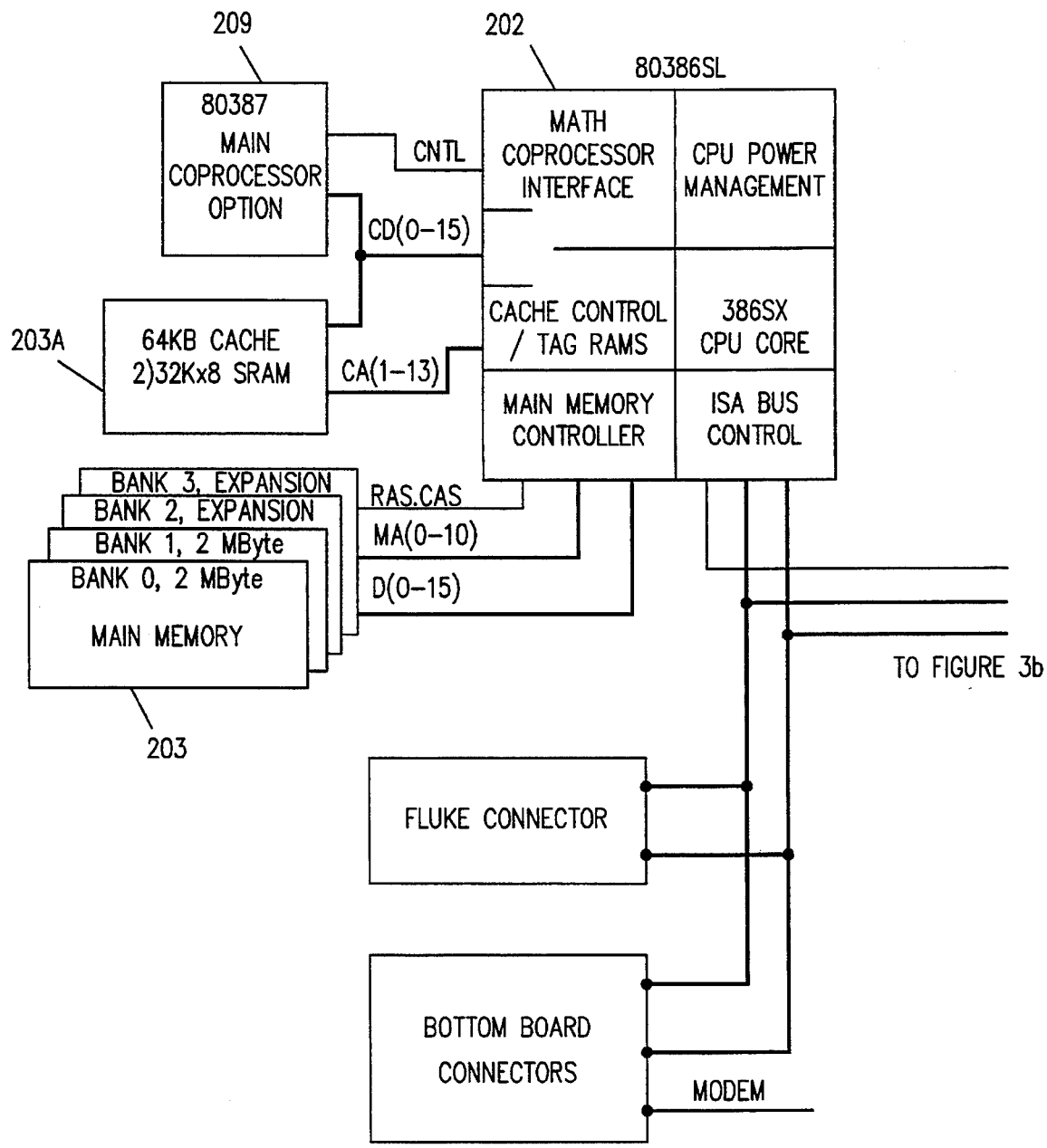
Figure 3B:
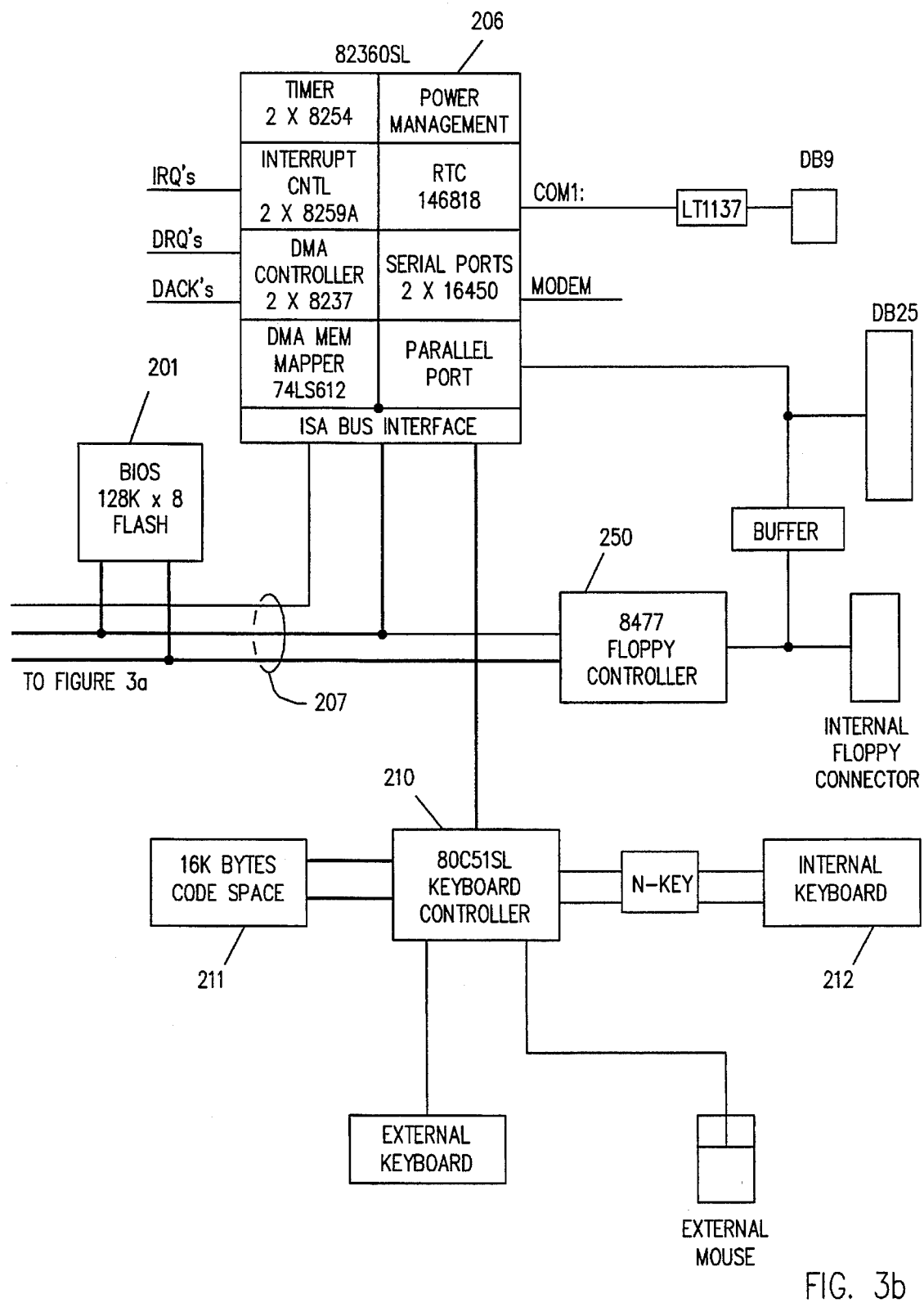
Figure 4A:
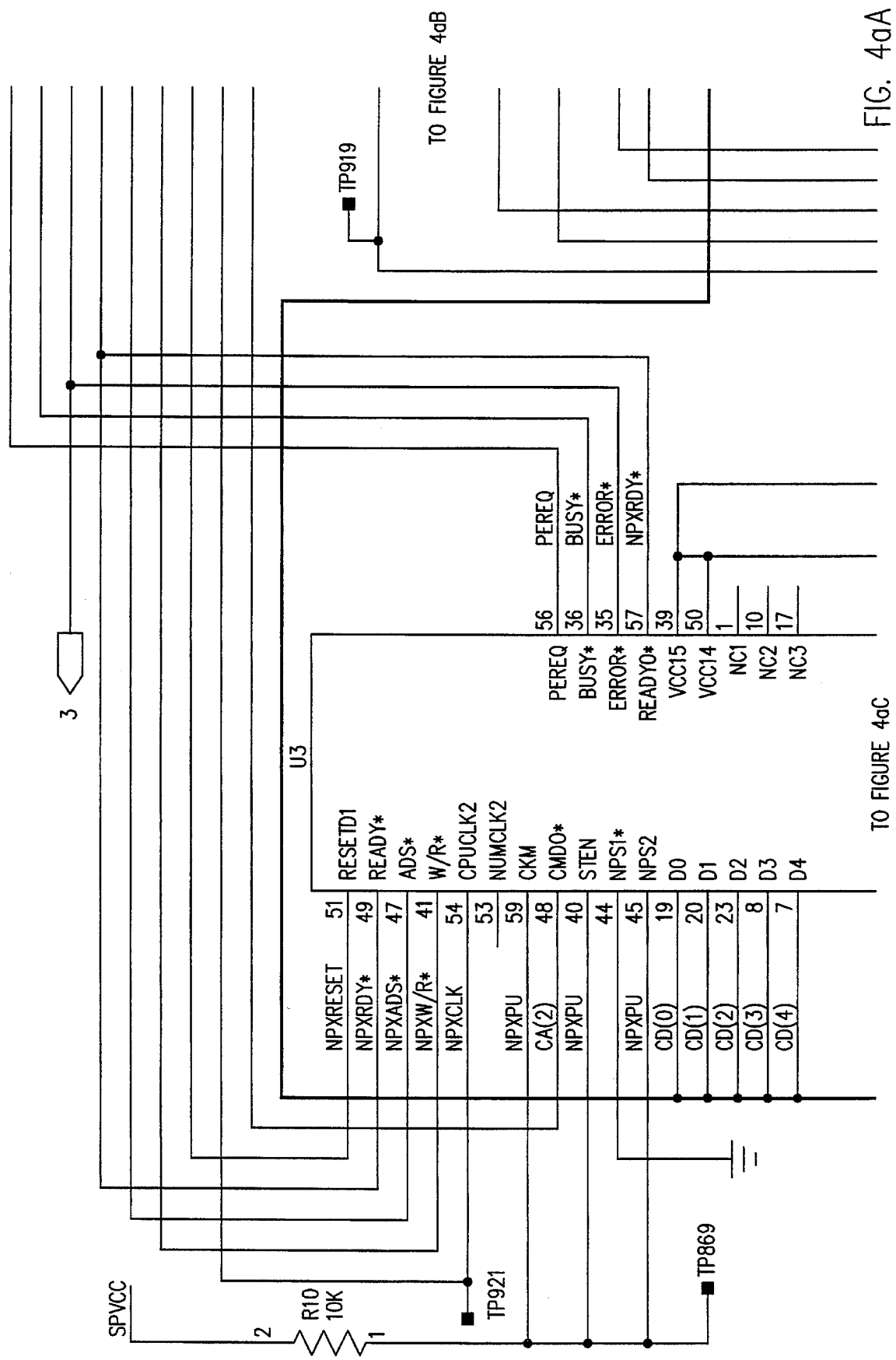
Figure 4A:
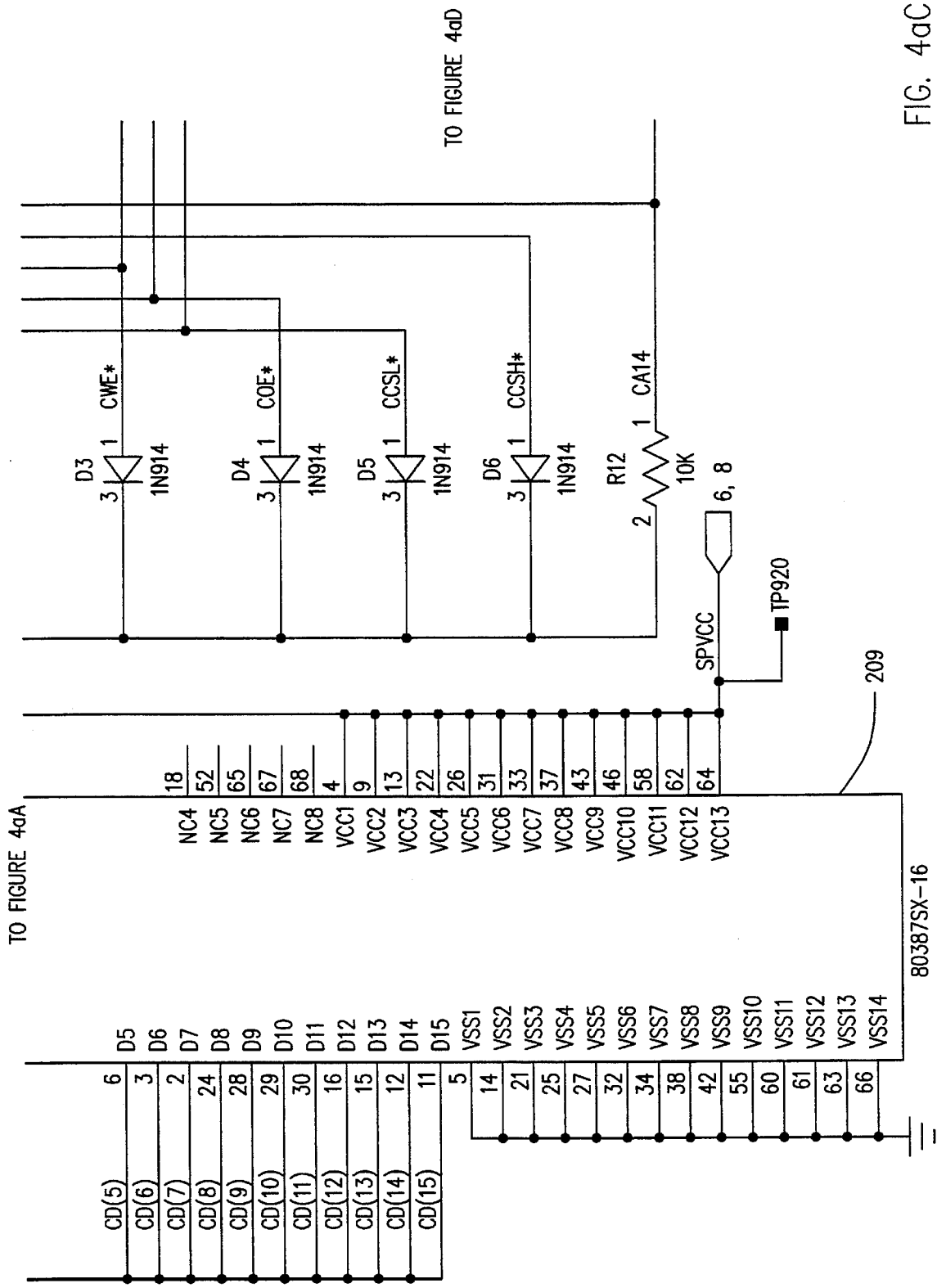
Figure 4A:
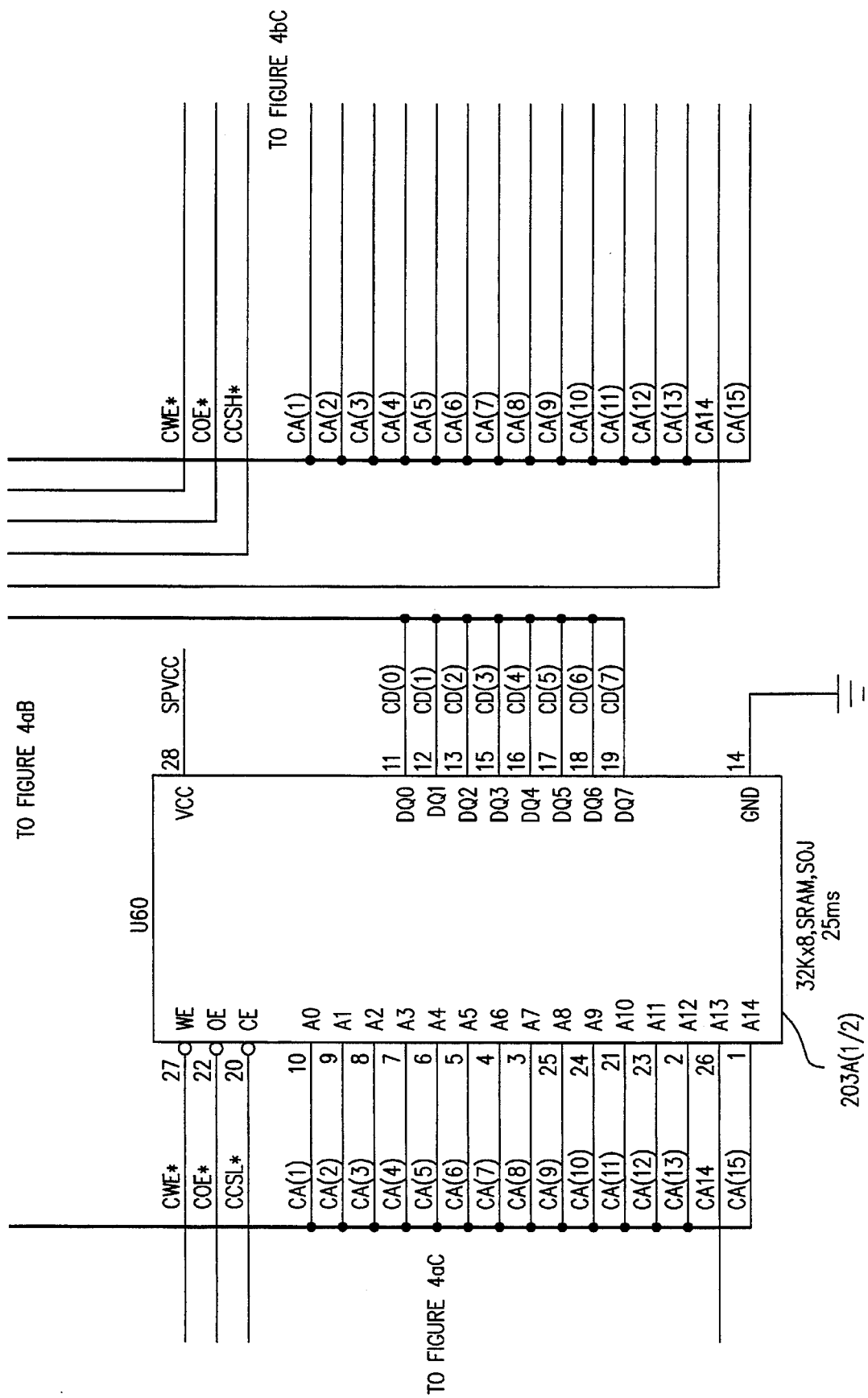
Figure 4A:
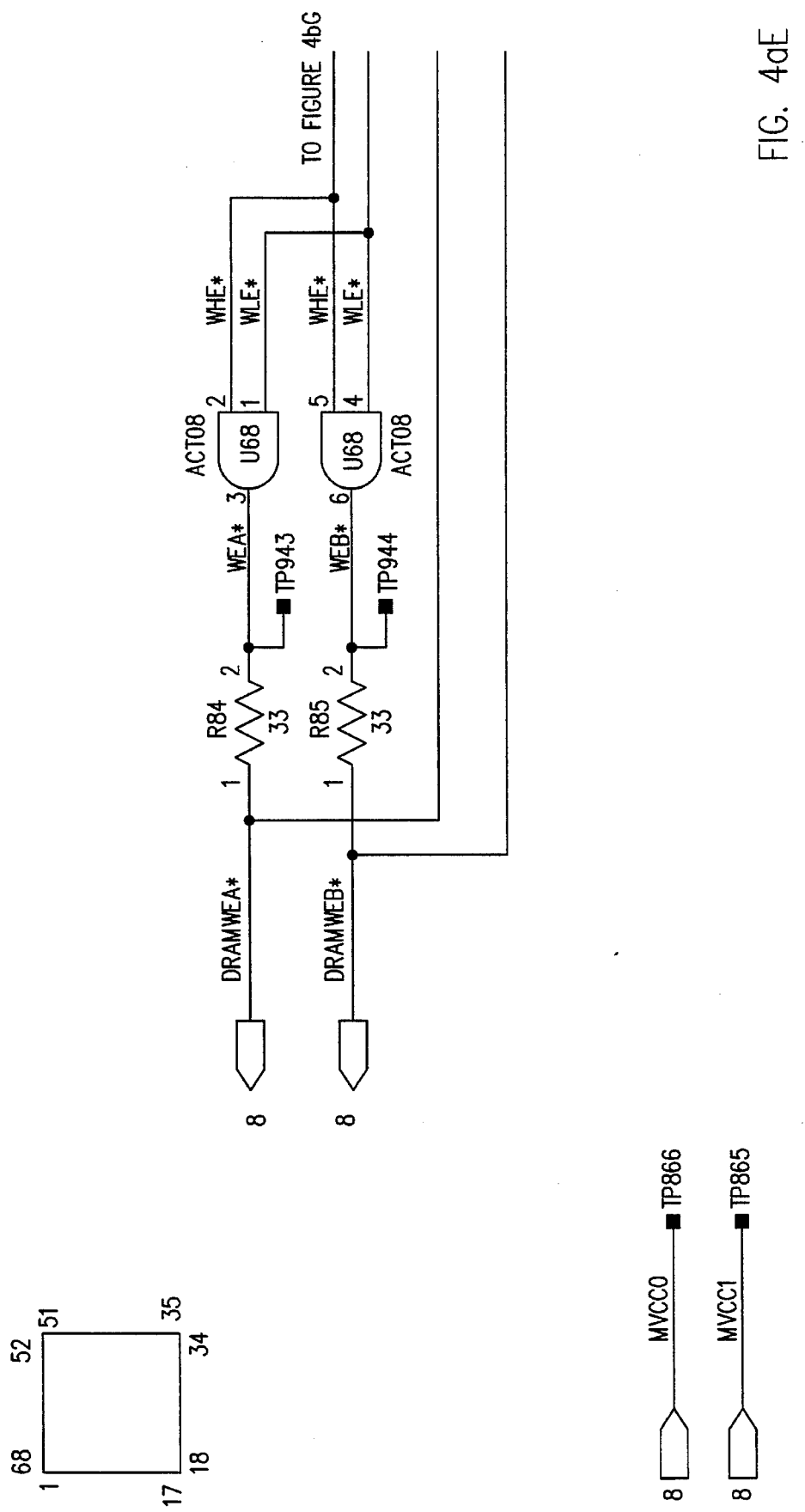
Figure 4A:
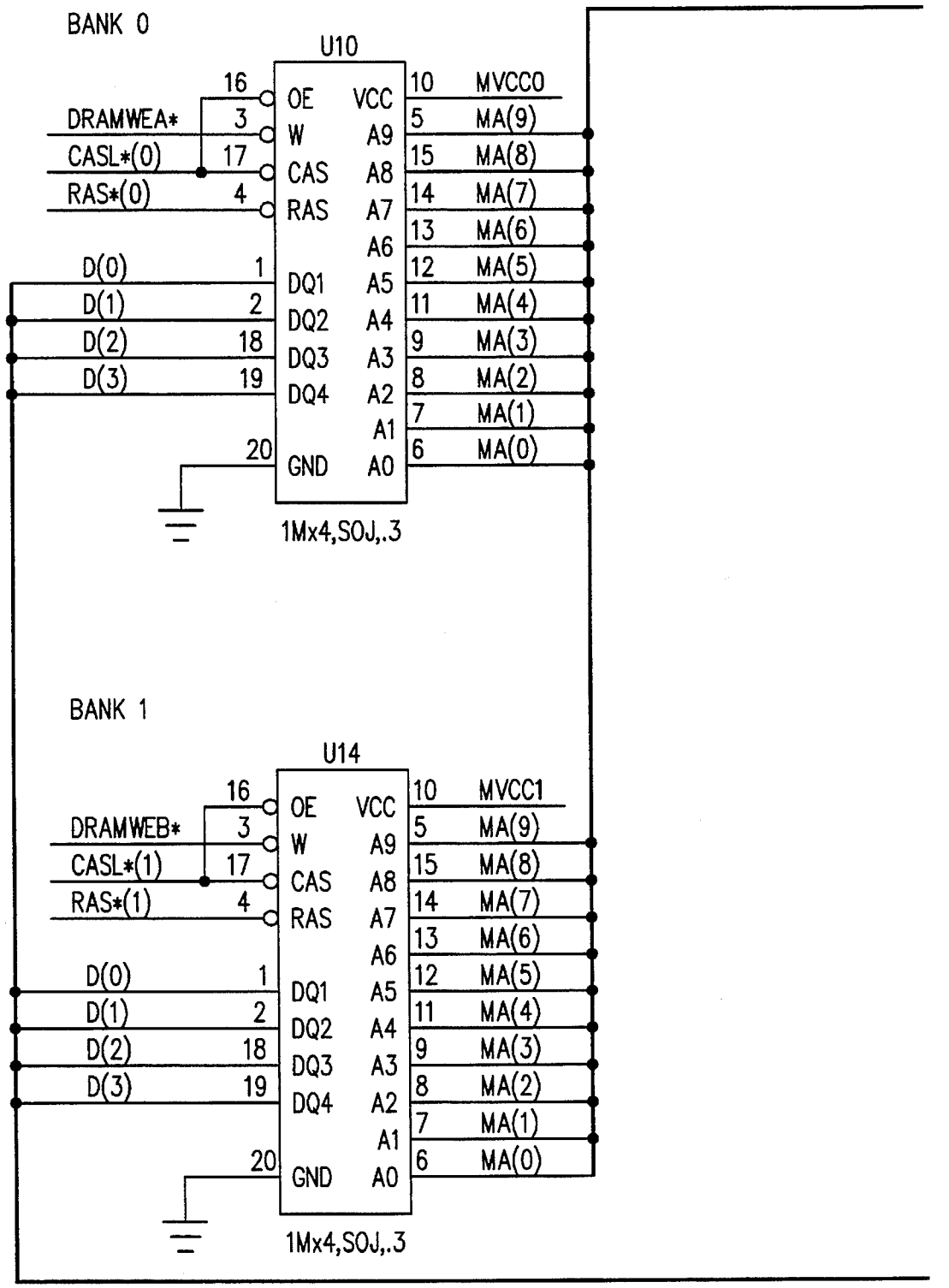
Figure 4A:
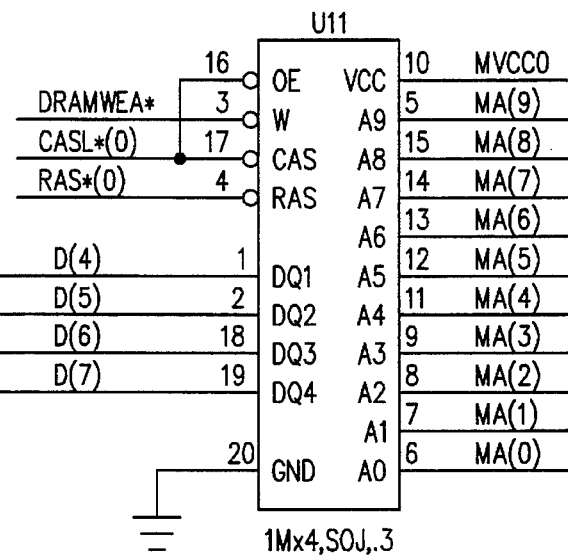
Figure 4A:
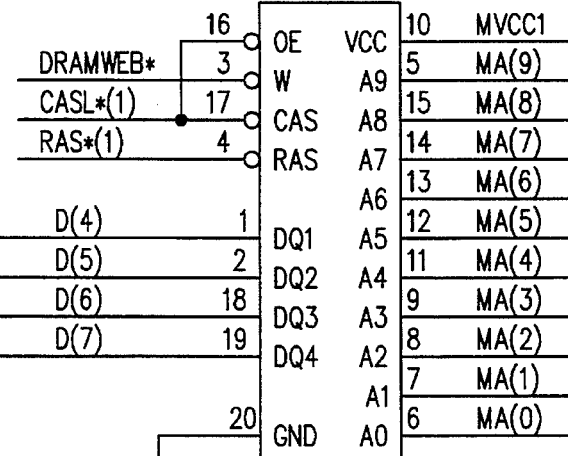
Figure 4A:
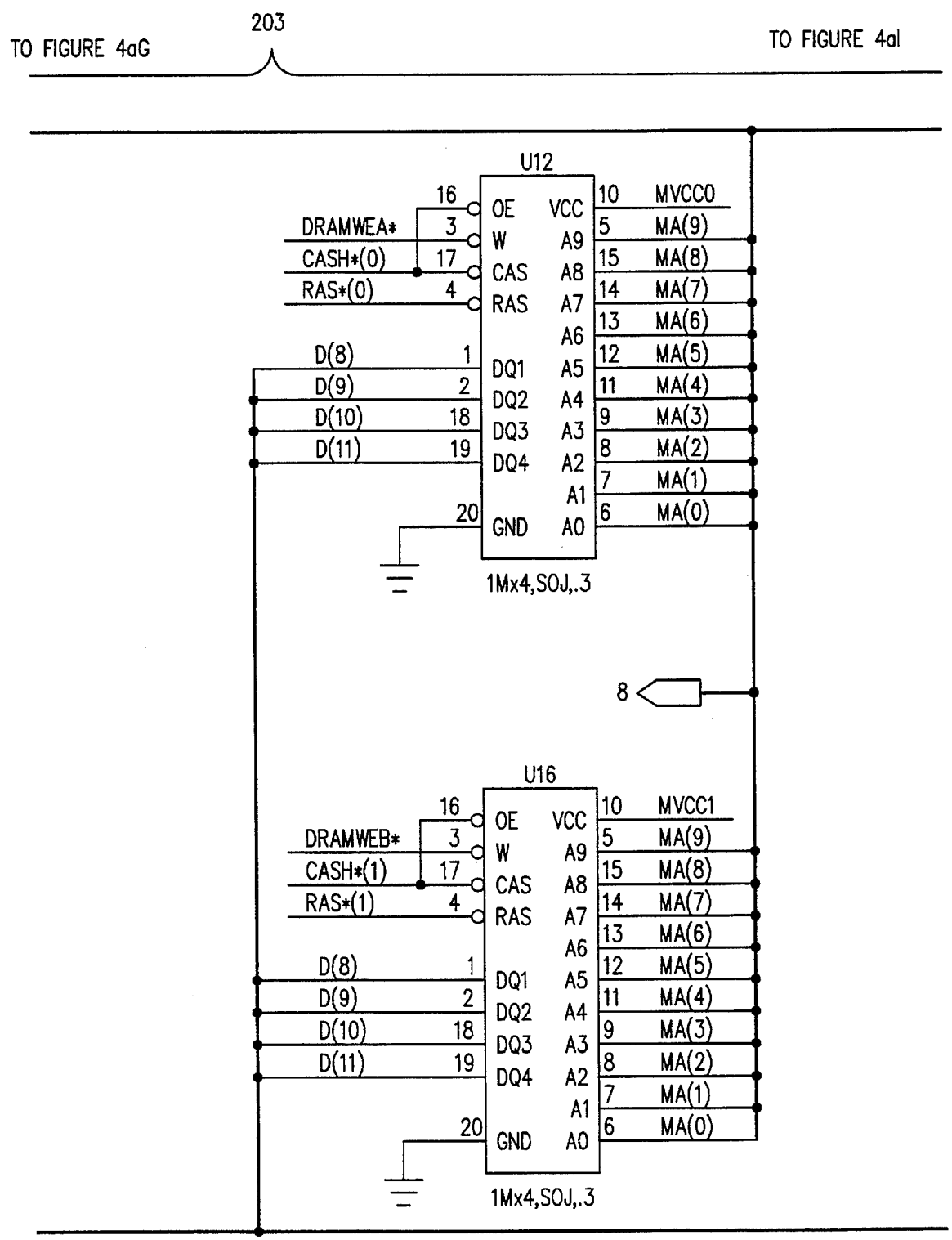
Figure 4A:
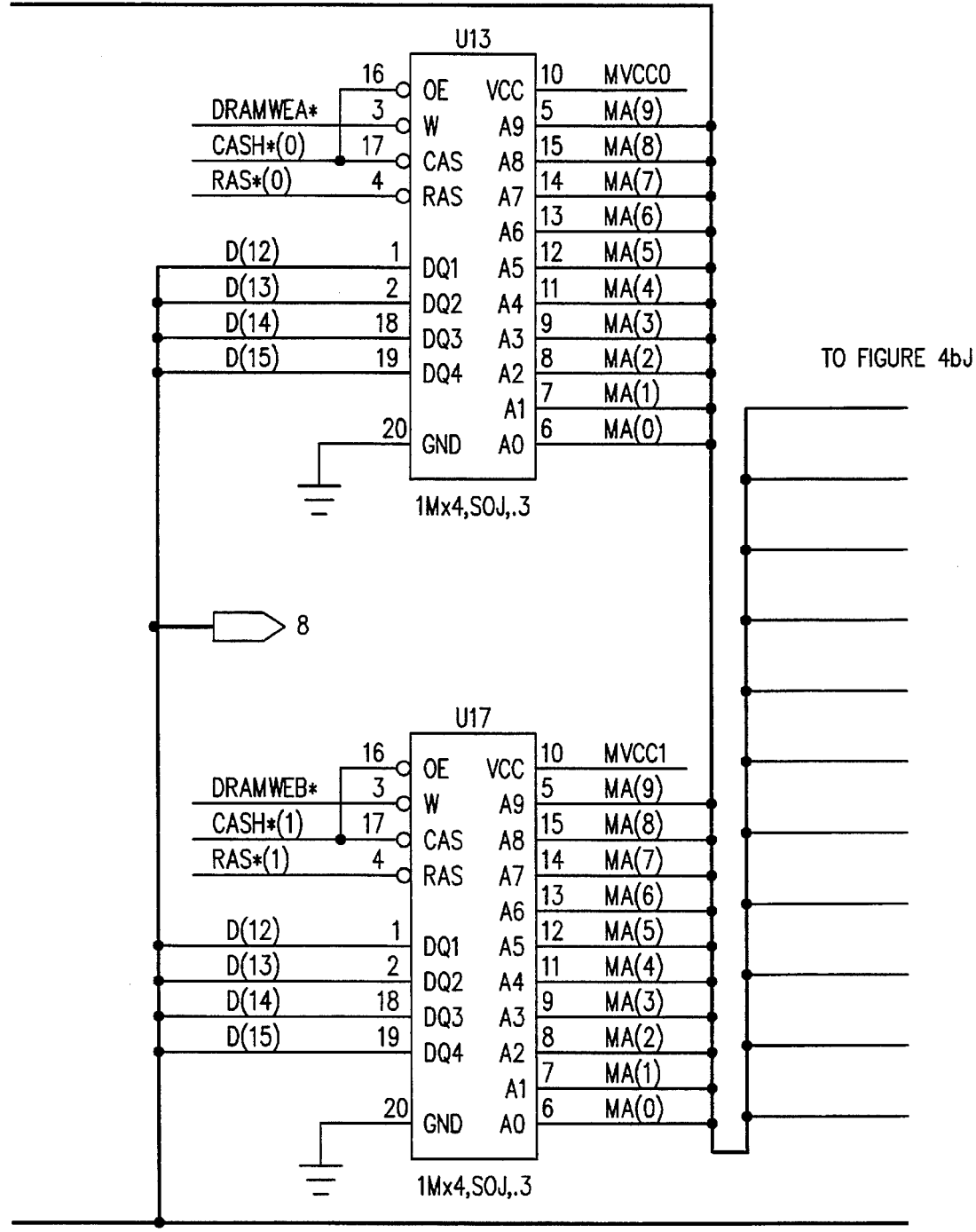
Figure 4B:
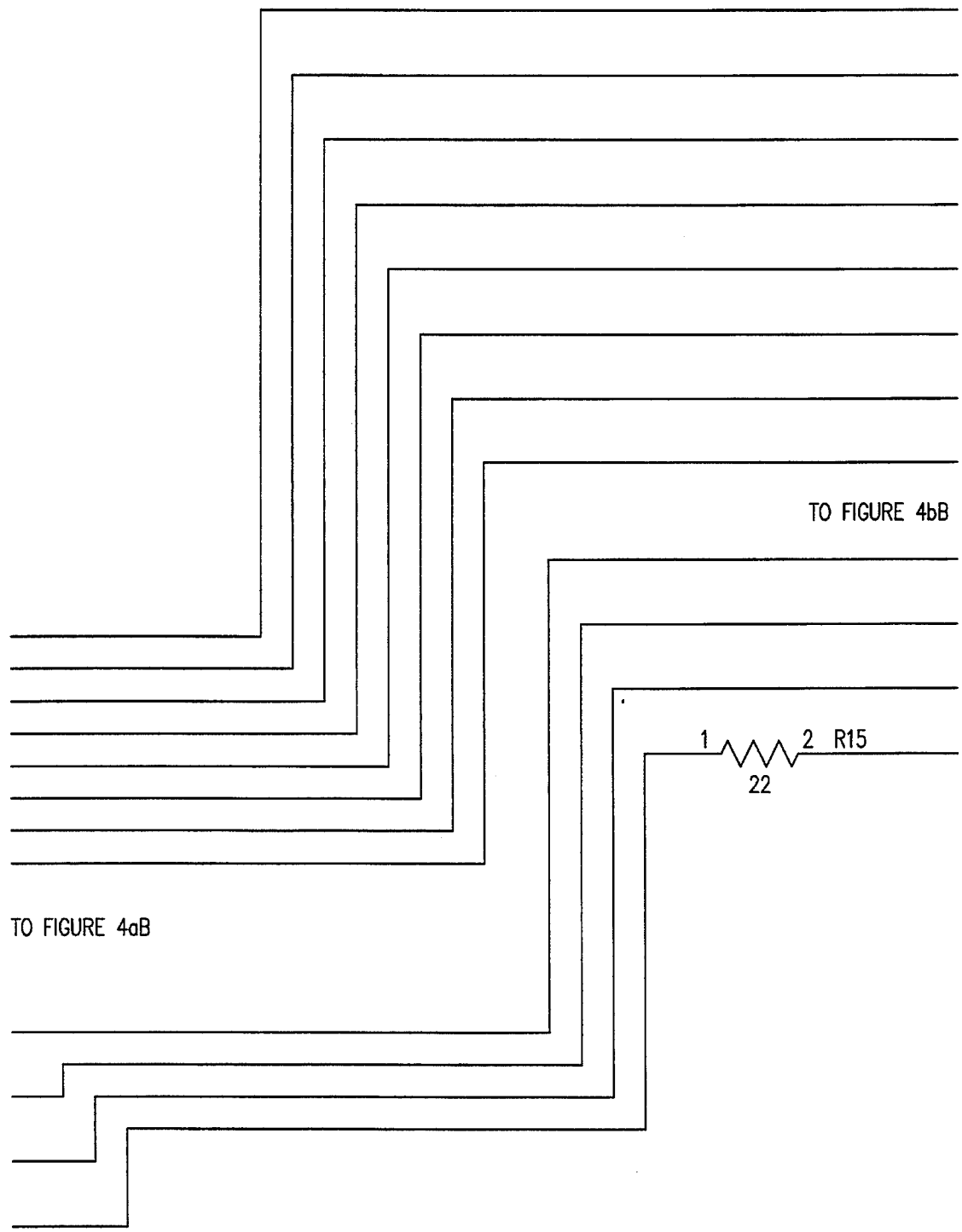
Figure 4B:
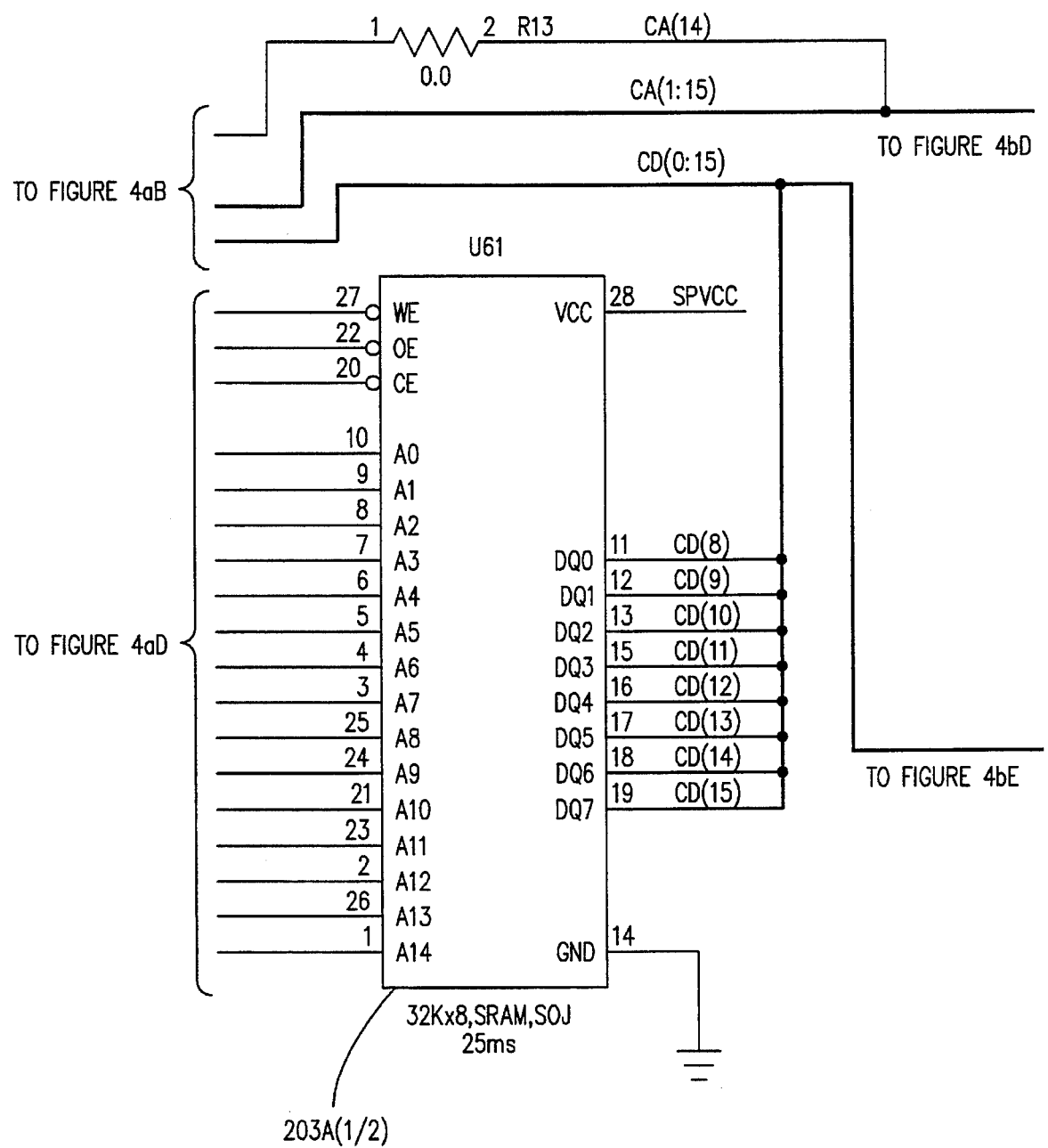
Figure 4B:
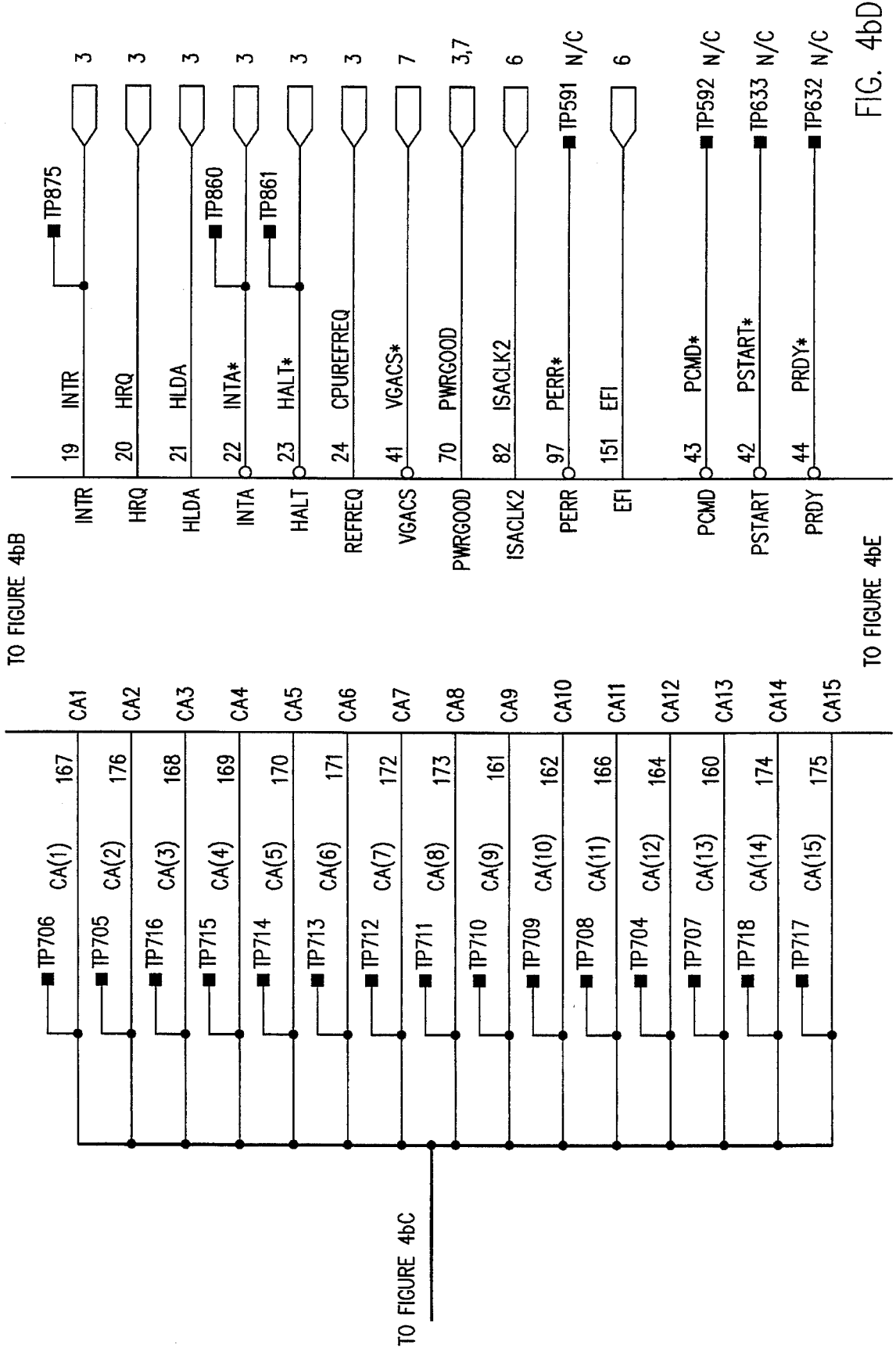
Figure 4B:
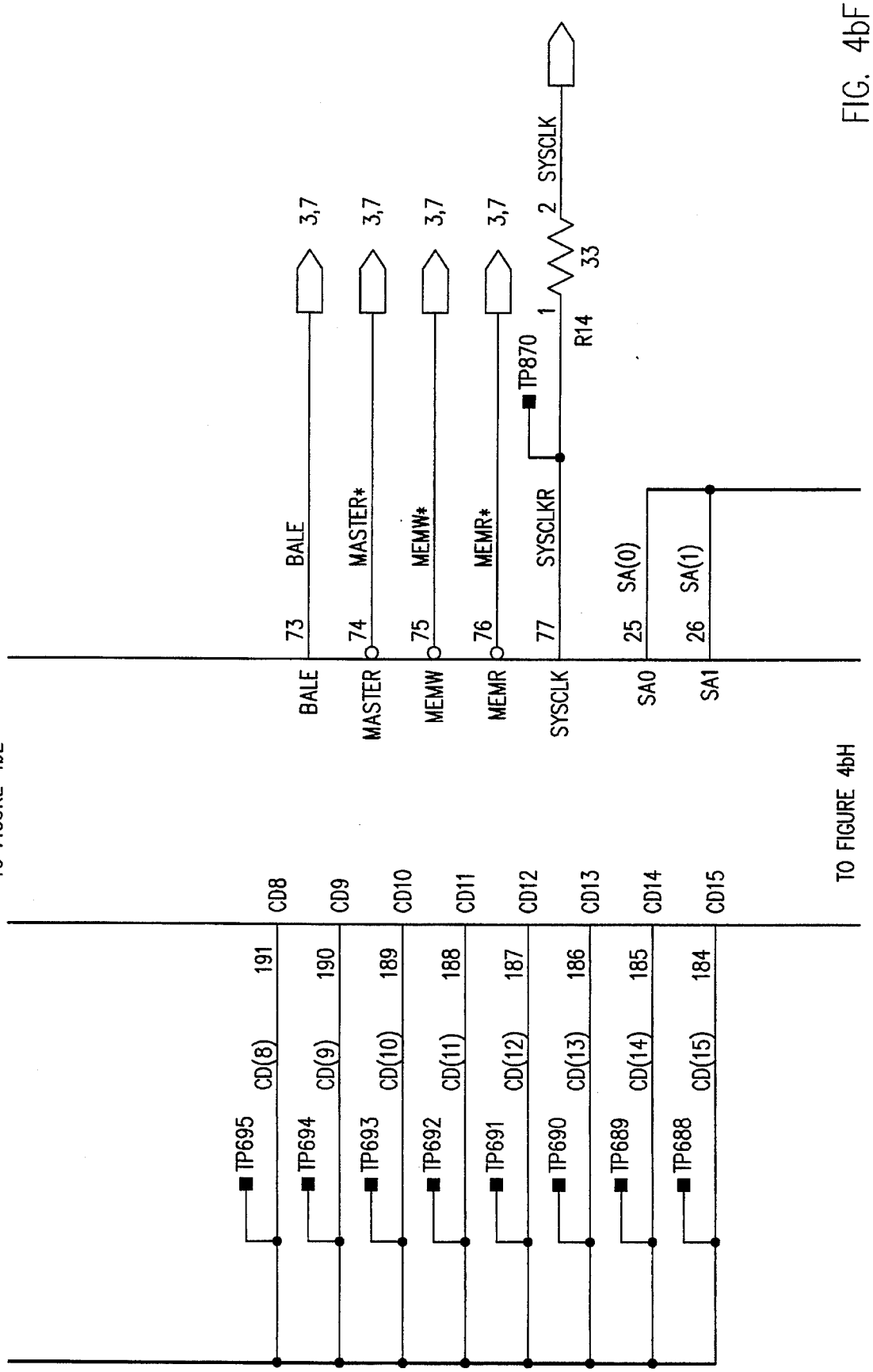
Figure 4B:
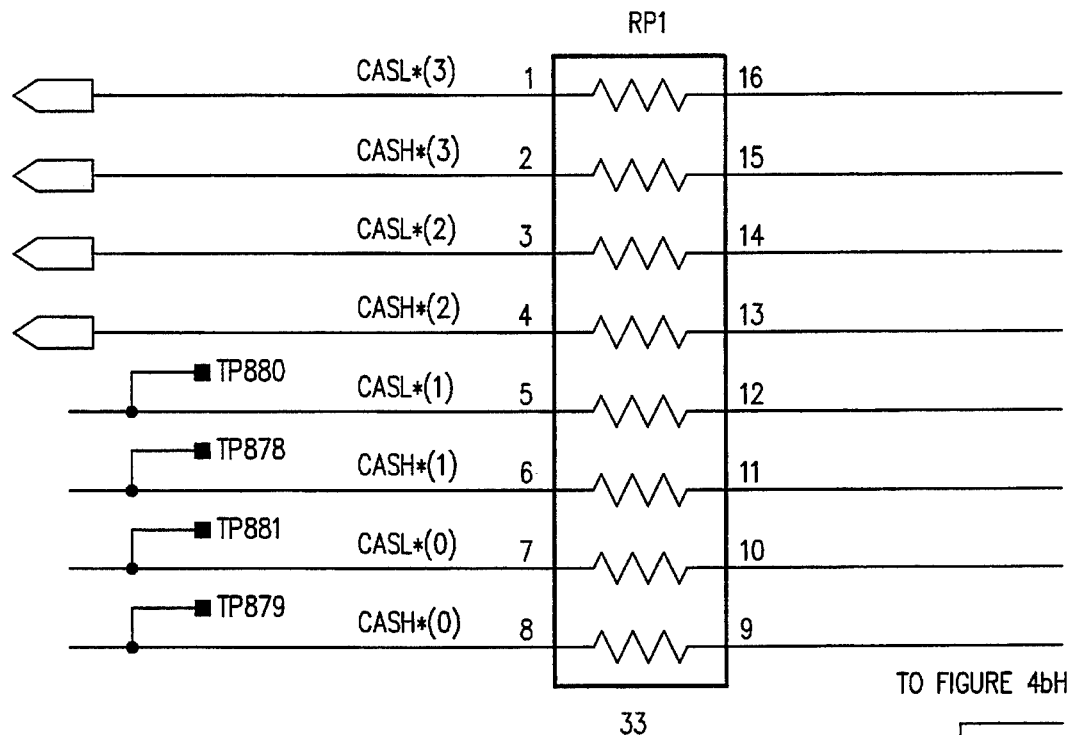
Figure 4B:
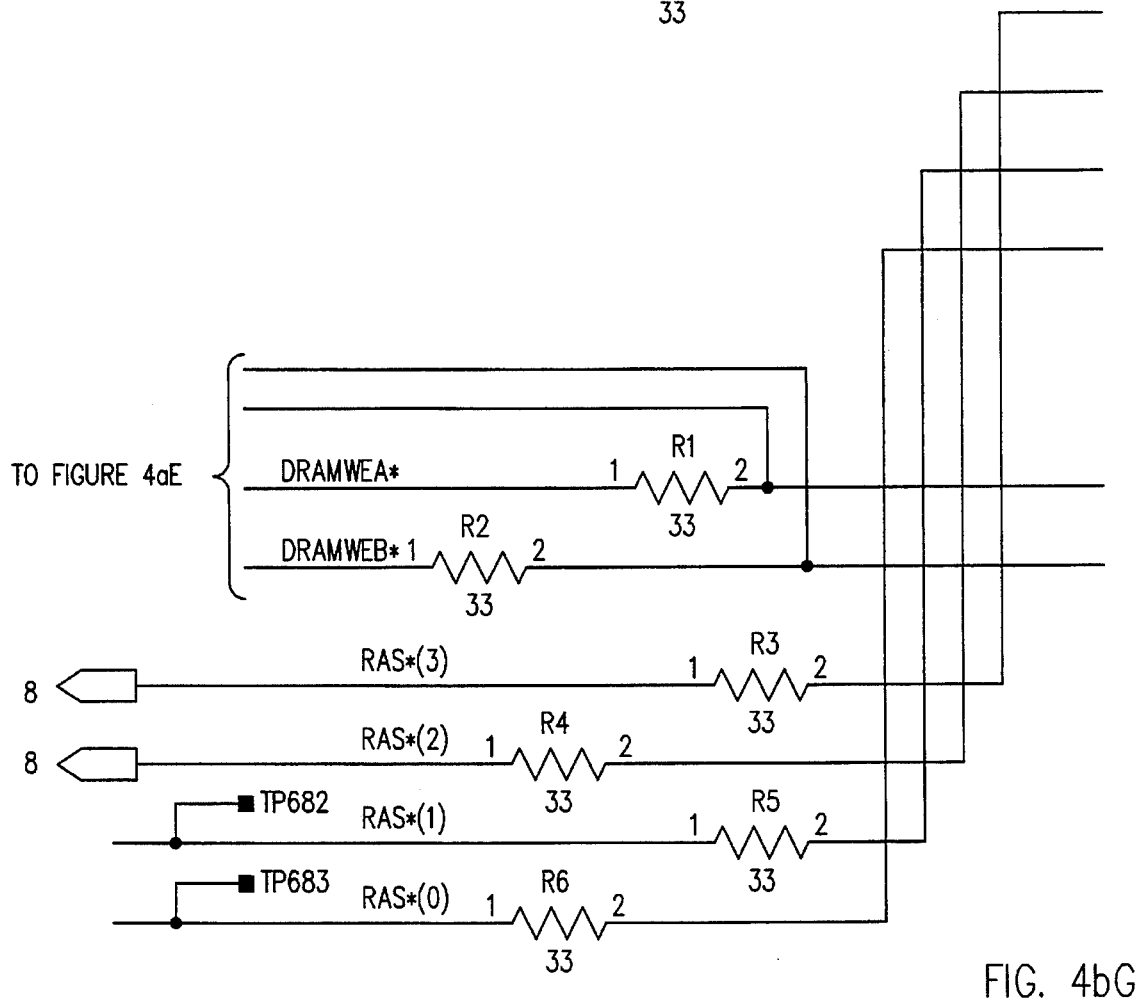
Figure 4B:
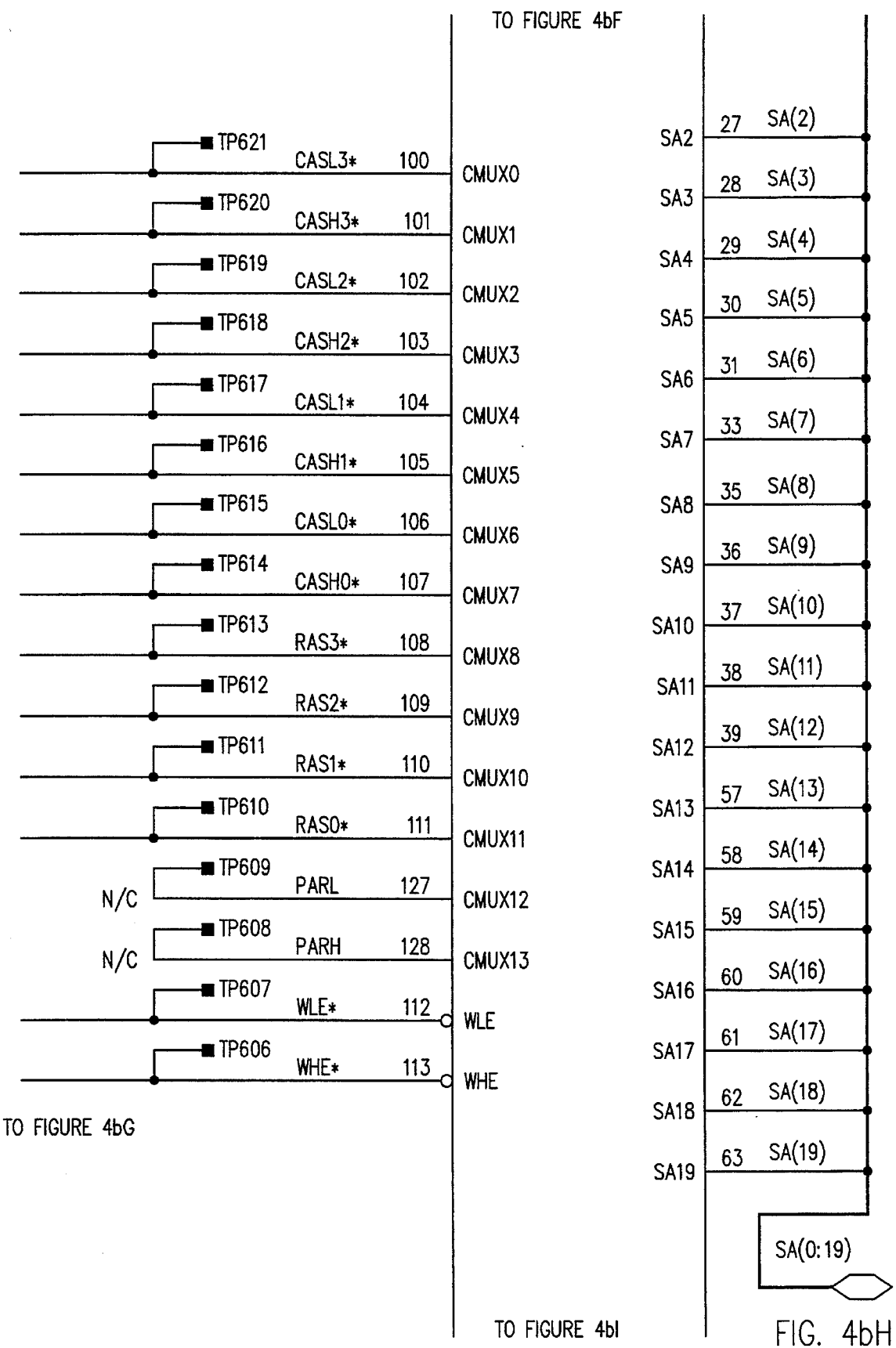
Figure 4B:
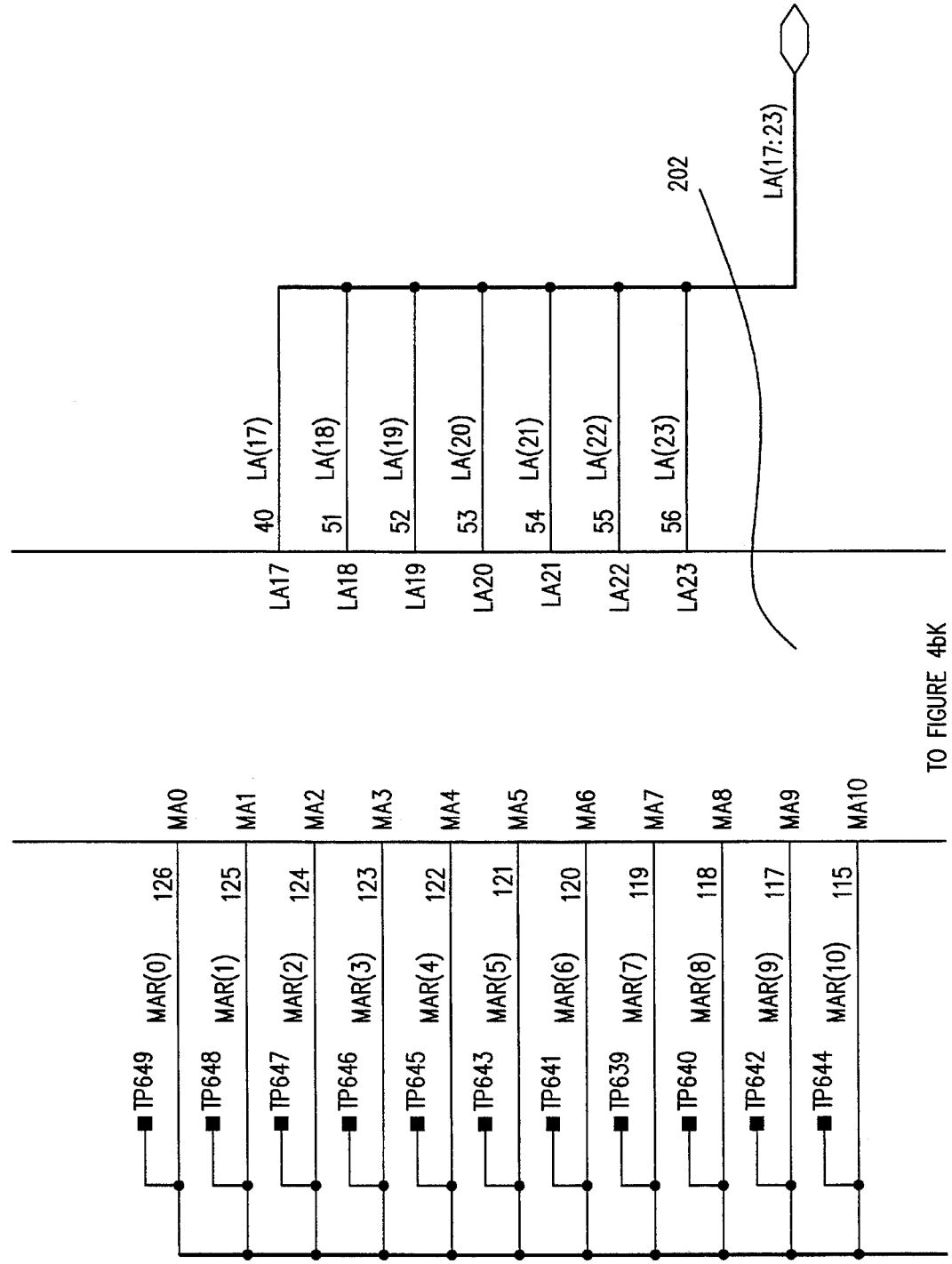
Figure 4B:
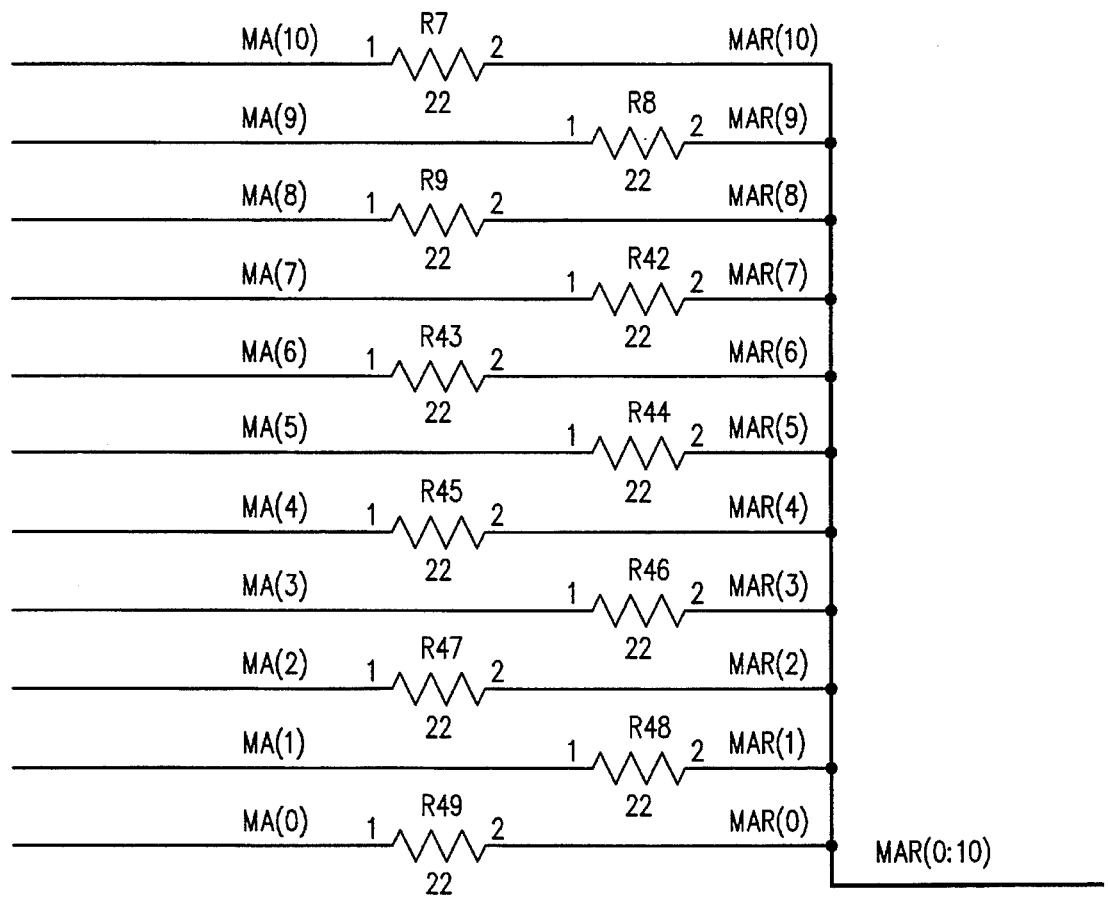
Figure 4B:
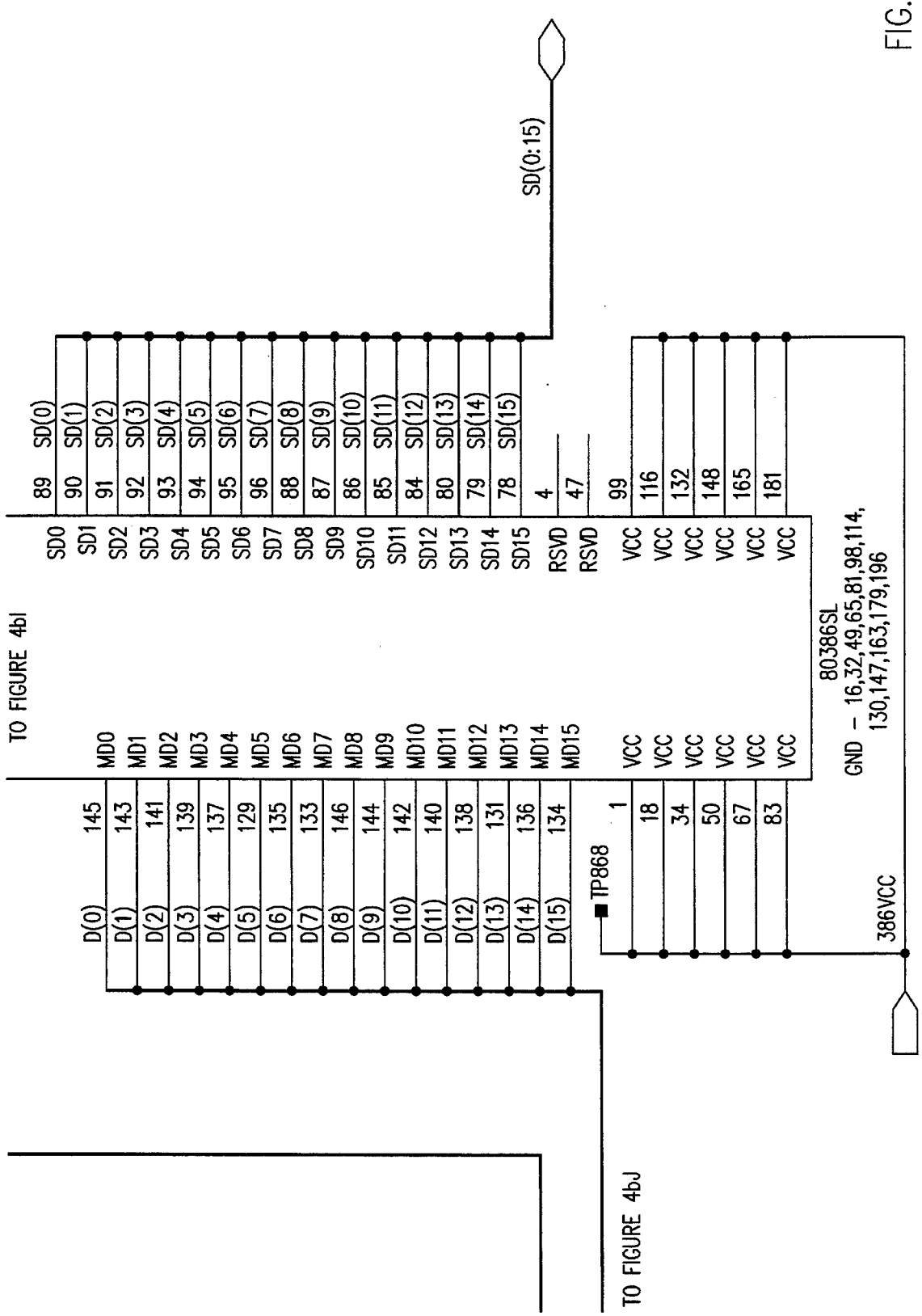
Figure 5A:
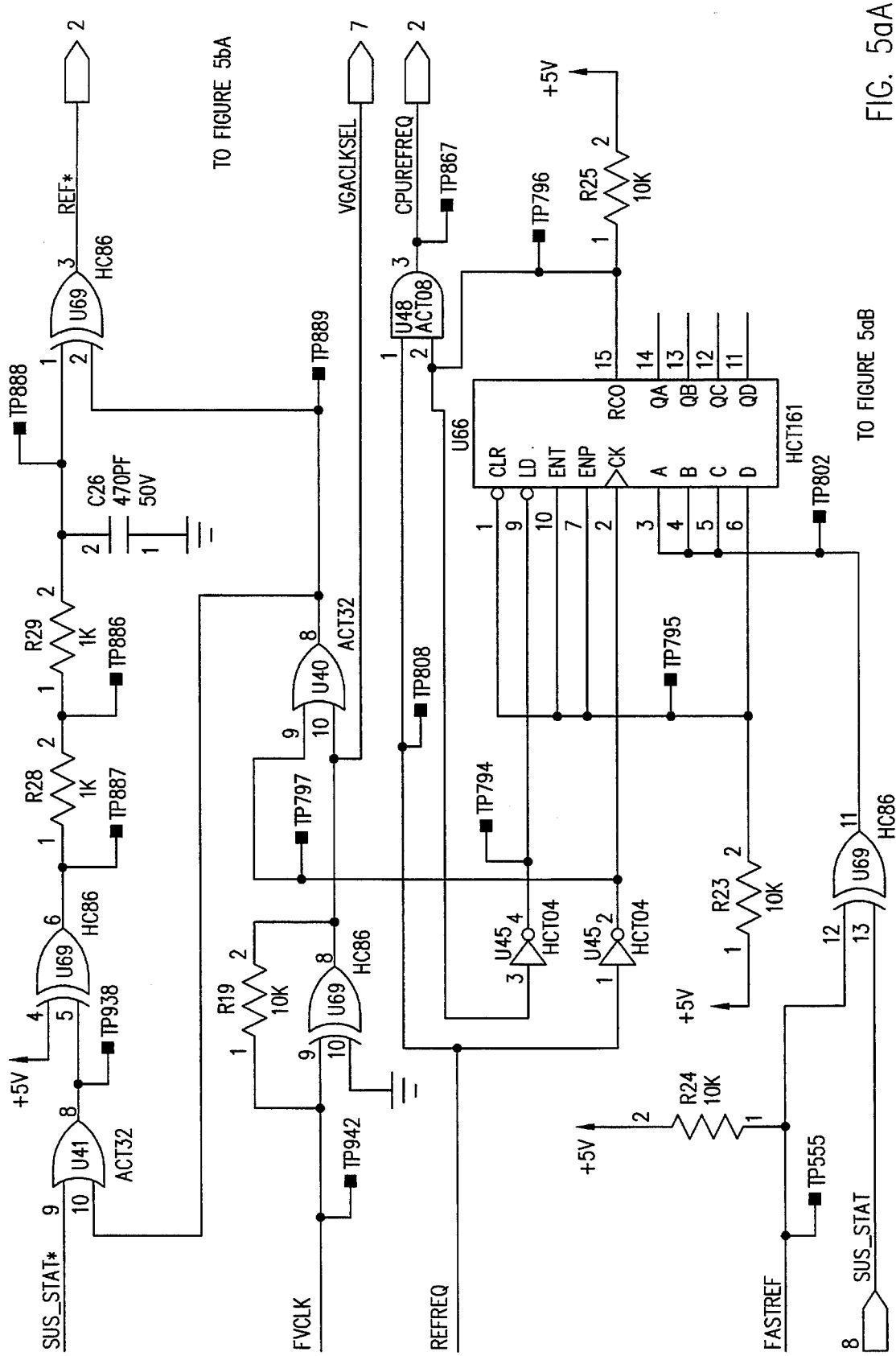
Figure 5A:
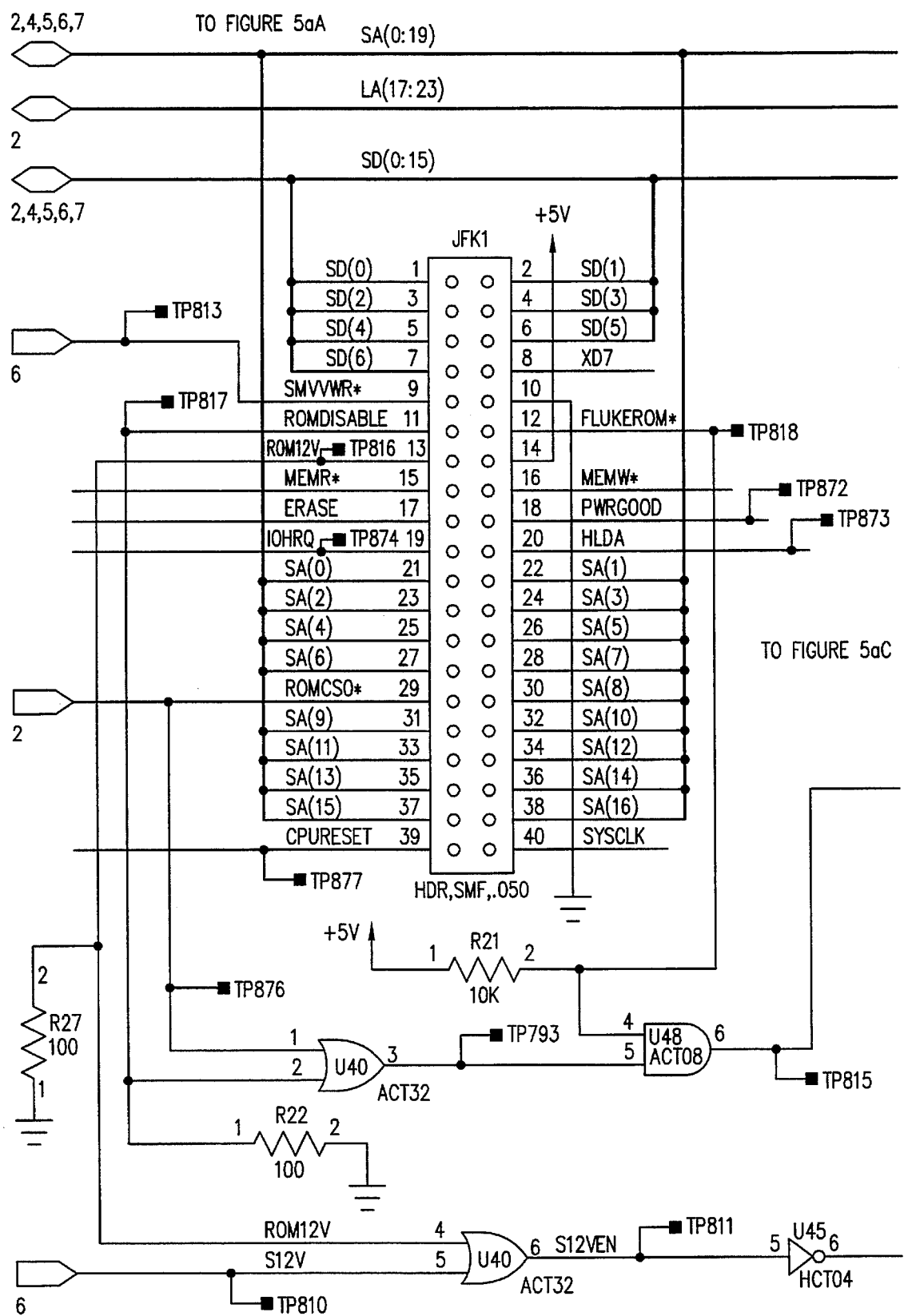
Figure 5A:
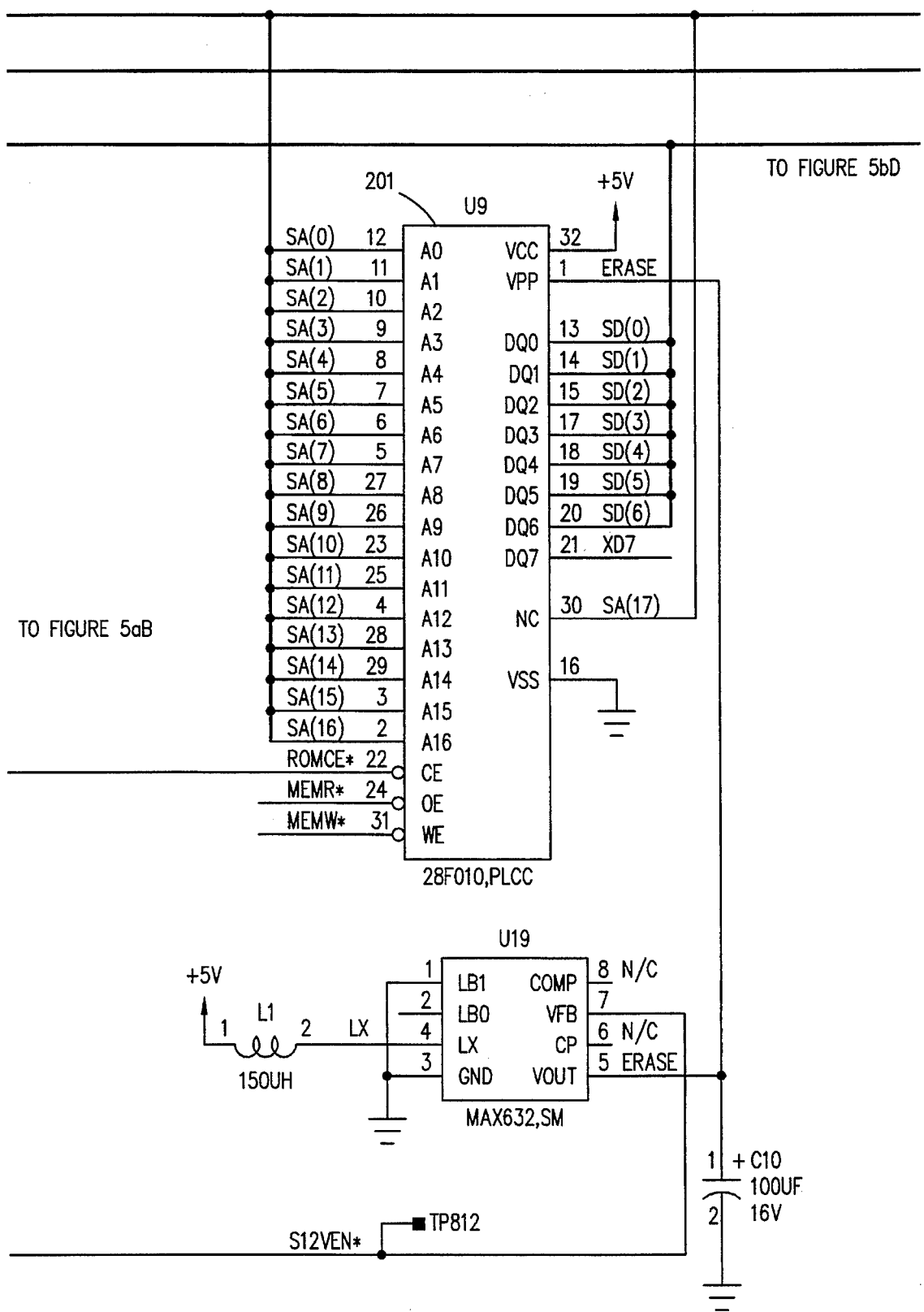
Figure 5B:
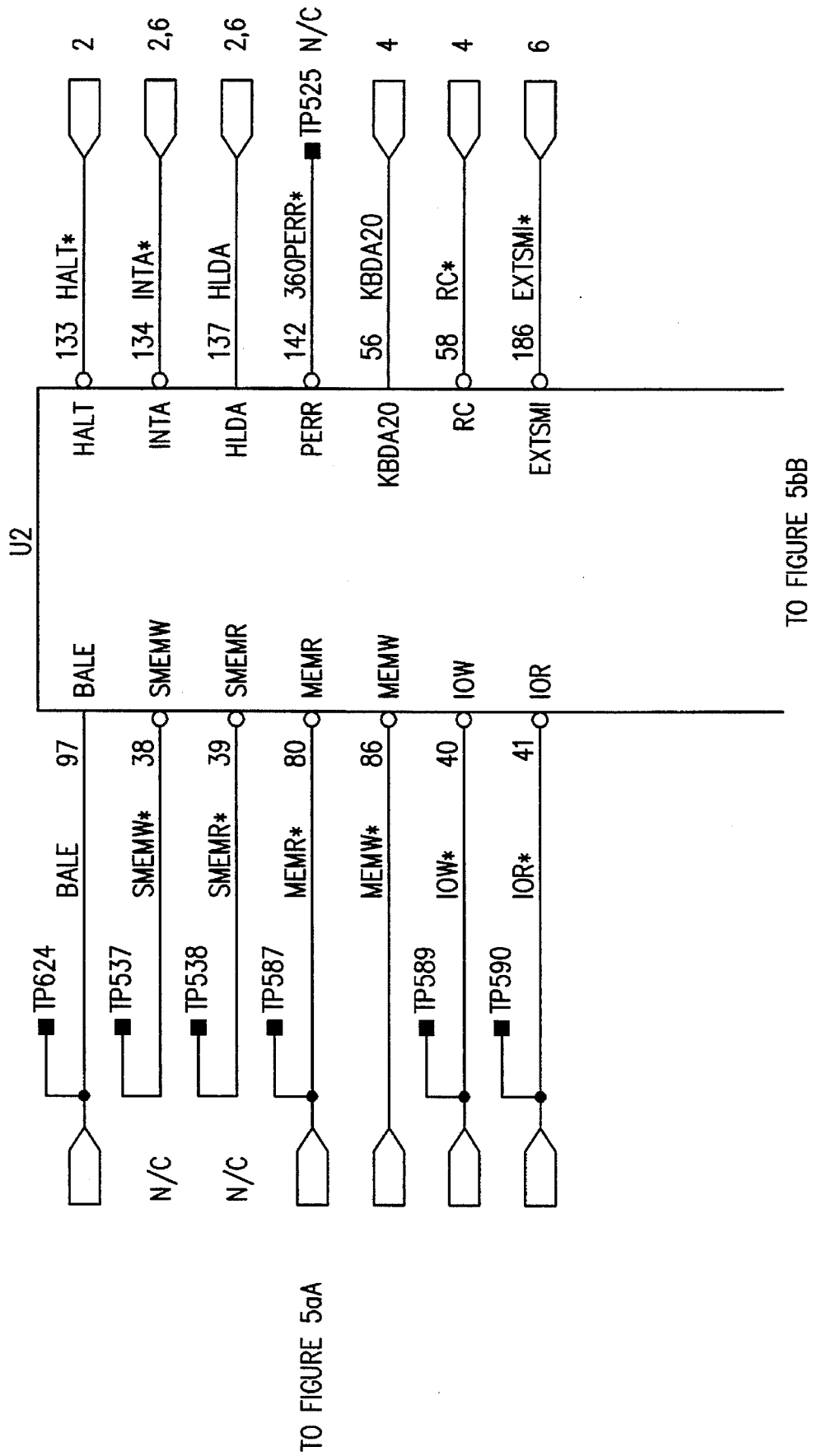
Figure 5B:
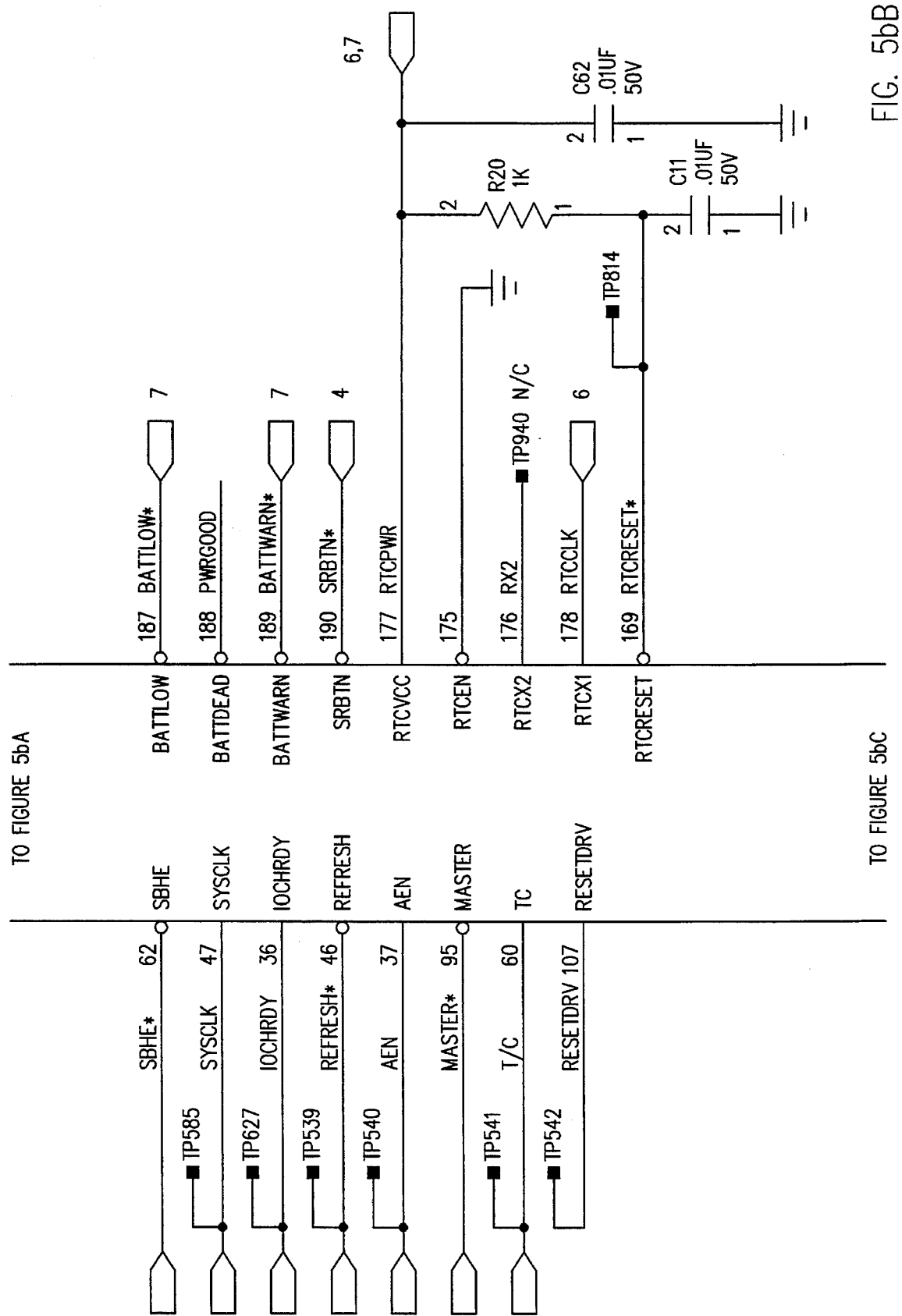
Figure 5B:
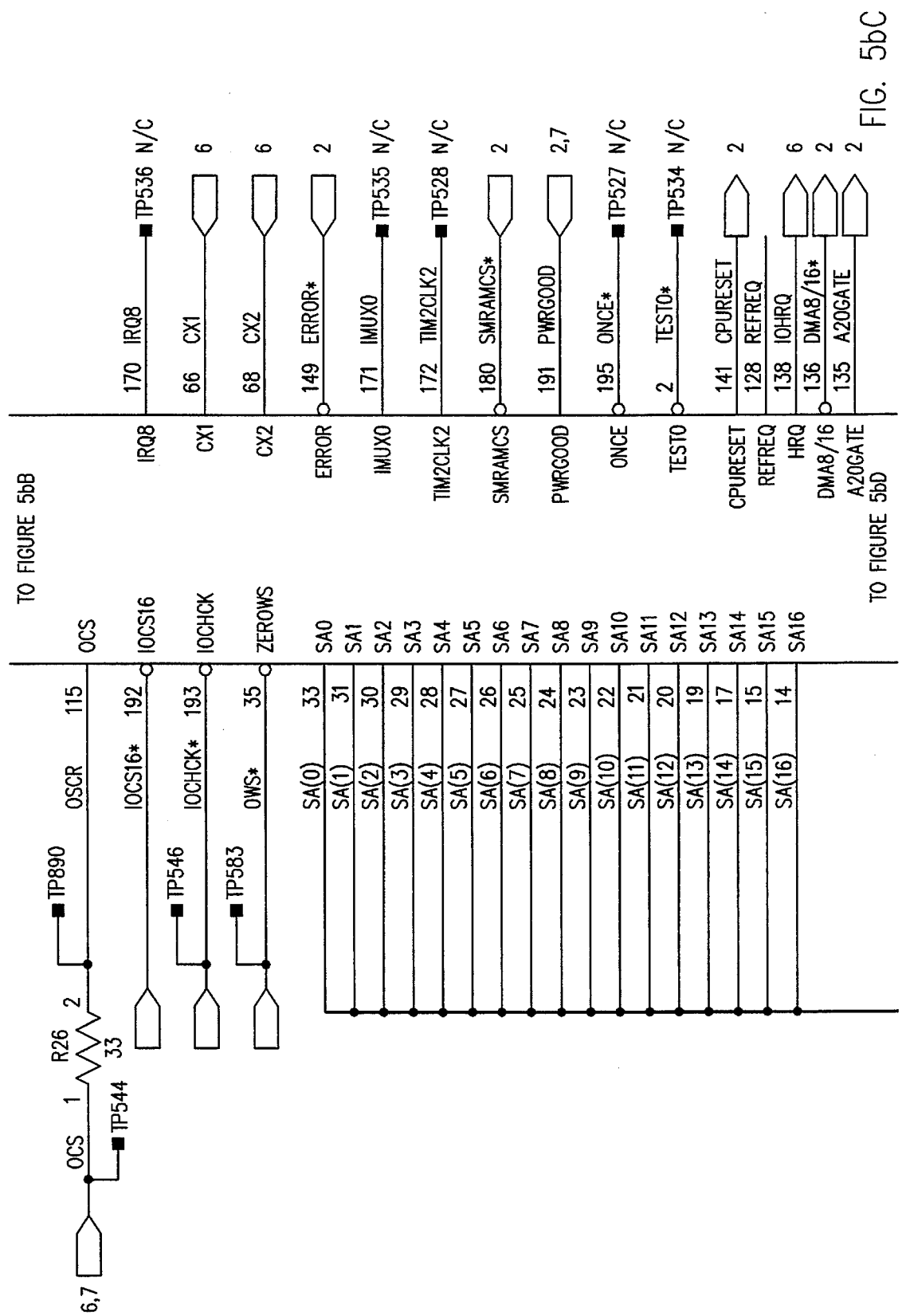
Figure 5B:
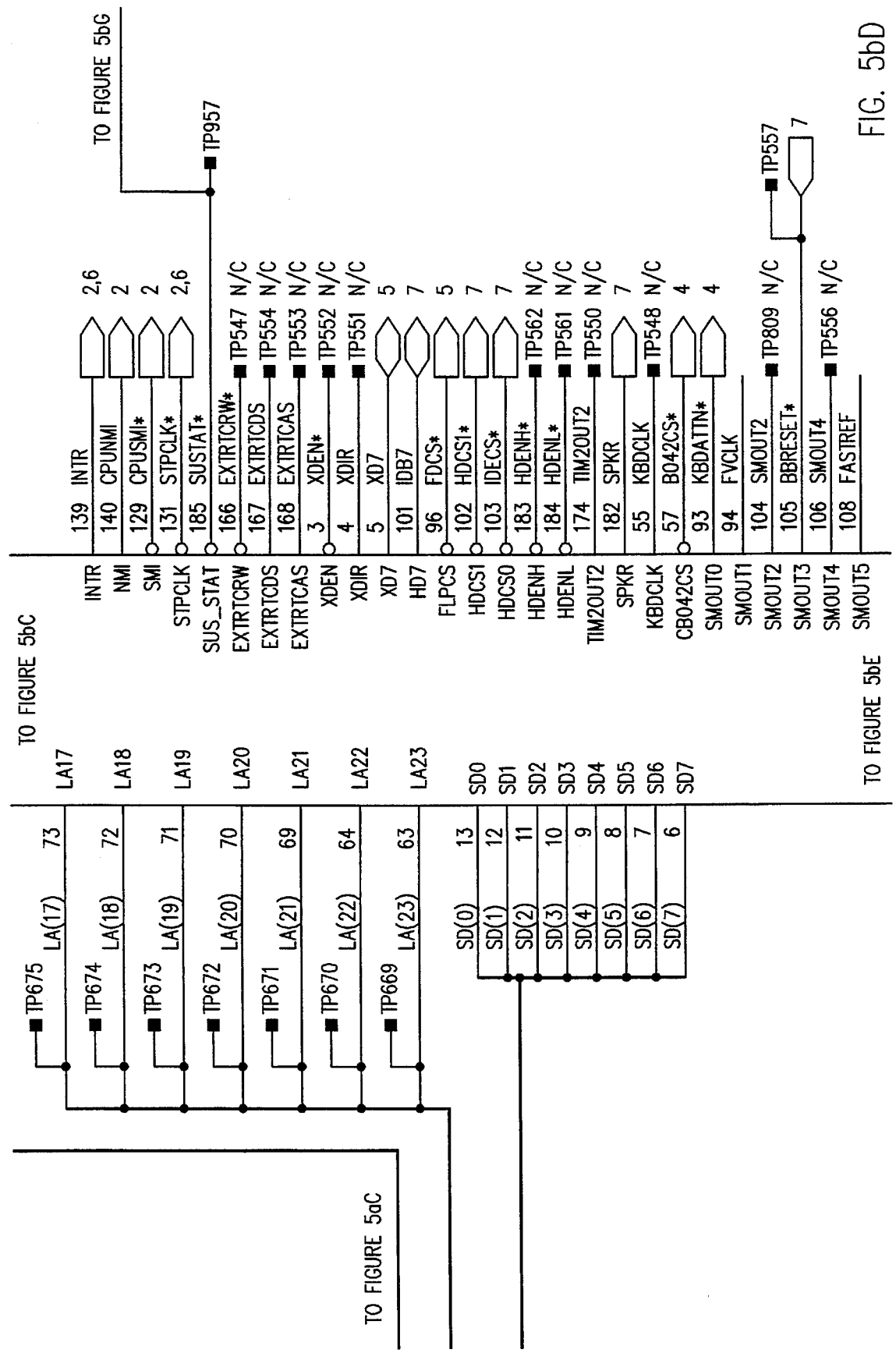
Figure 5B:
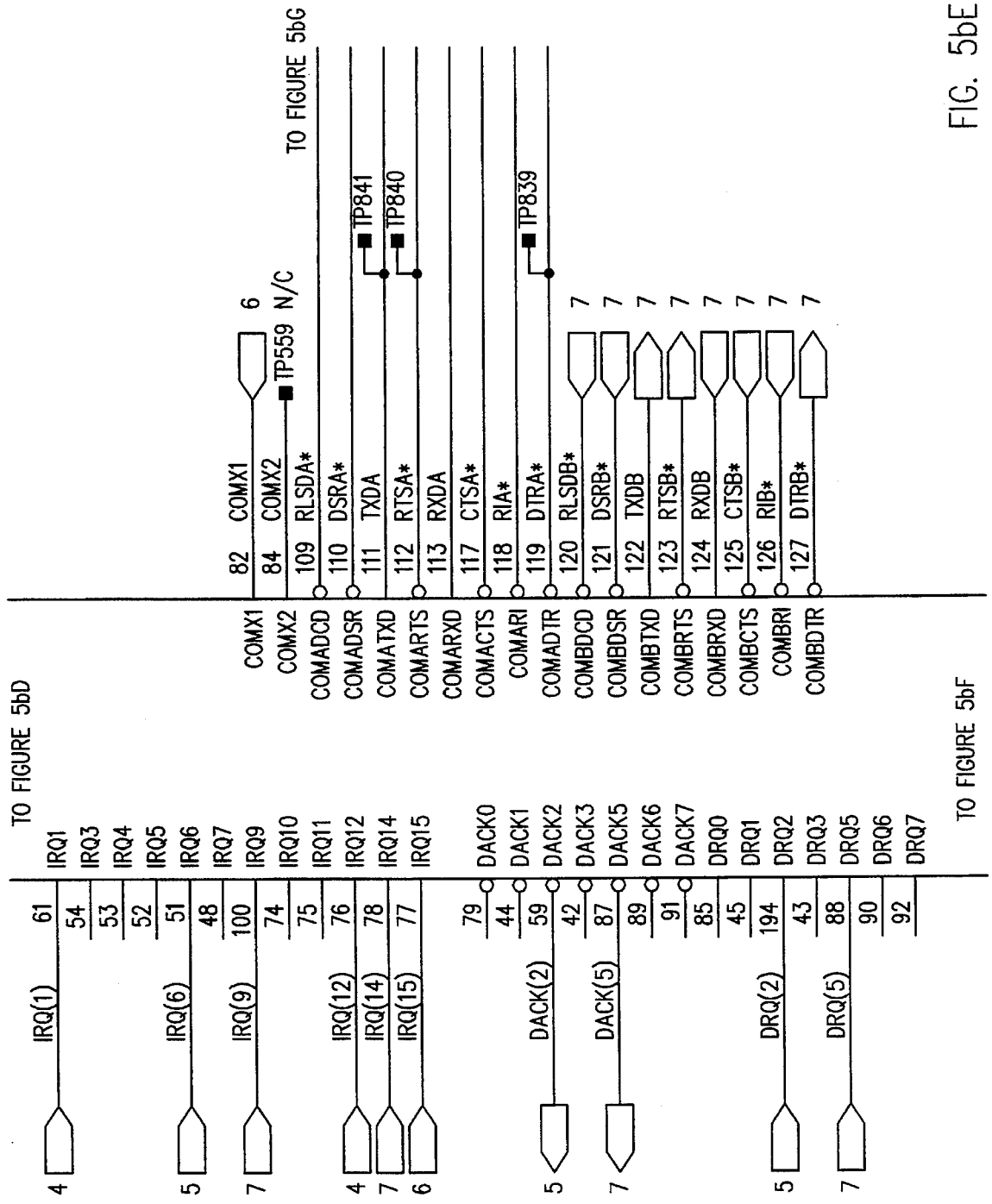
Figure 5B:
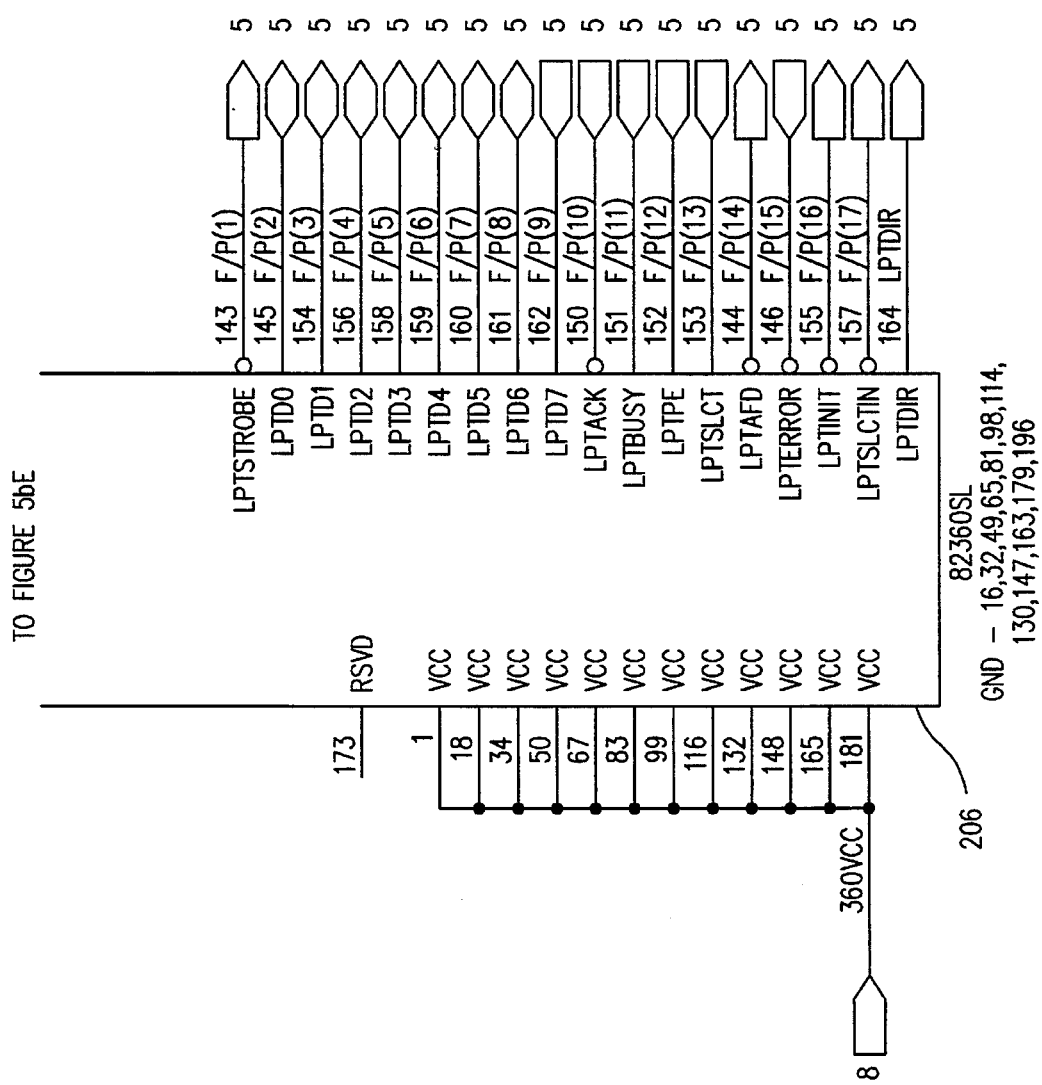
Figure 5B:
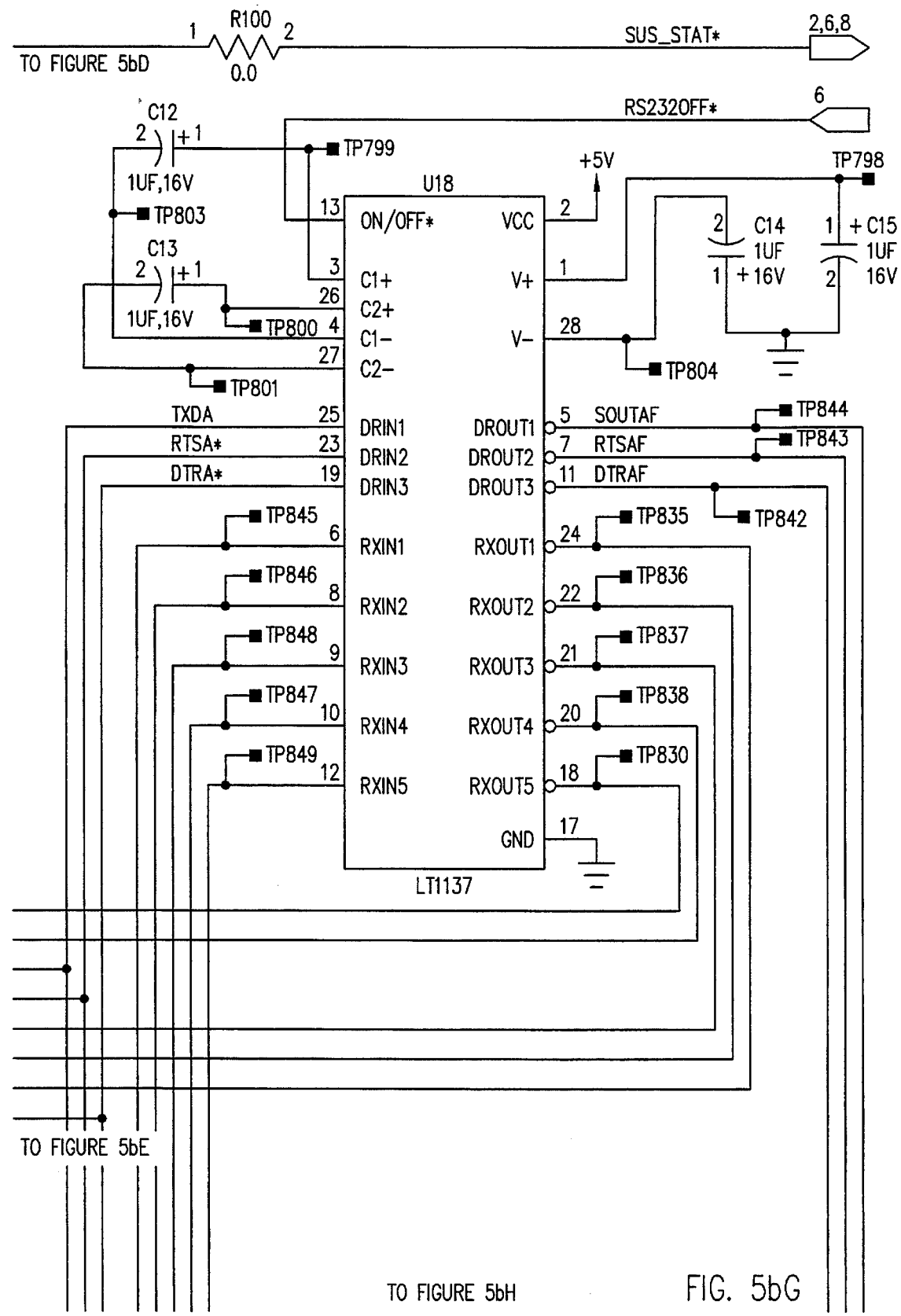
Figure 5B:
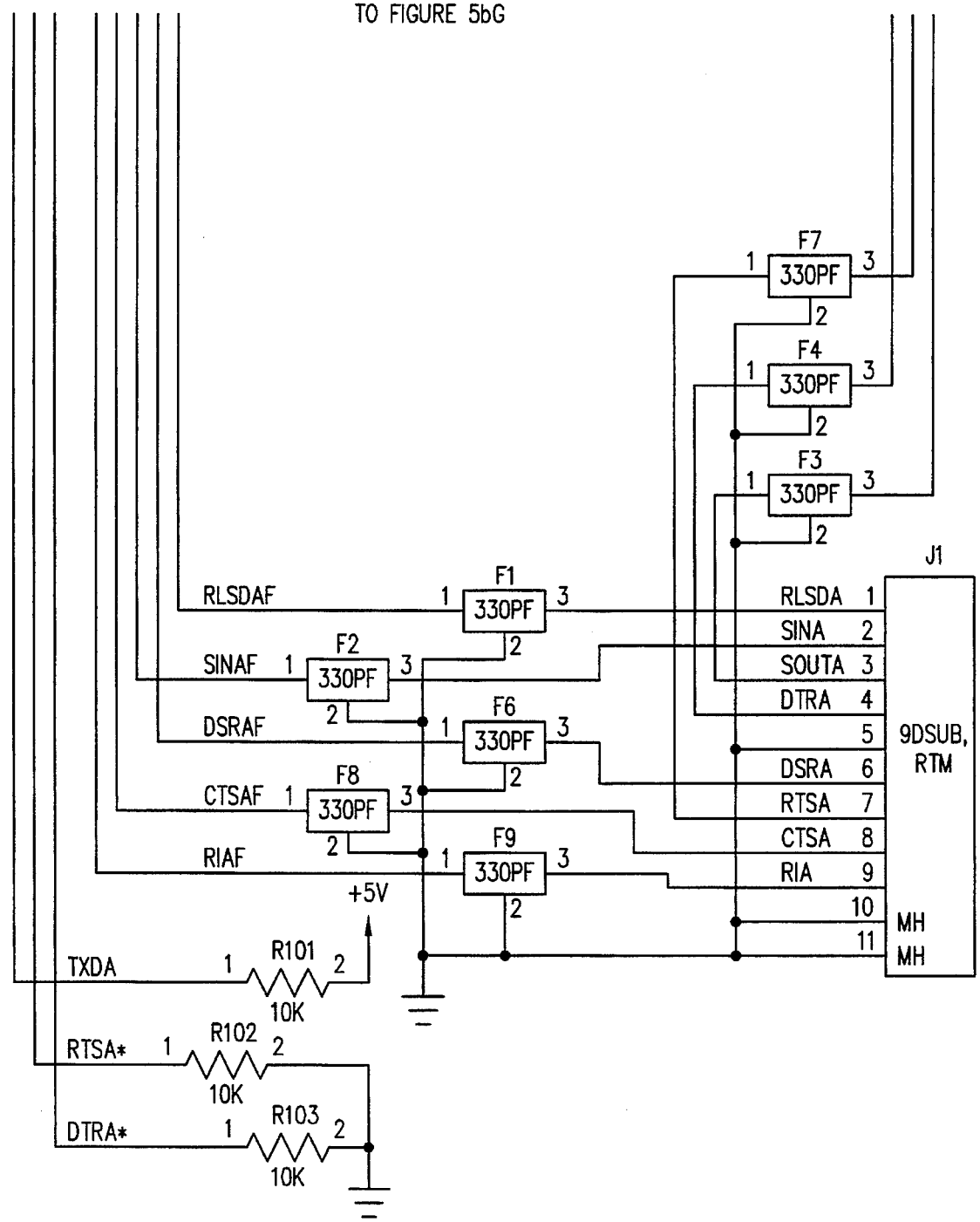
Figure 6A:
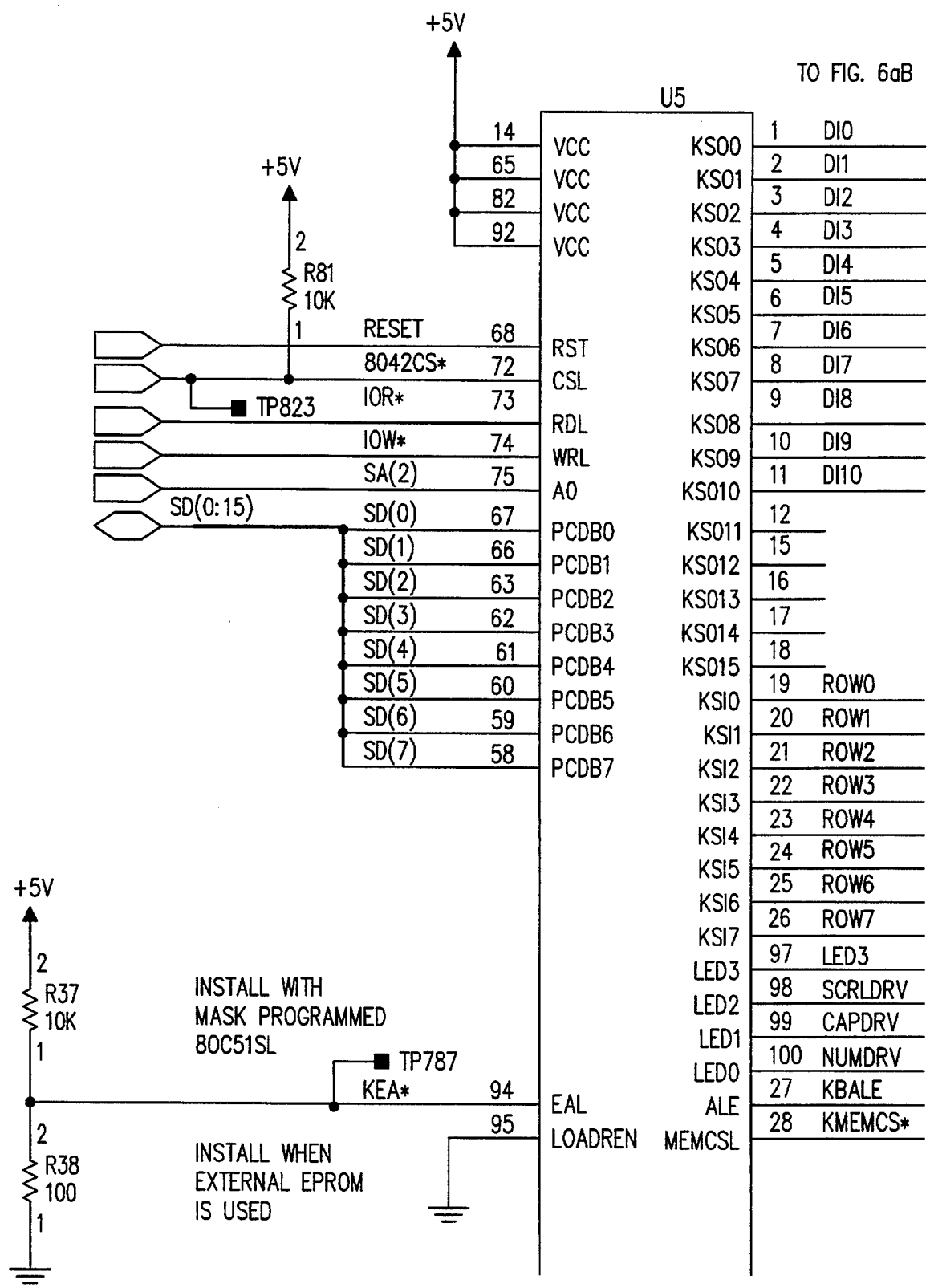
Figure 6A:
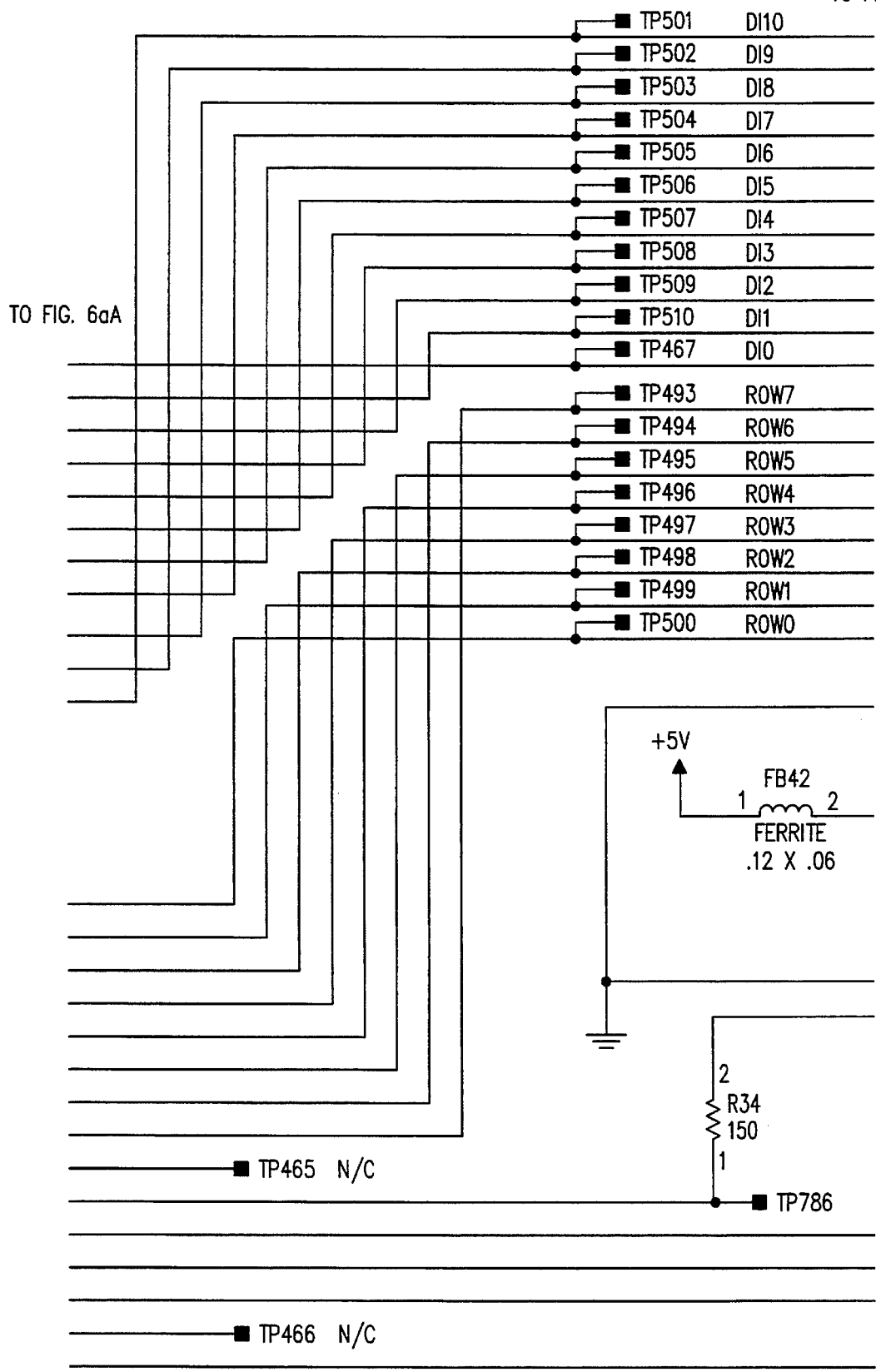
Figure 6A:
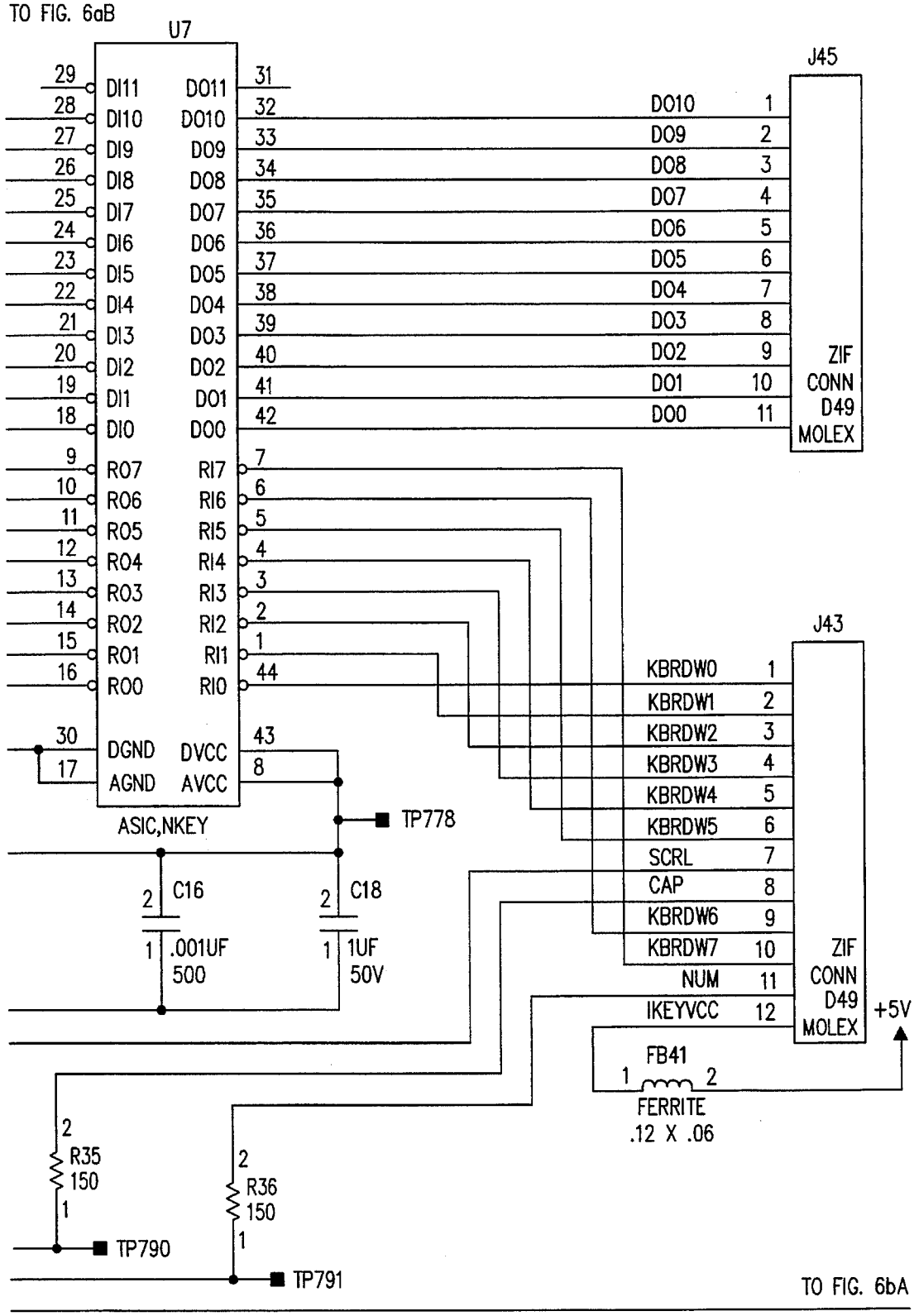
Figure 6A:
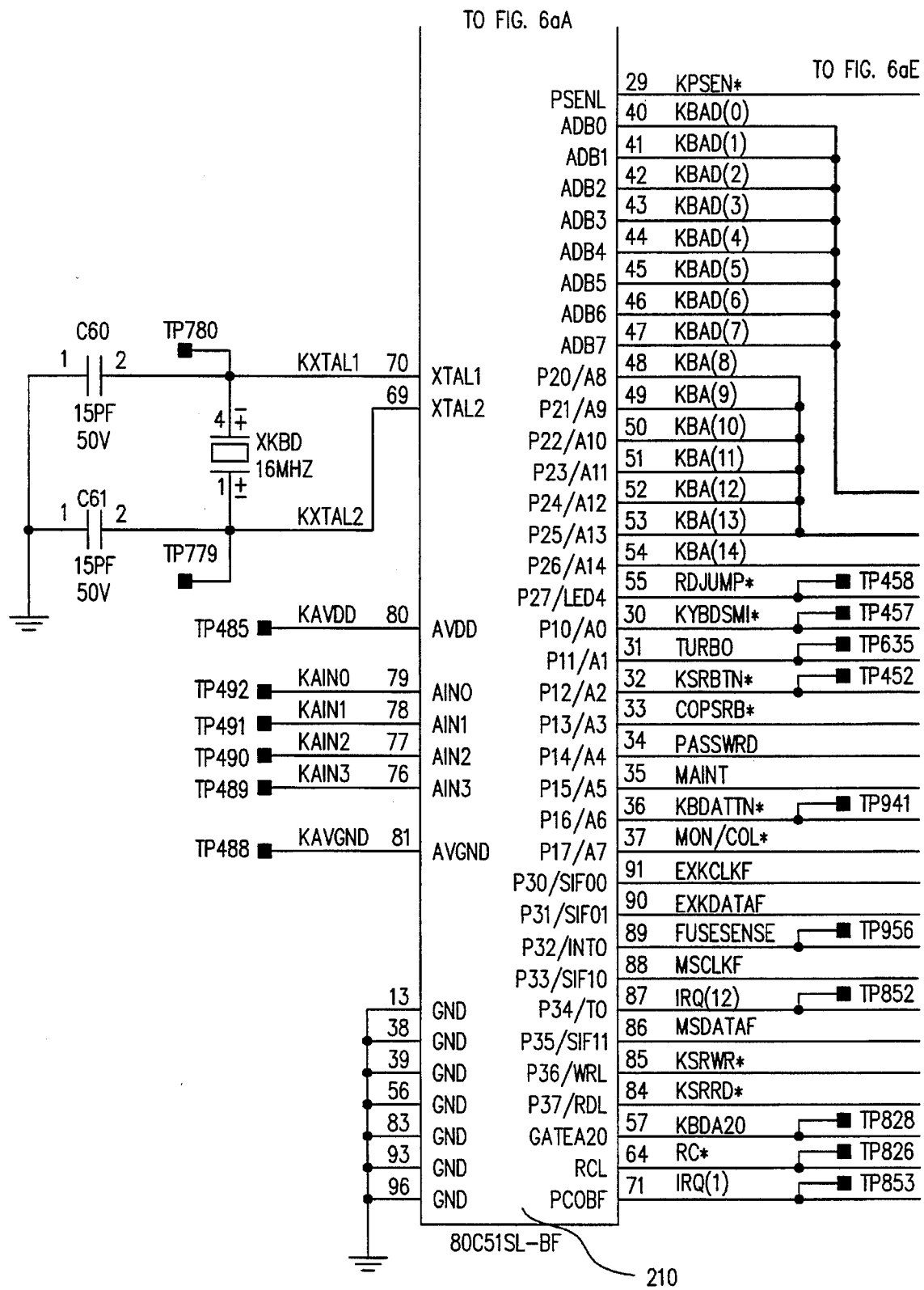
Figure 6A:
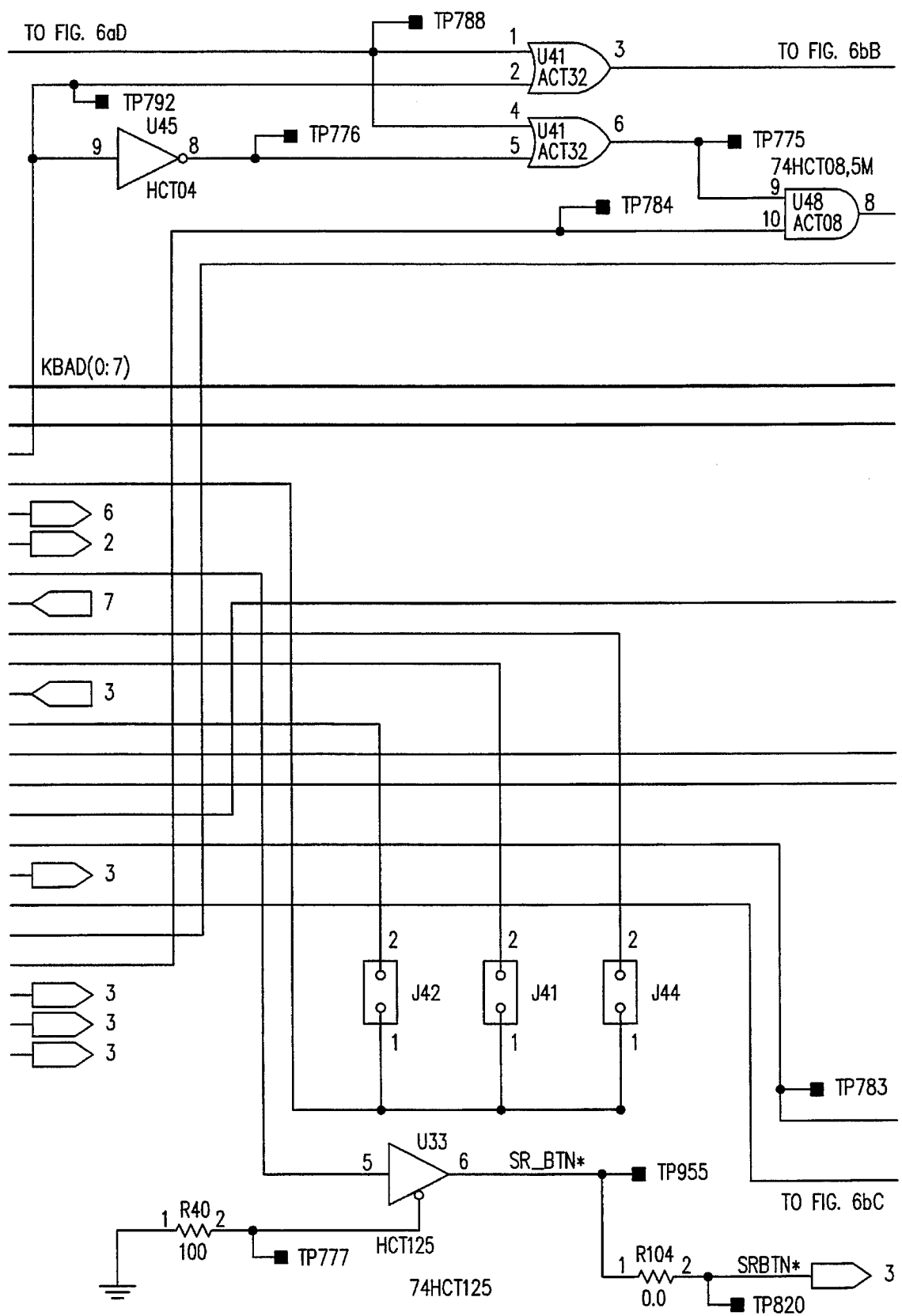
Figure 6B:
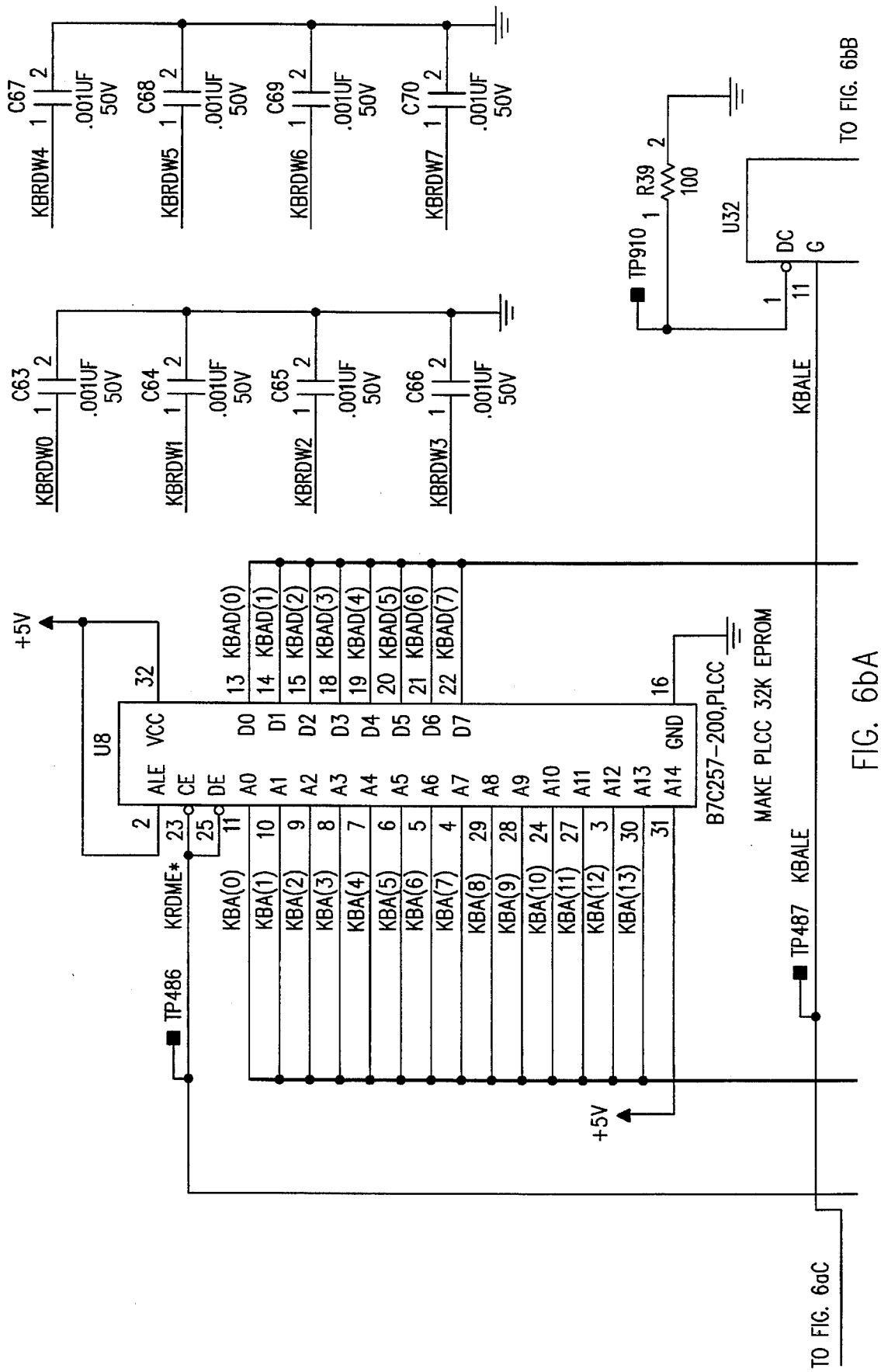
Figure 6B:
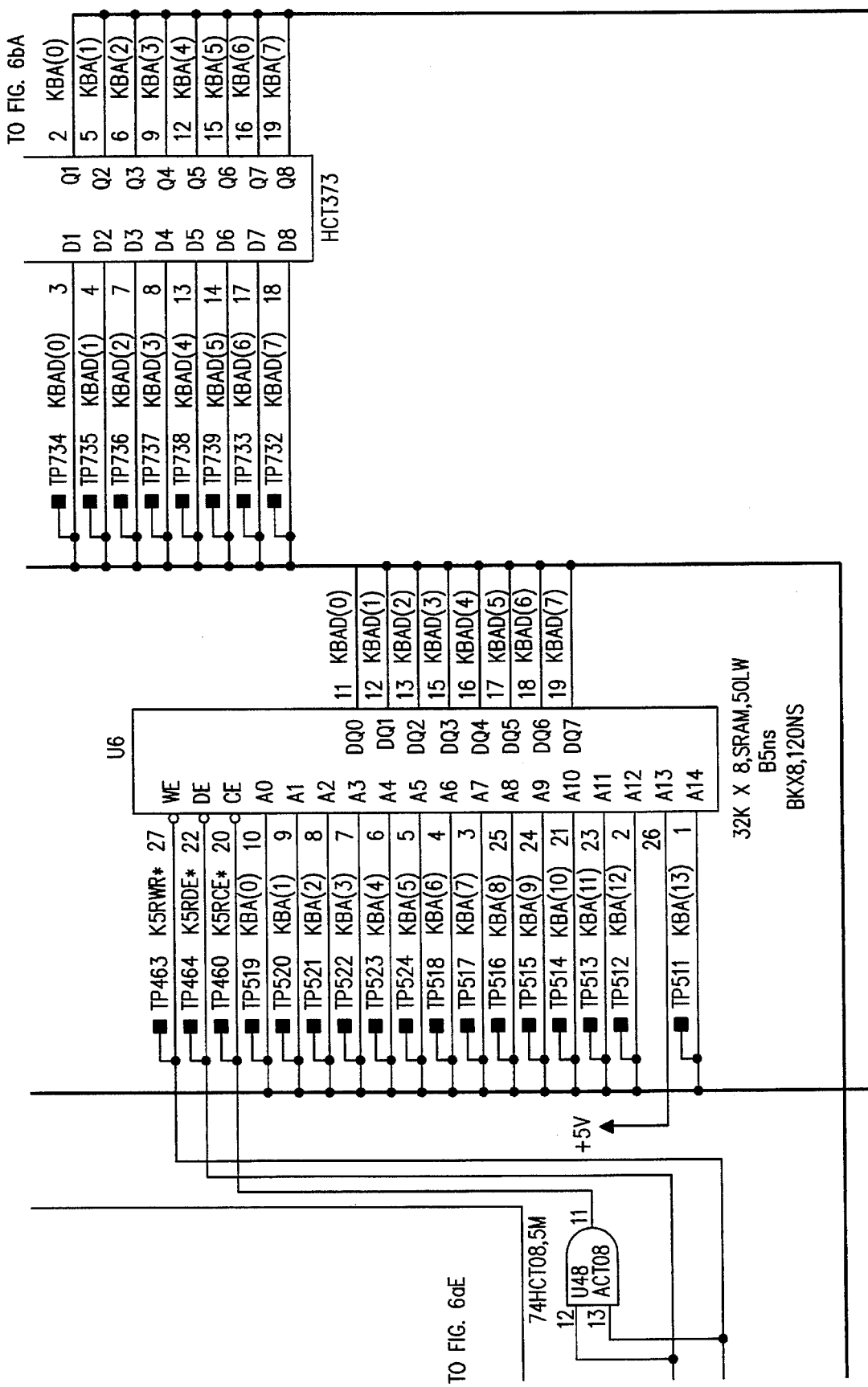
Figure 6B:
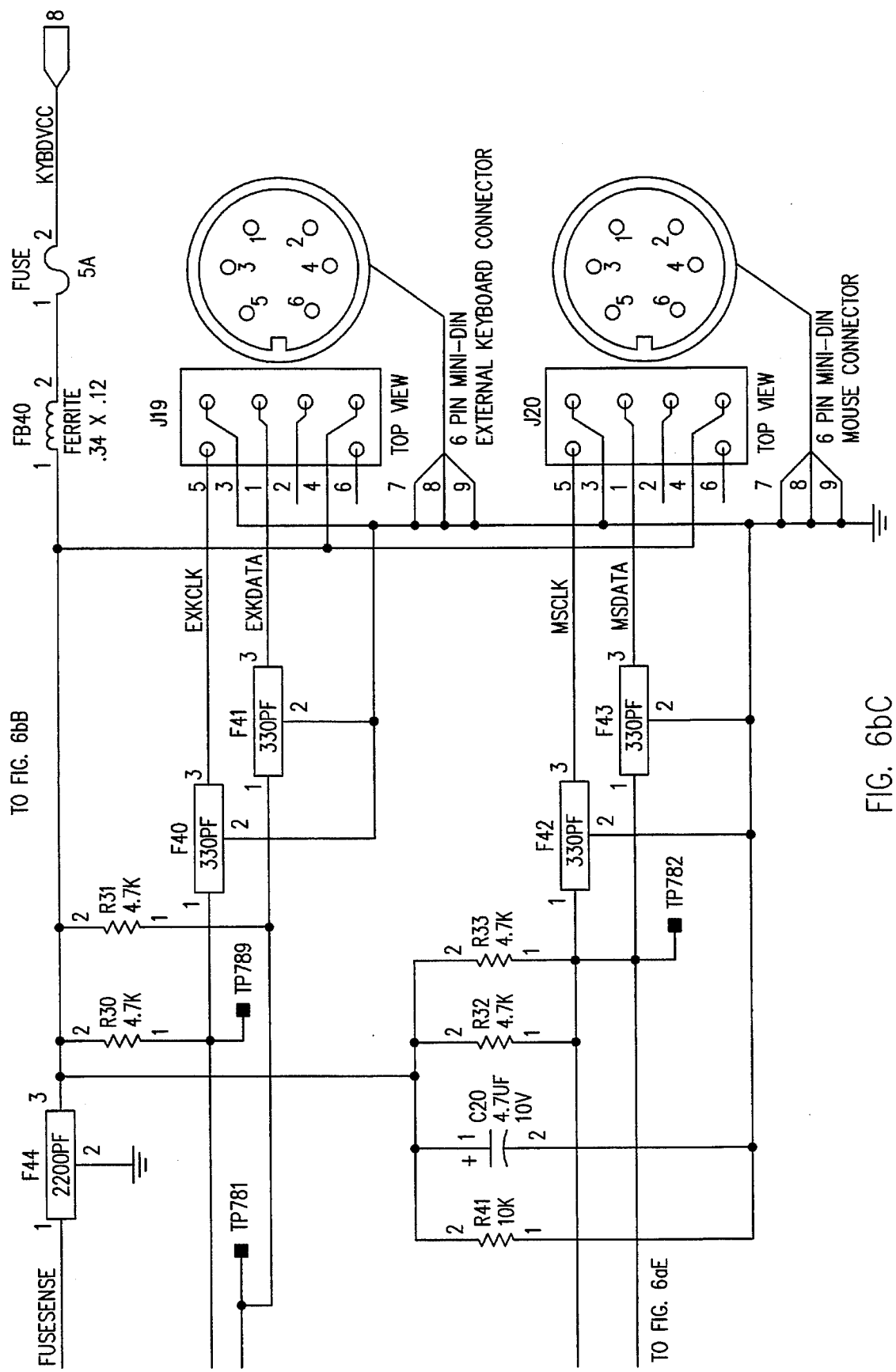
Figure 7A:
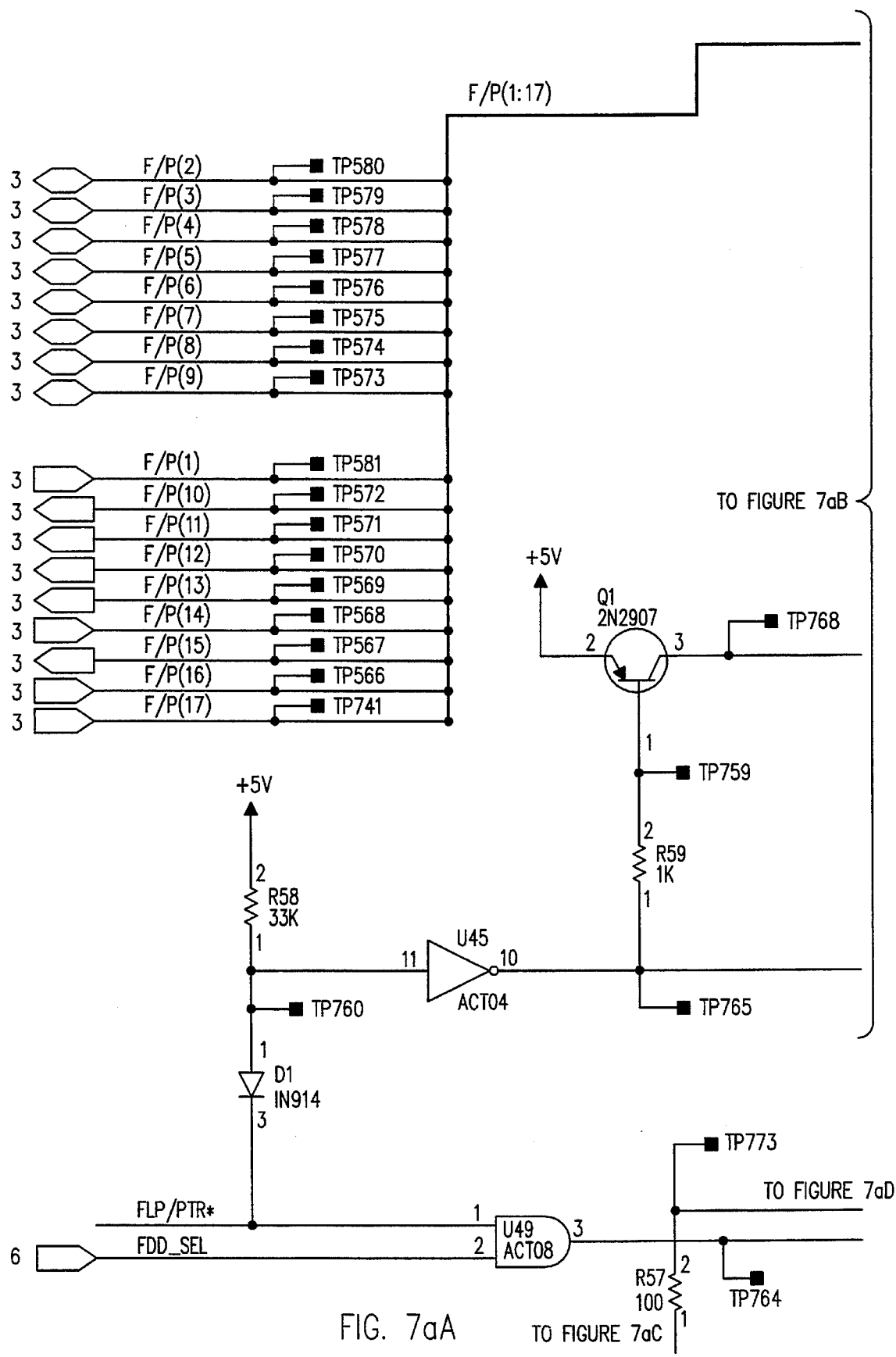
Figure 7A:
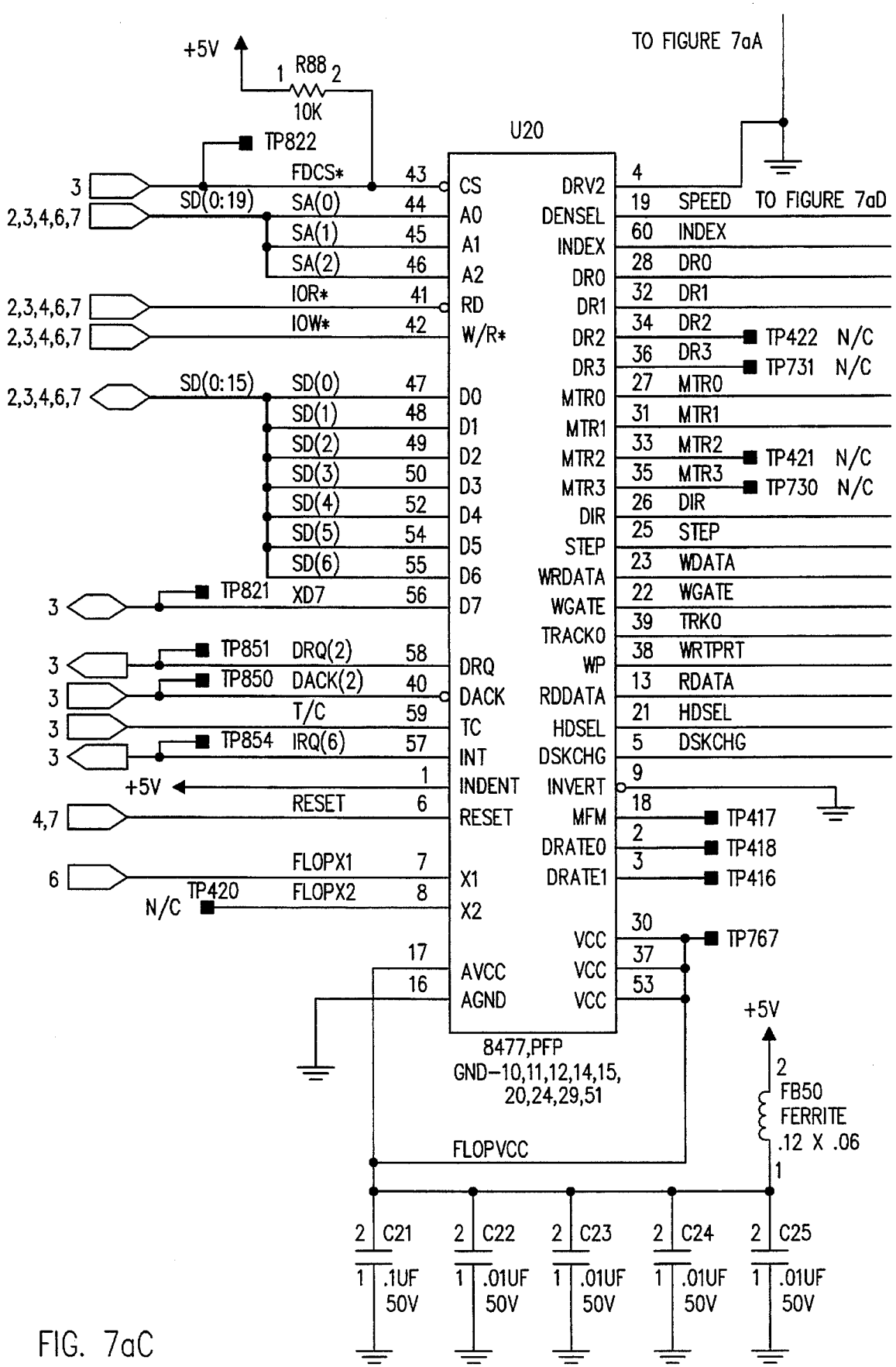
Figure 7A:
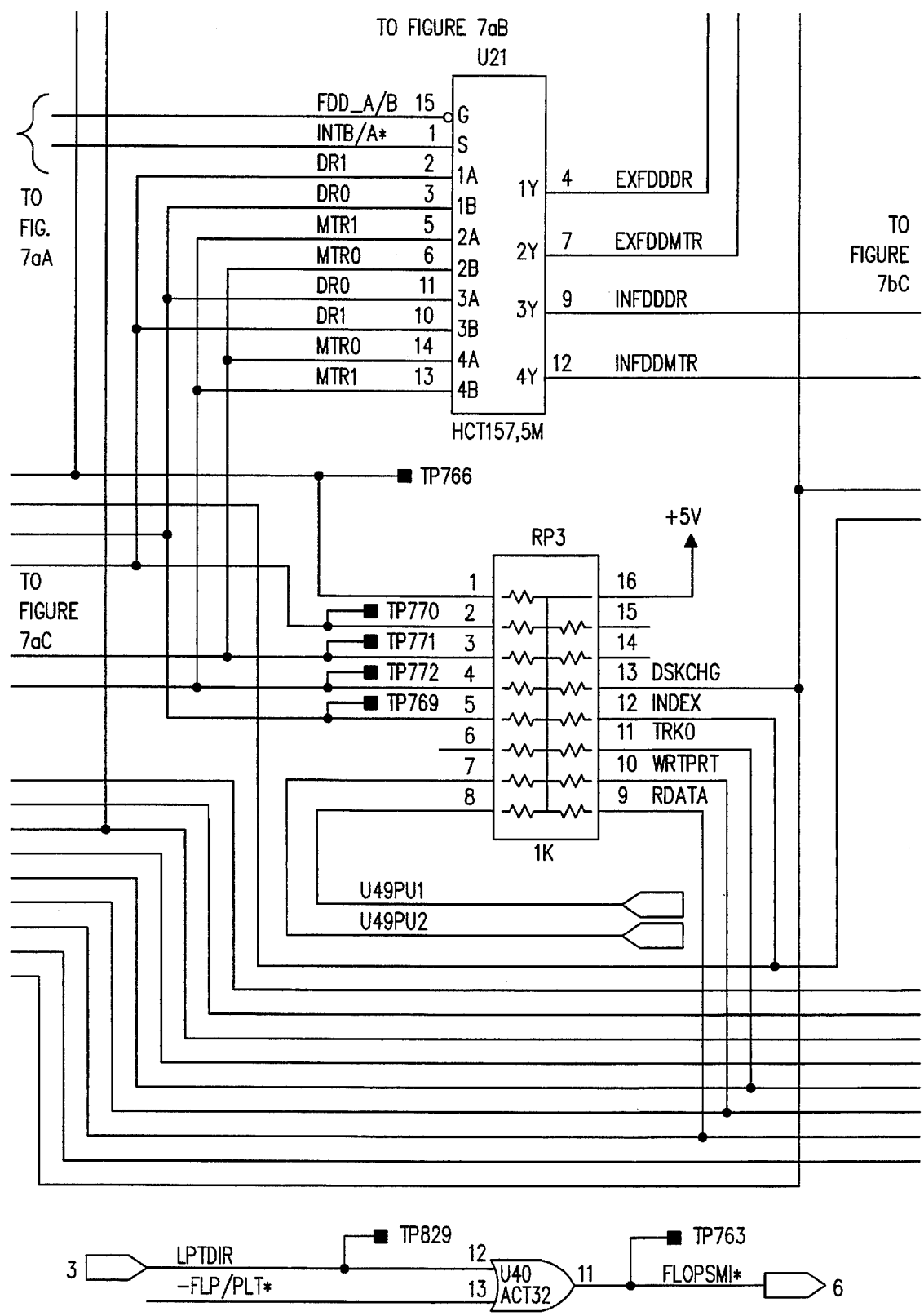
Figure 7B:
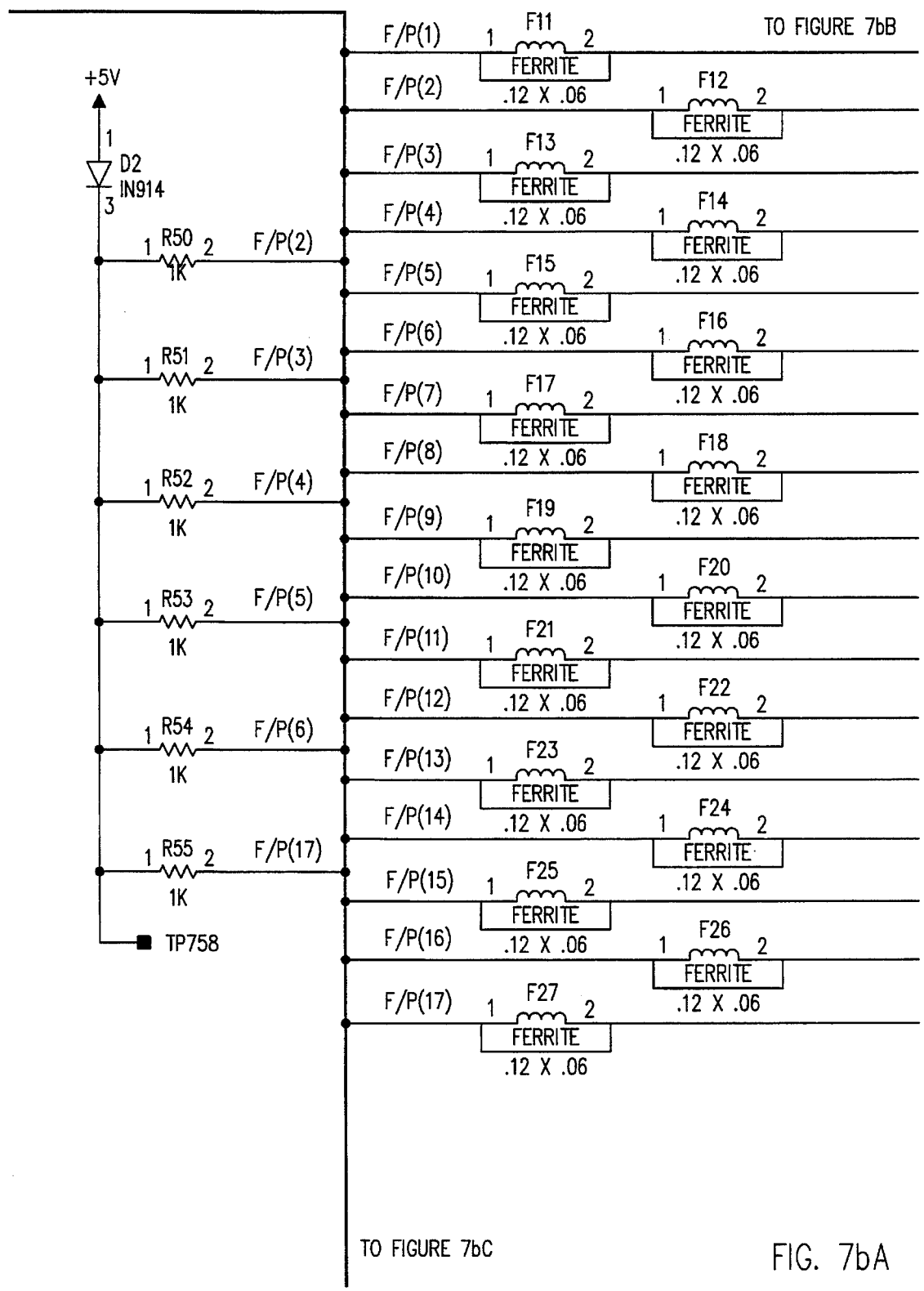
Figure 7B:
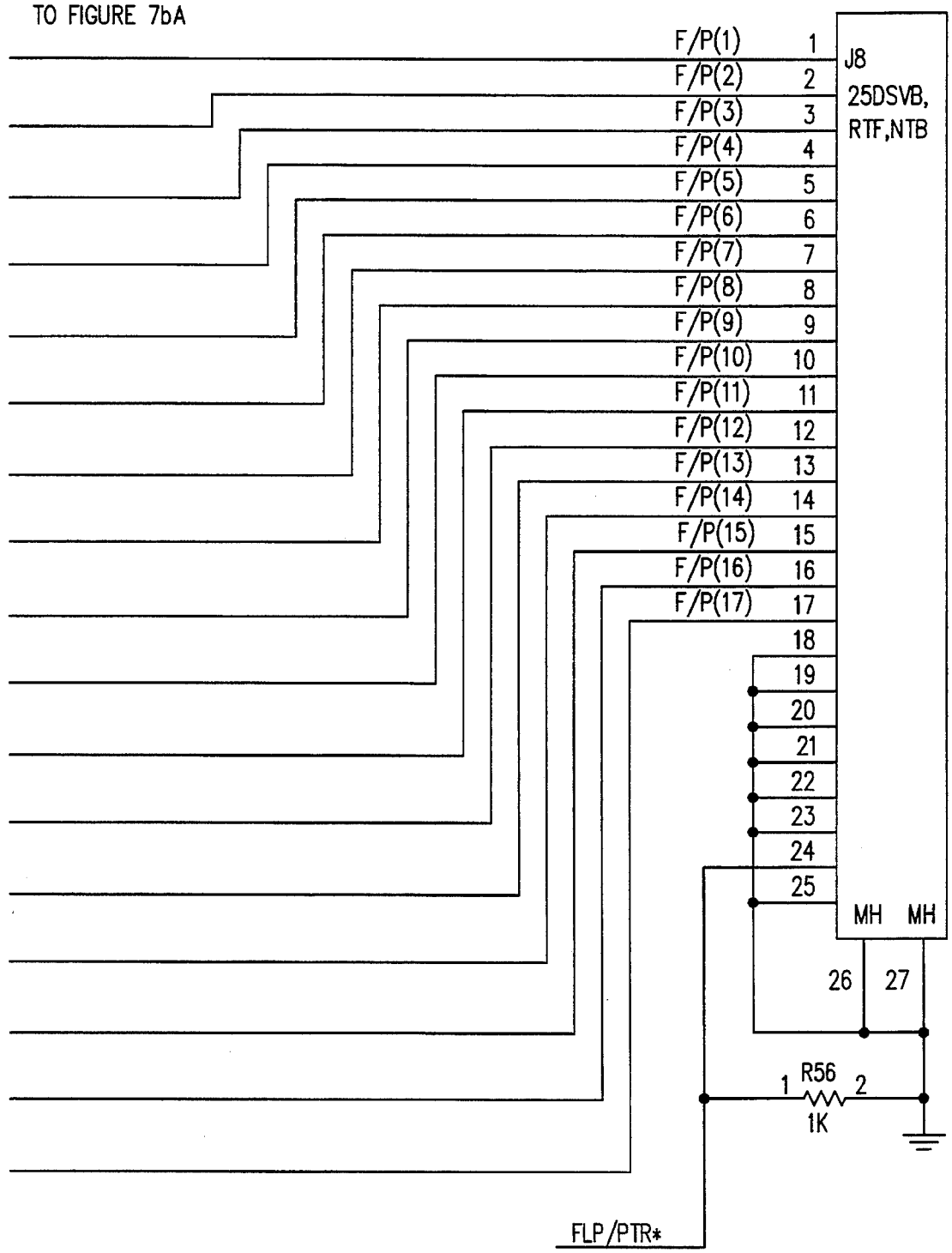
Figure 7B:
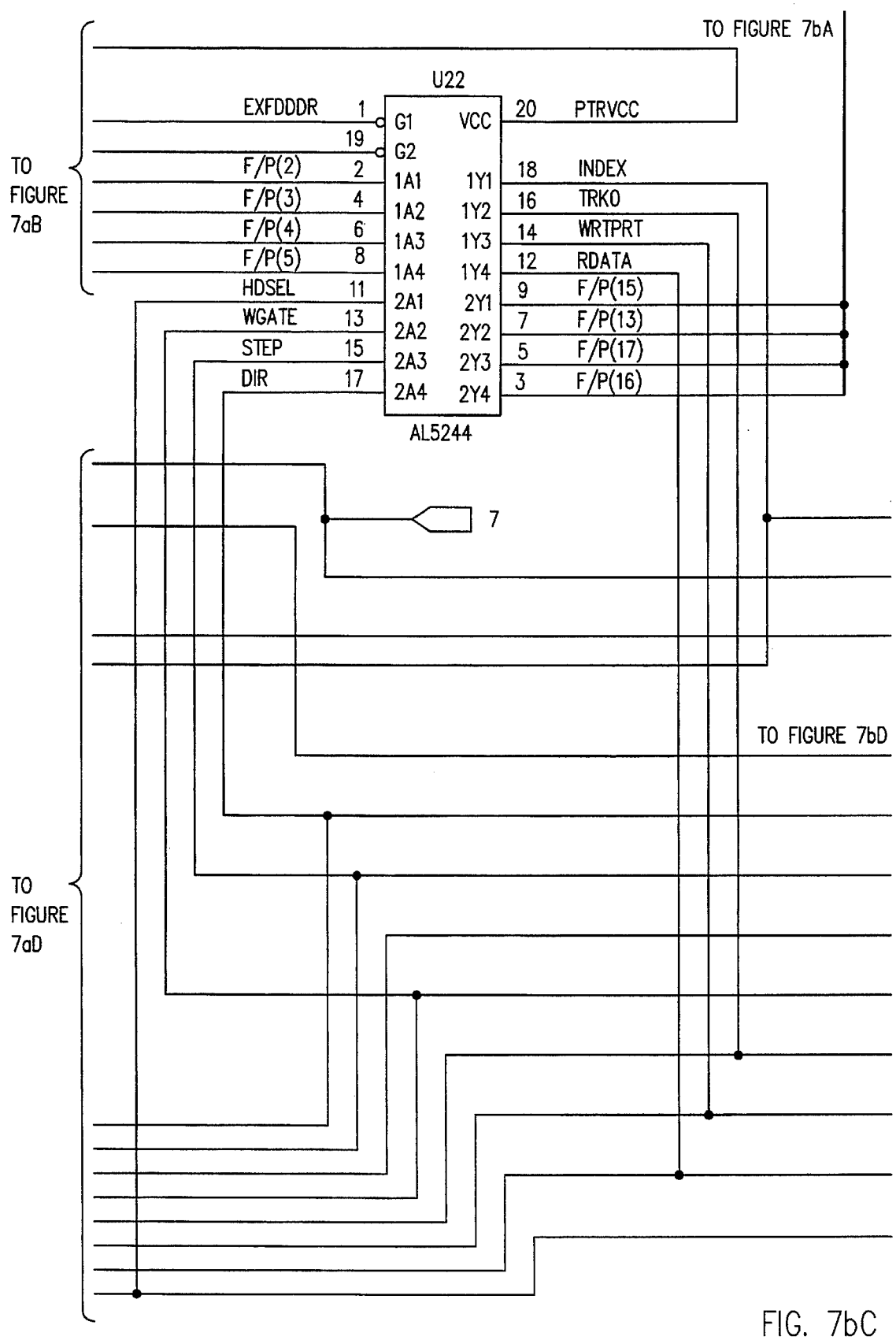
Figure 7B:
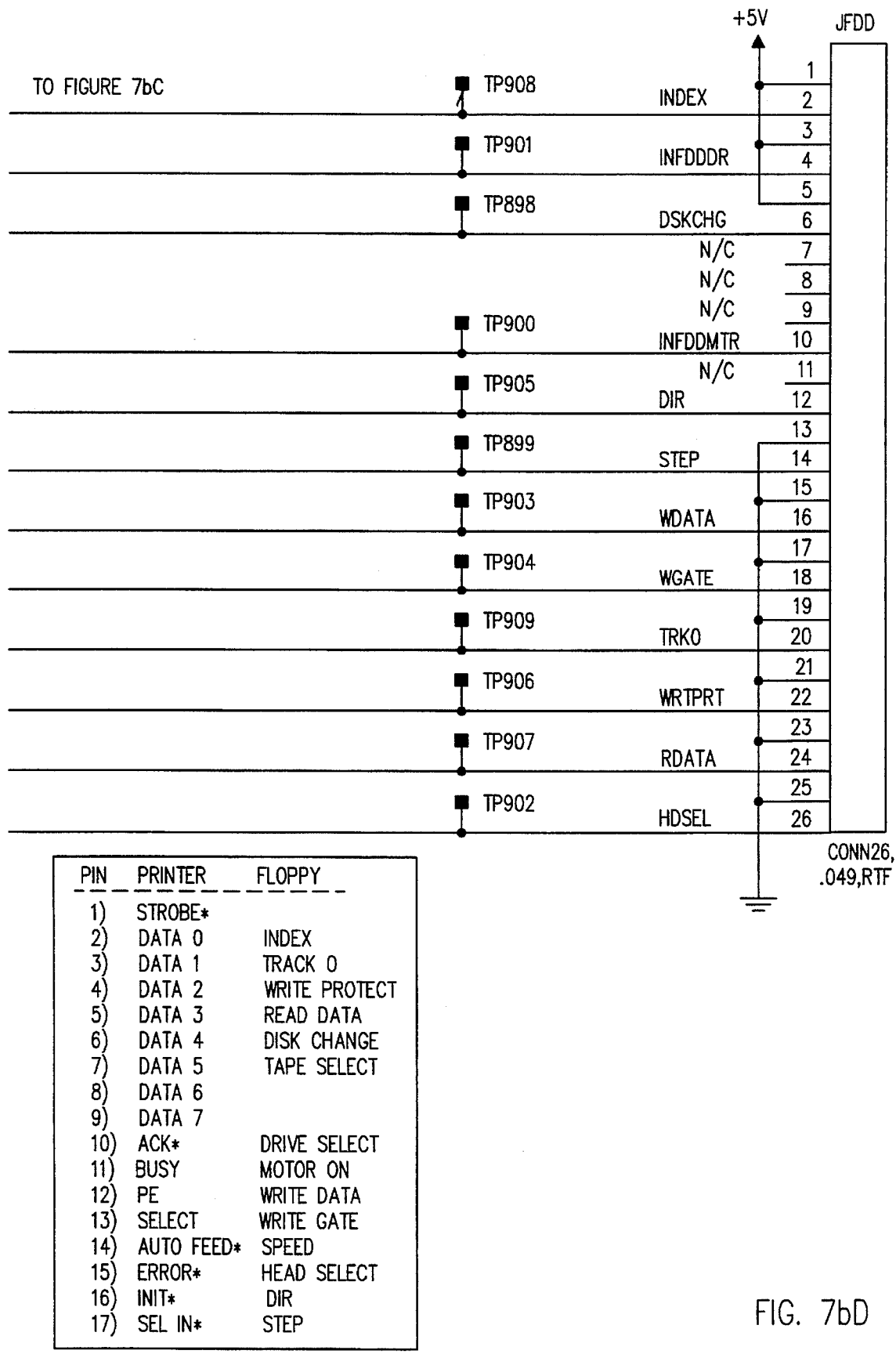
Figure 8A:
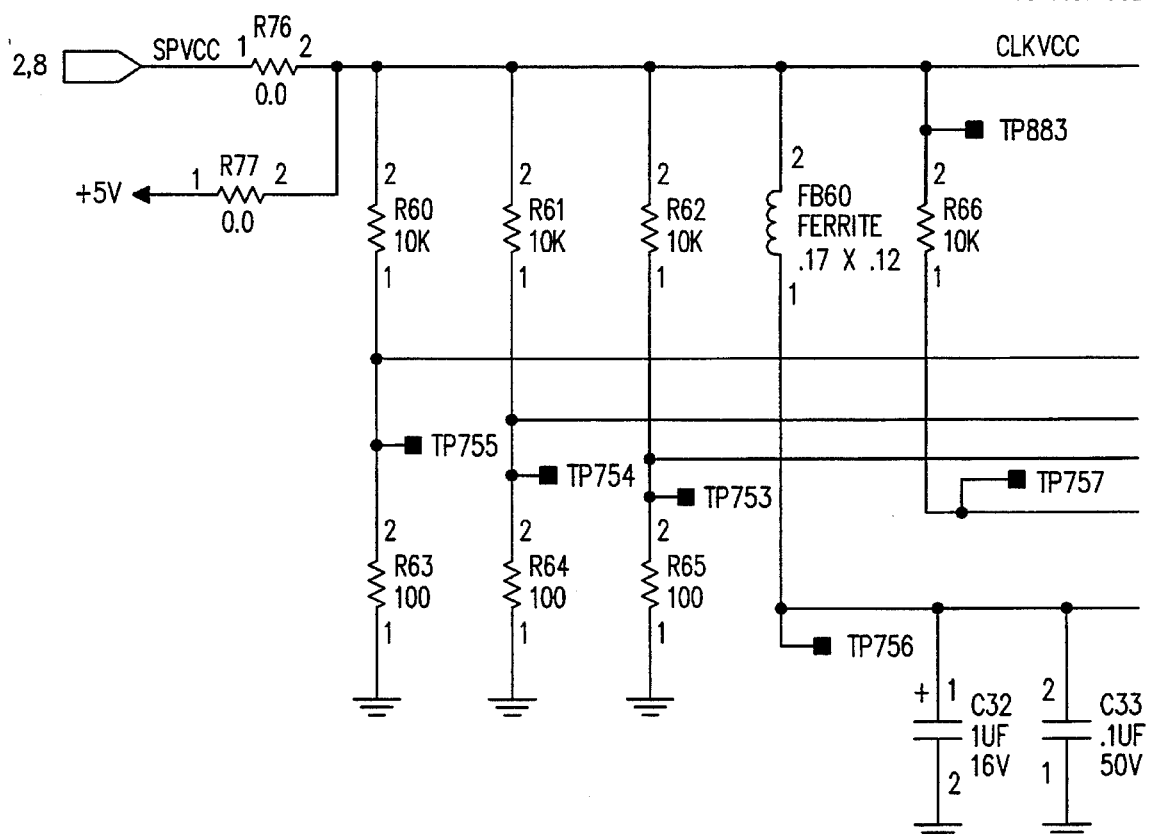
Figure 8A:
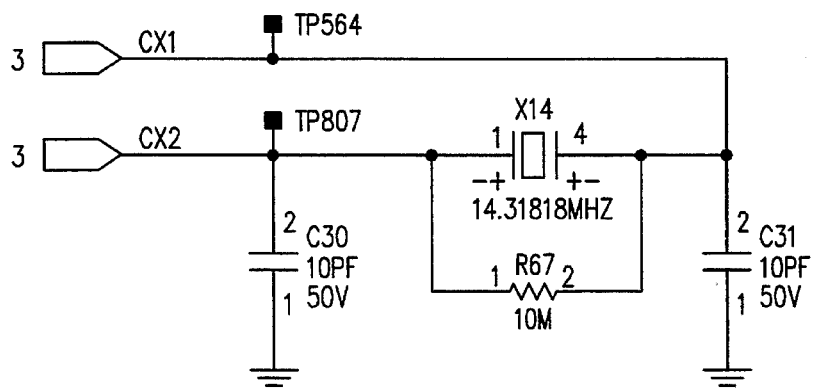
Figure 8A:
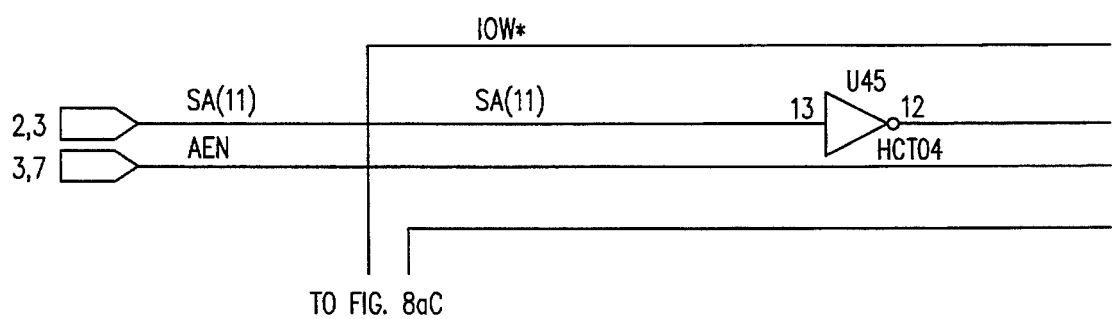
Figure 8A:
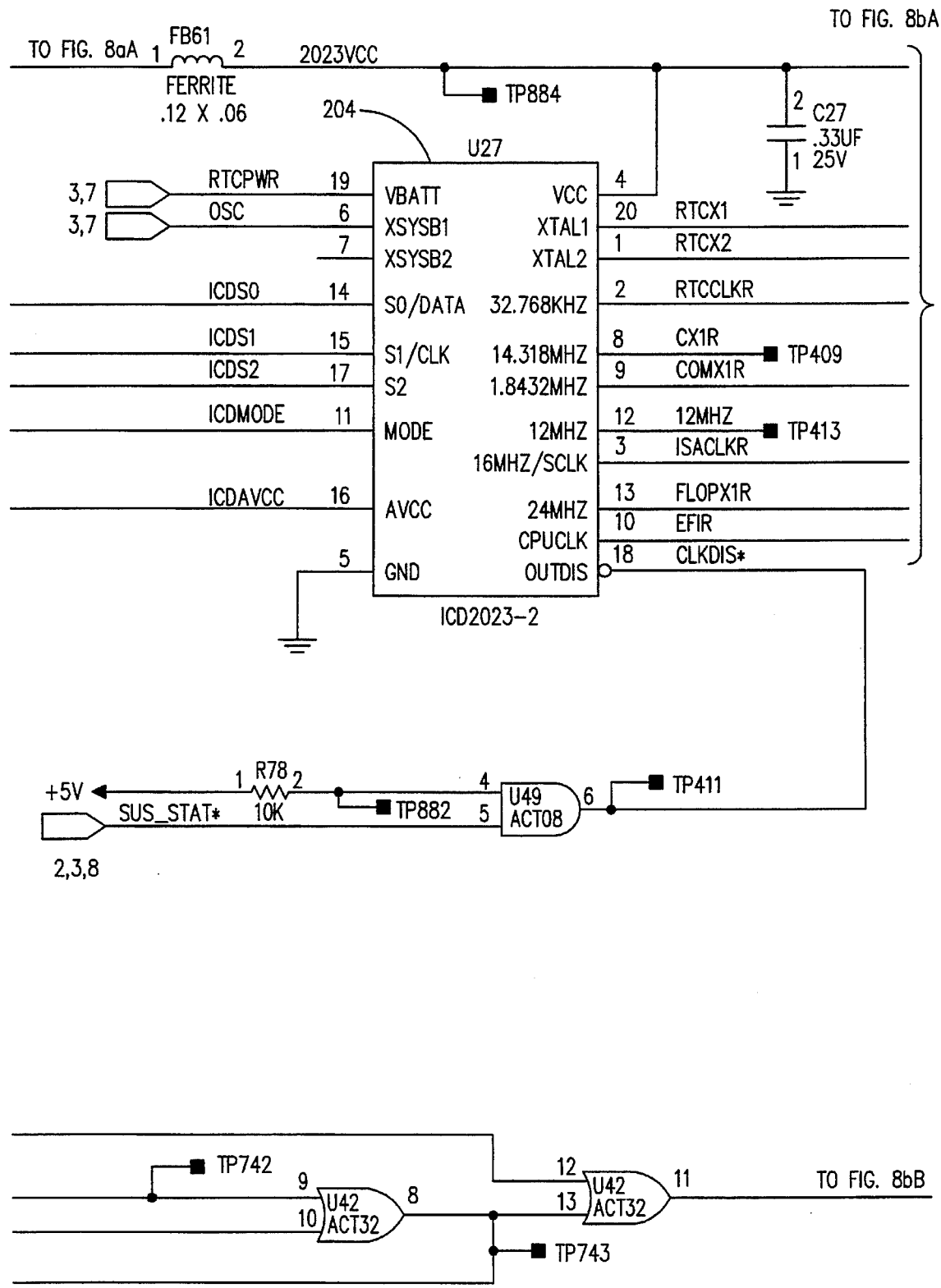
Figure 8A:
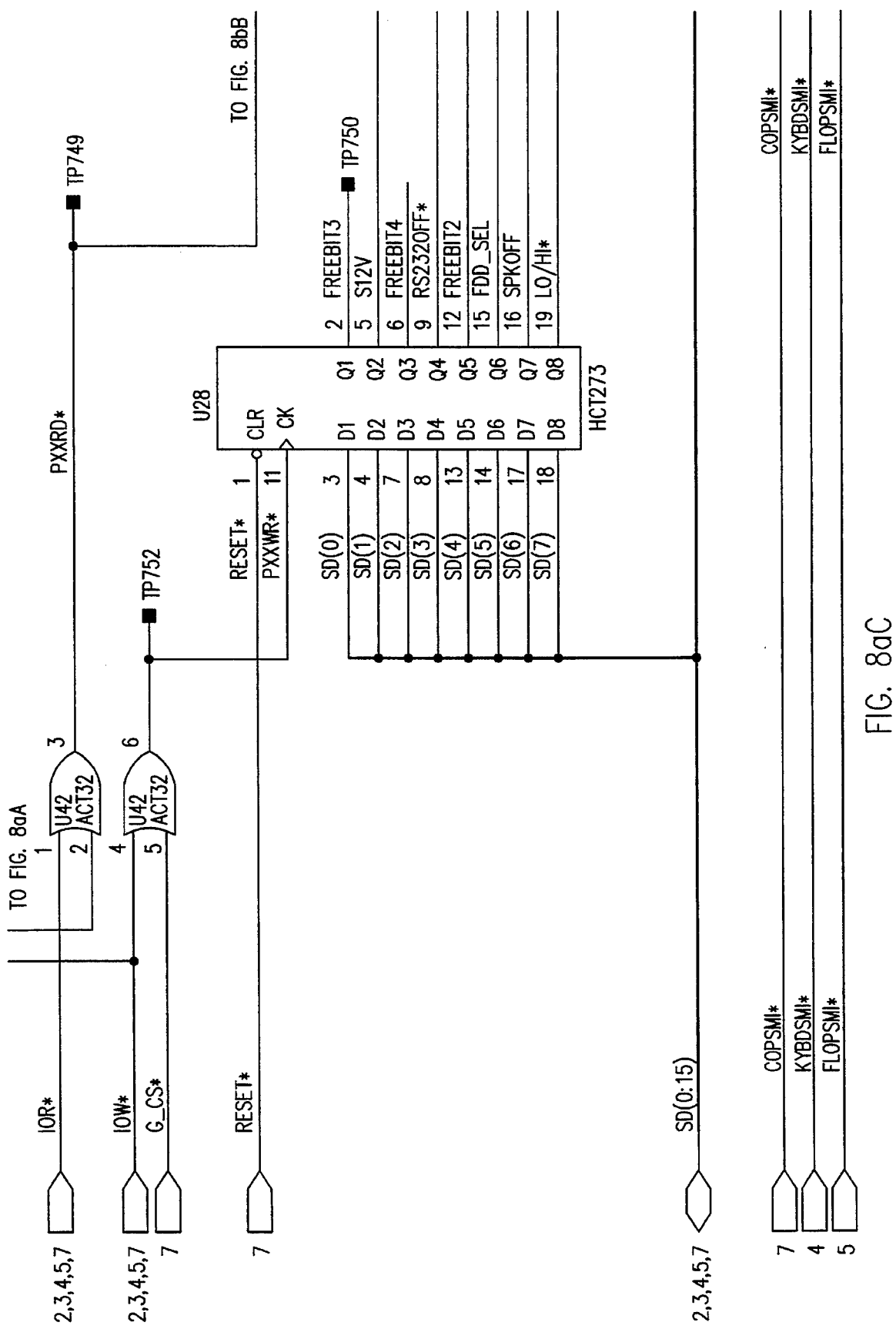
Figure 8B:
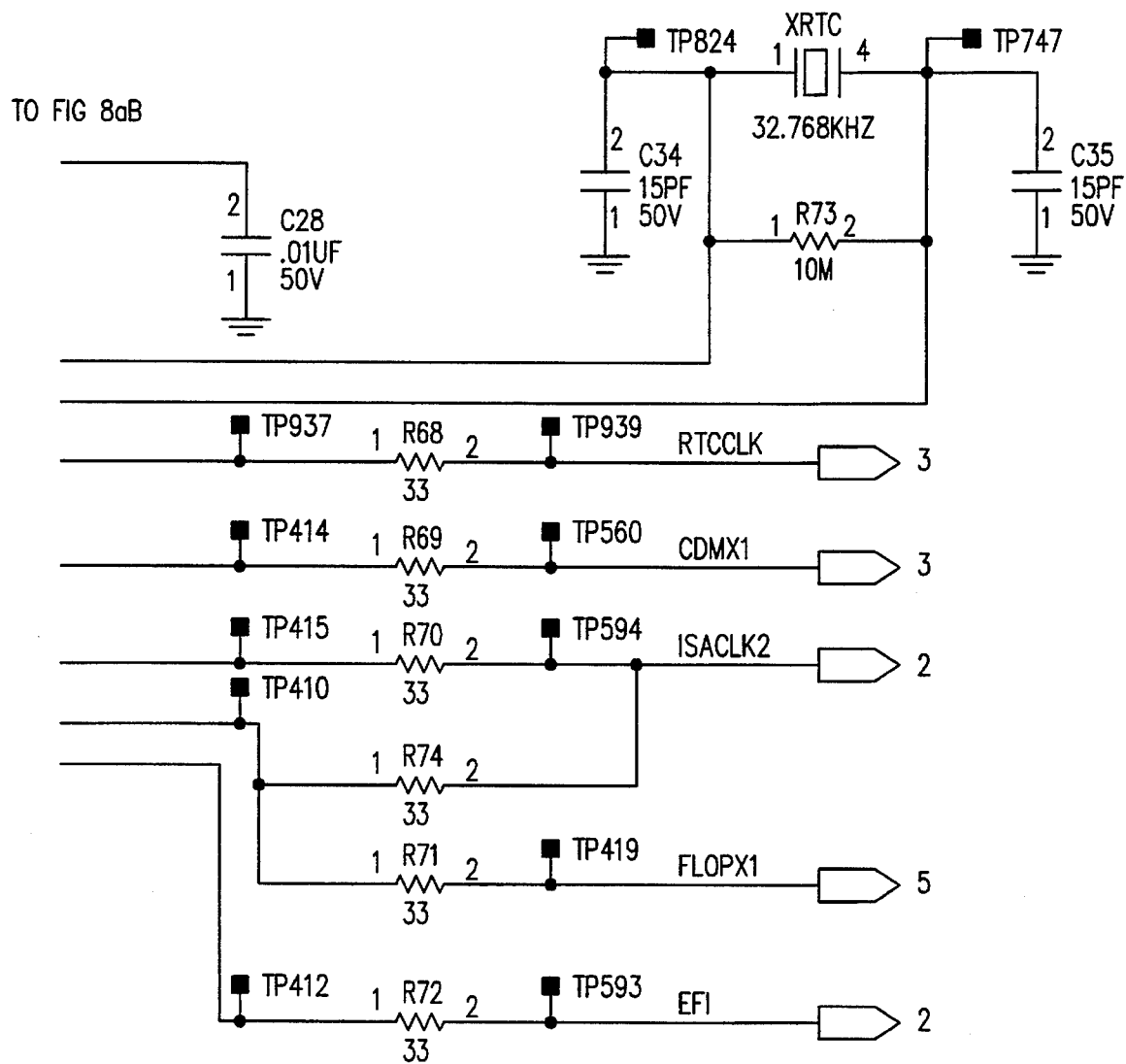
Figure 8B:
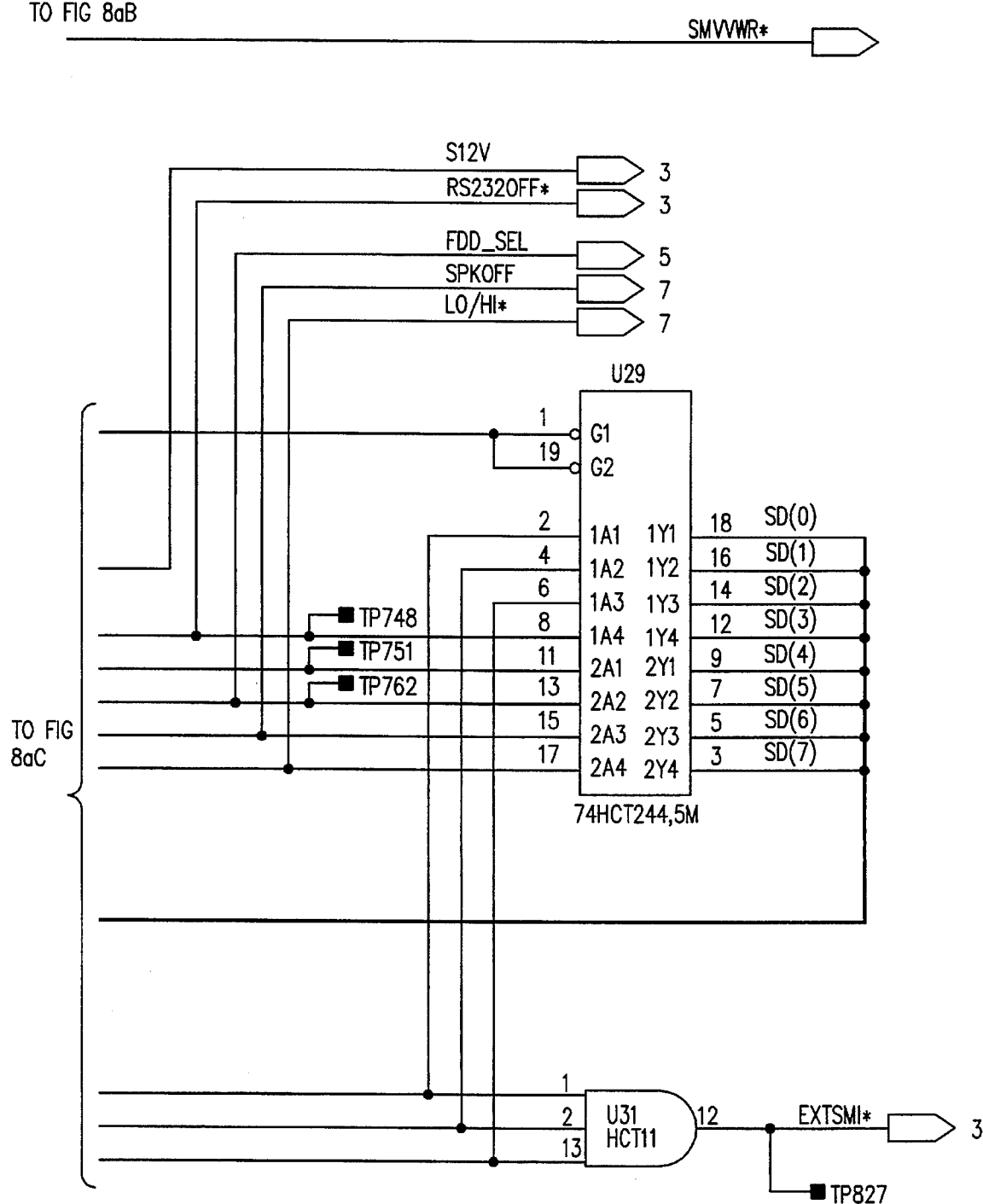
Figure 8B:
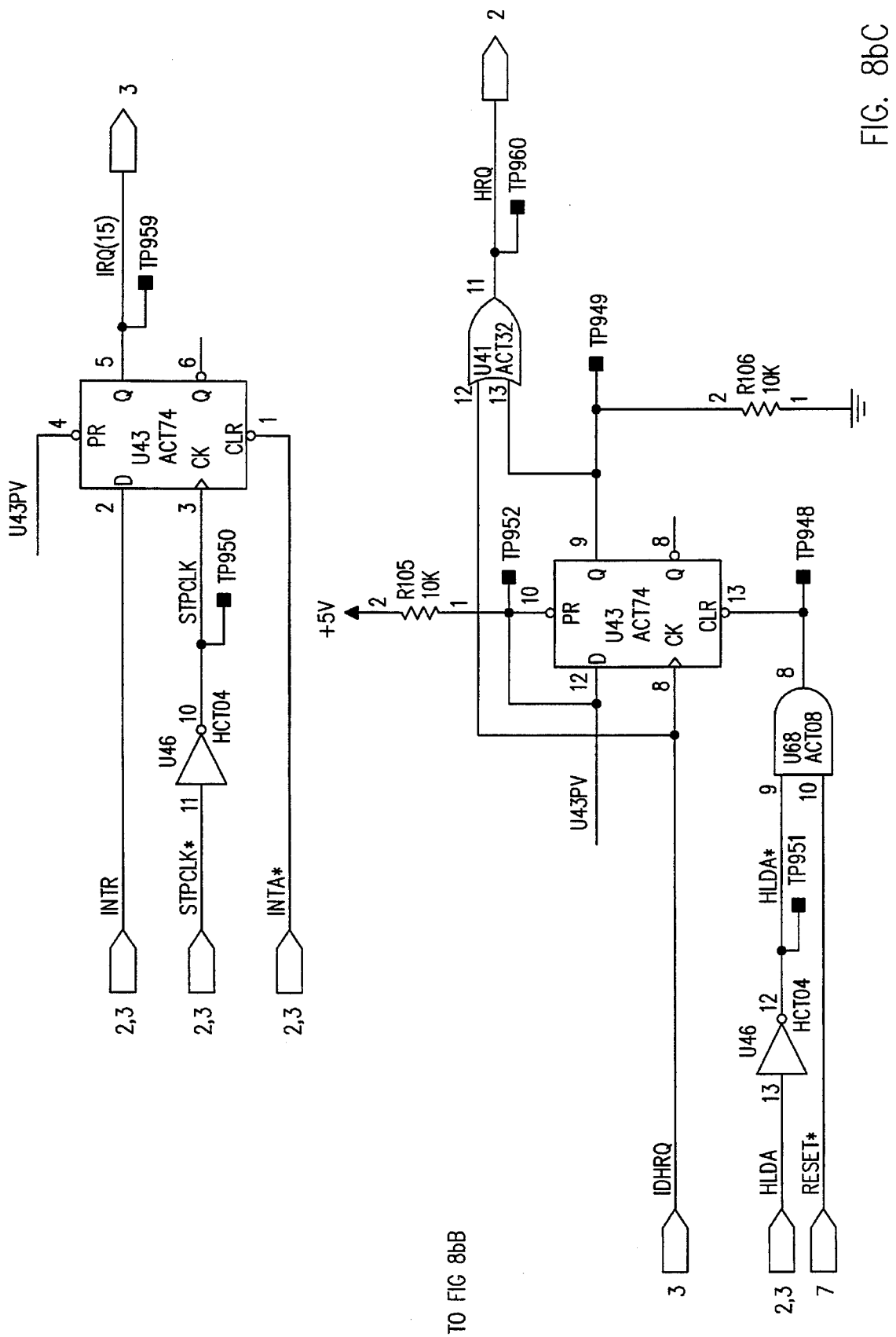
Figure 9A:
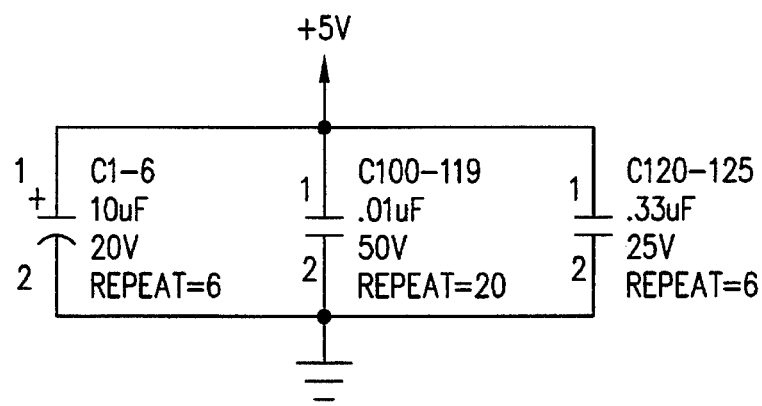
Figure 9A:
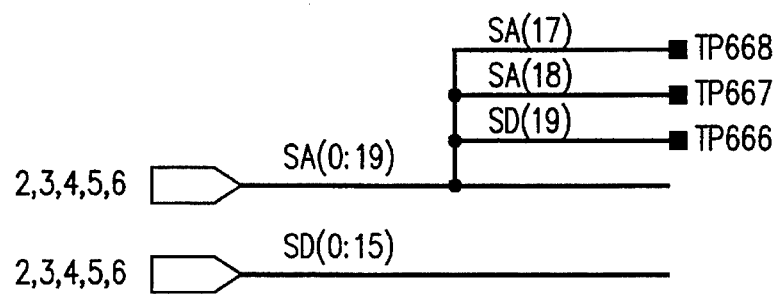
Figure 9A:
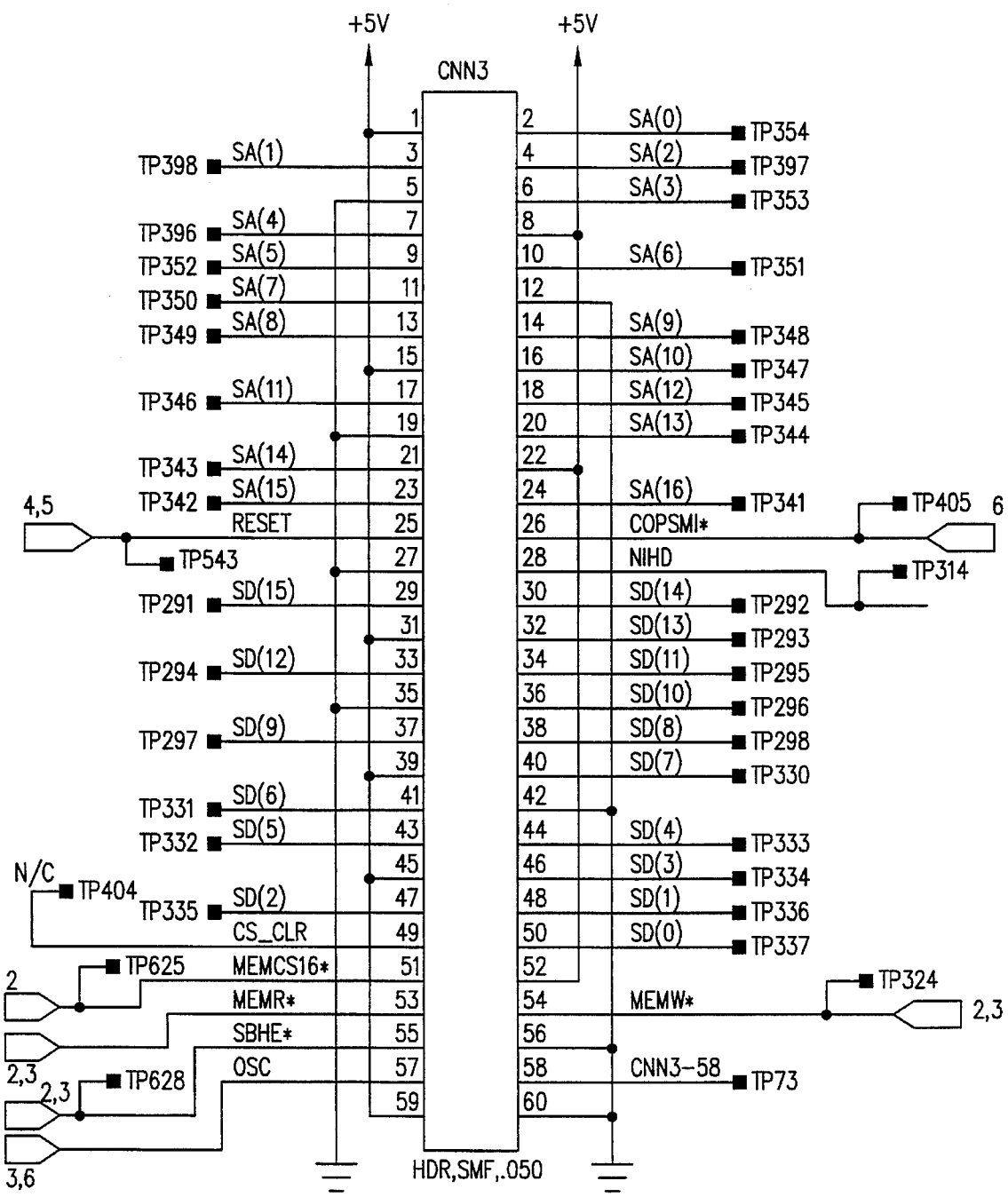
Figure 9B:
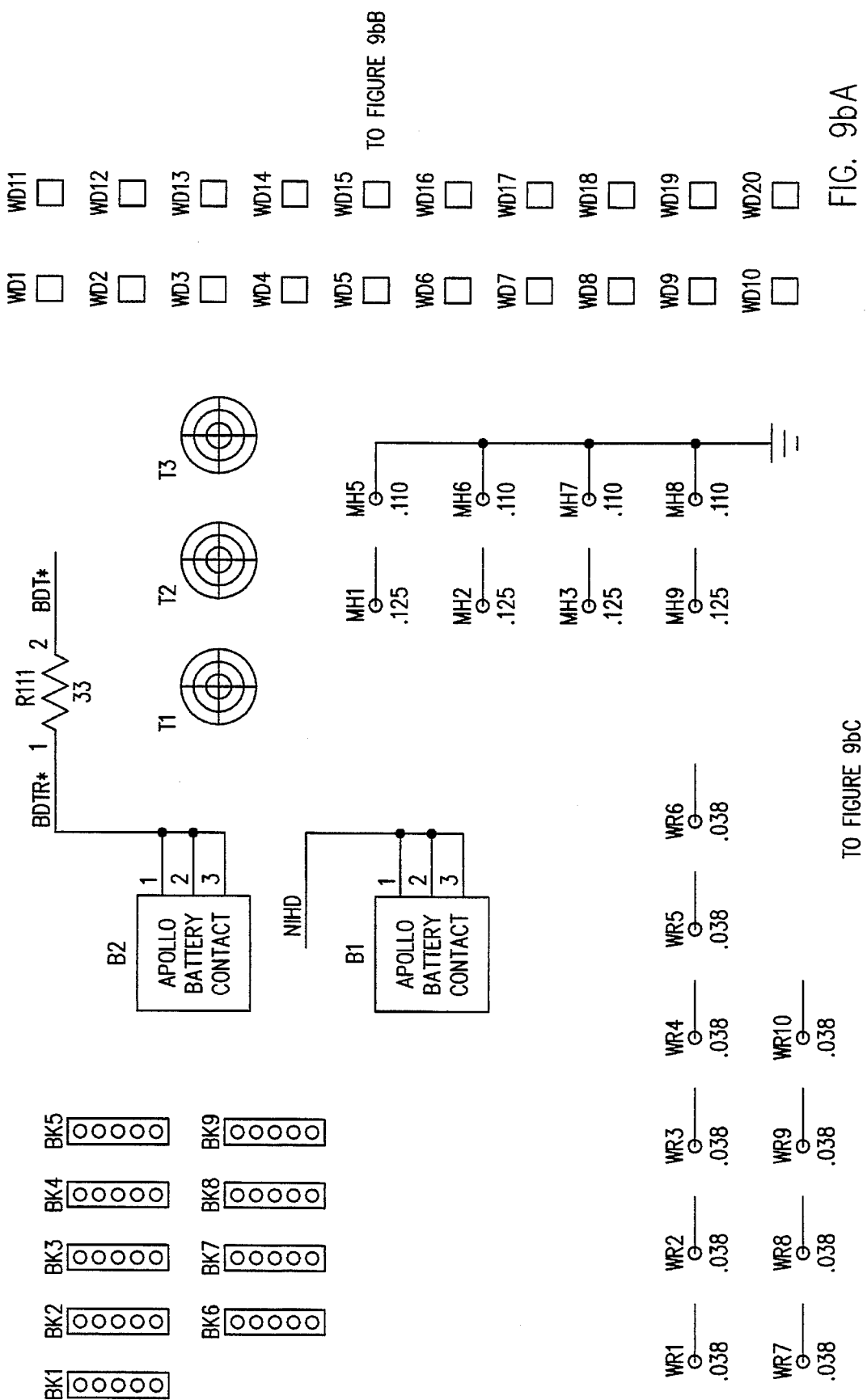
Figure 9B:
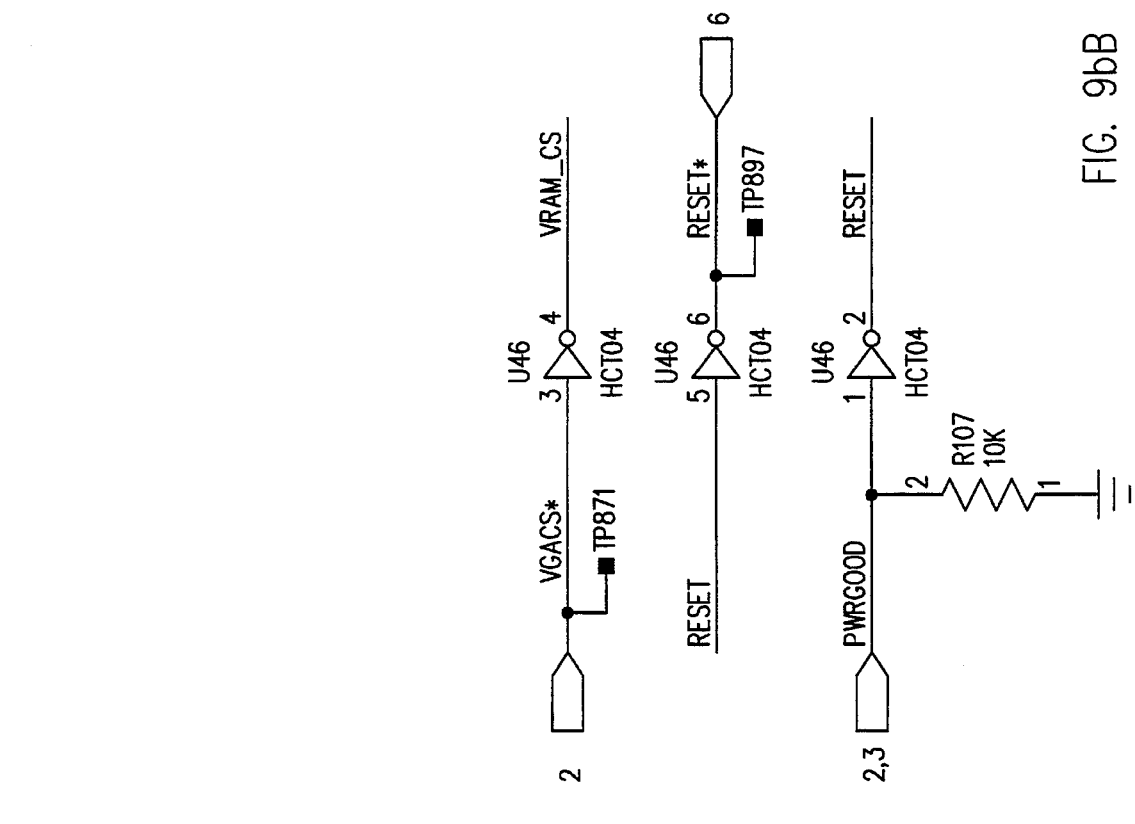
Figure 9B:
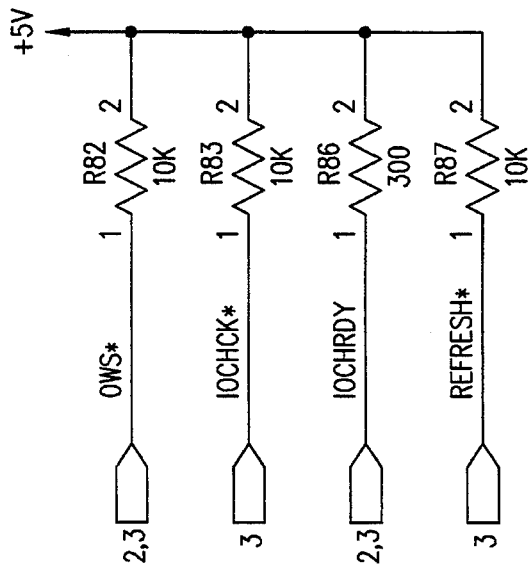
Figure 9B:
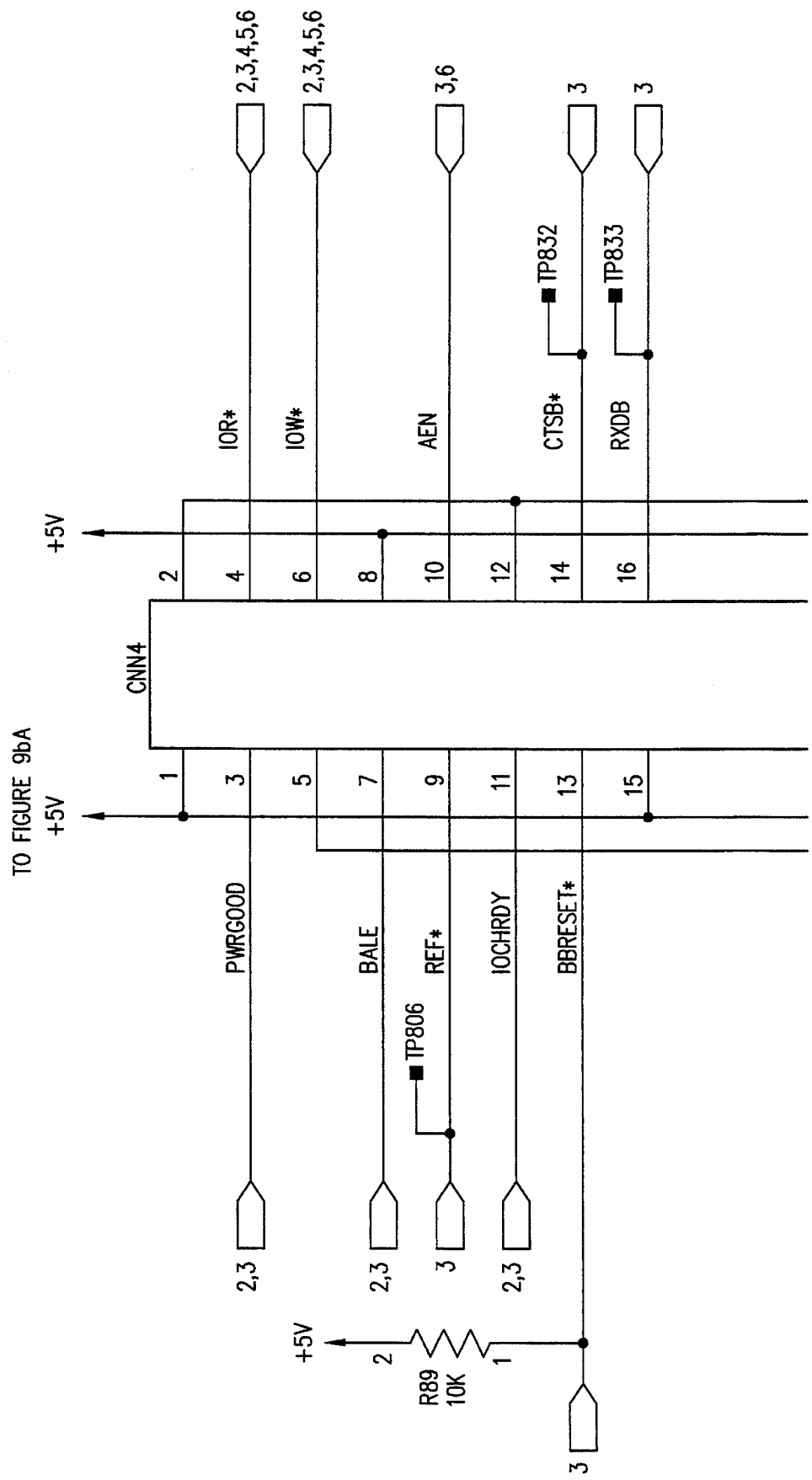
Figure 9B:
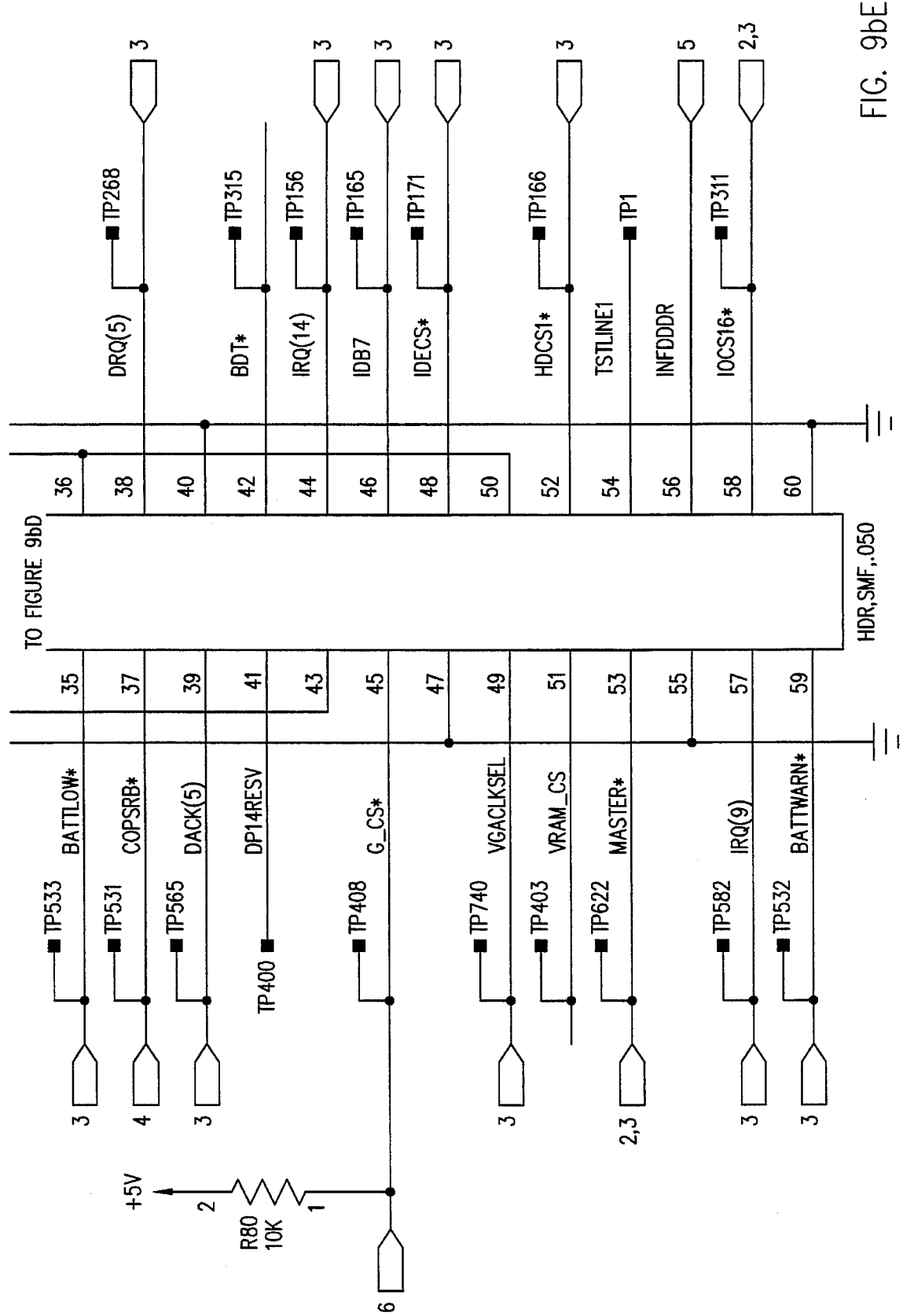
Figure 10A:
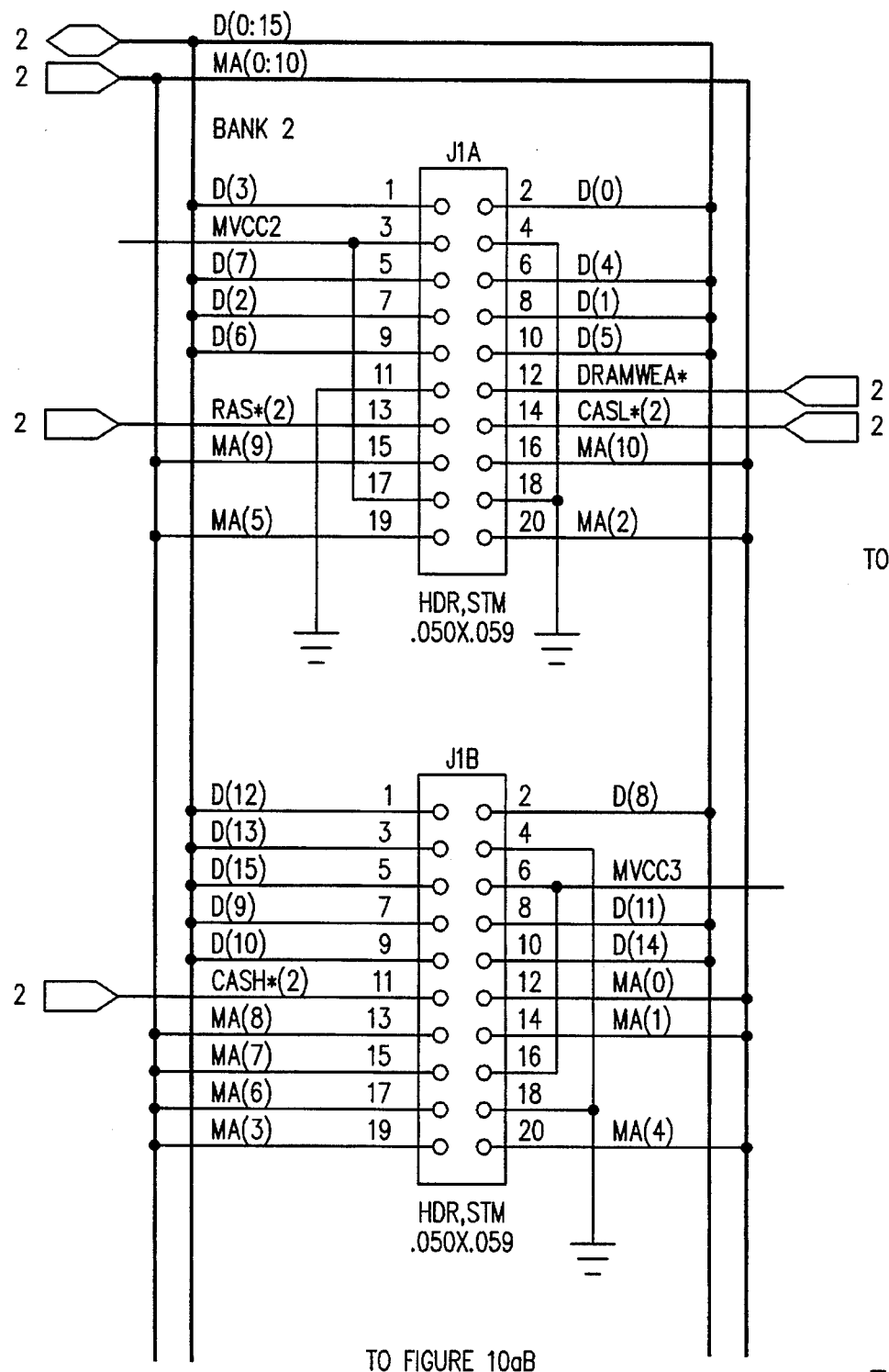
Figure 10A:
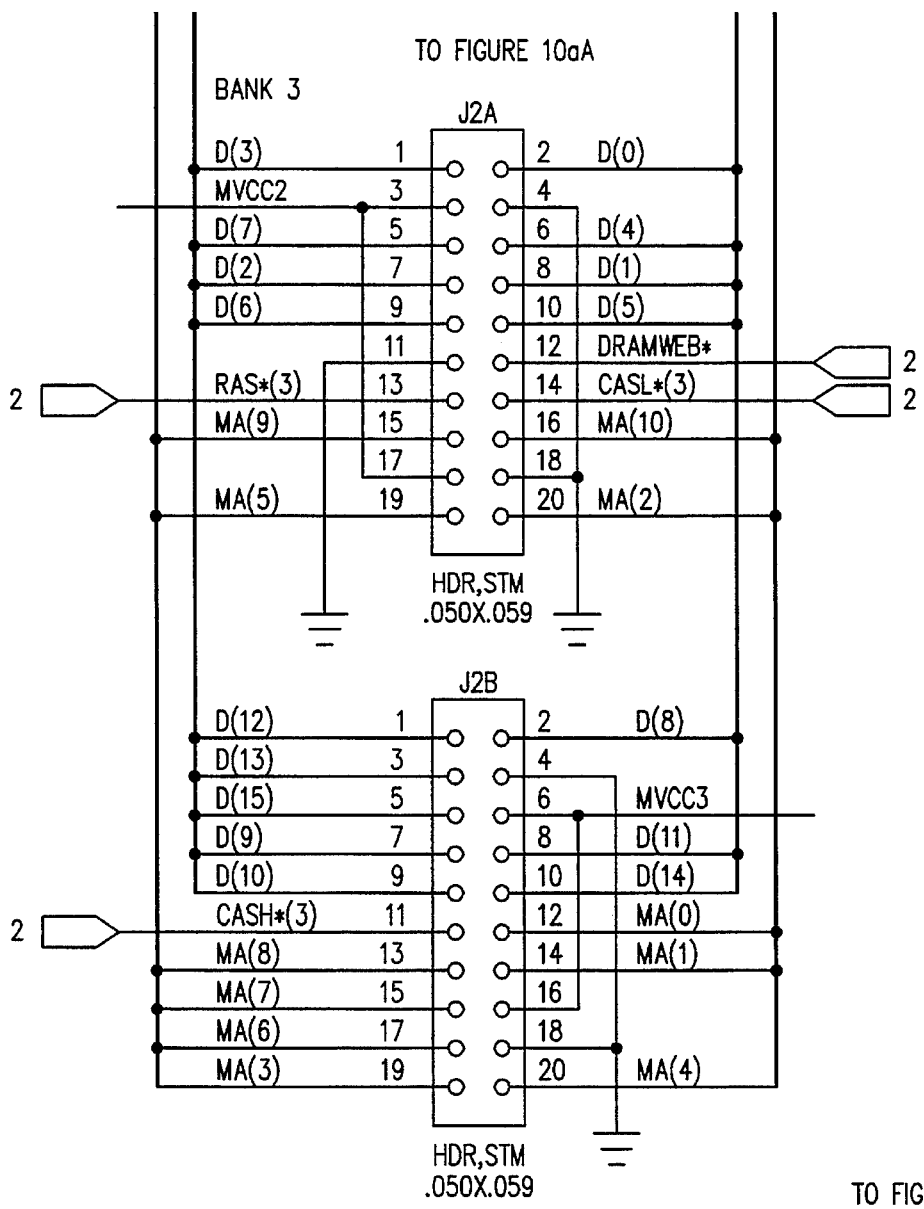
Figure 10A:
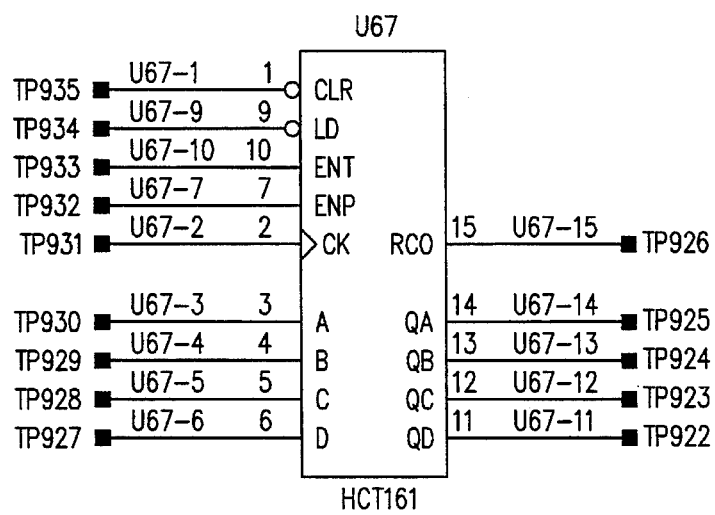
Figure 10A:
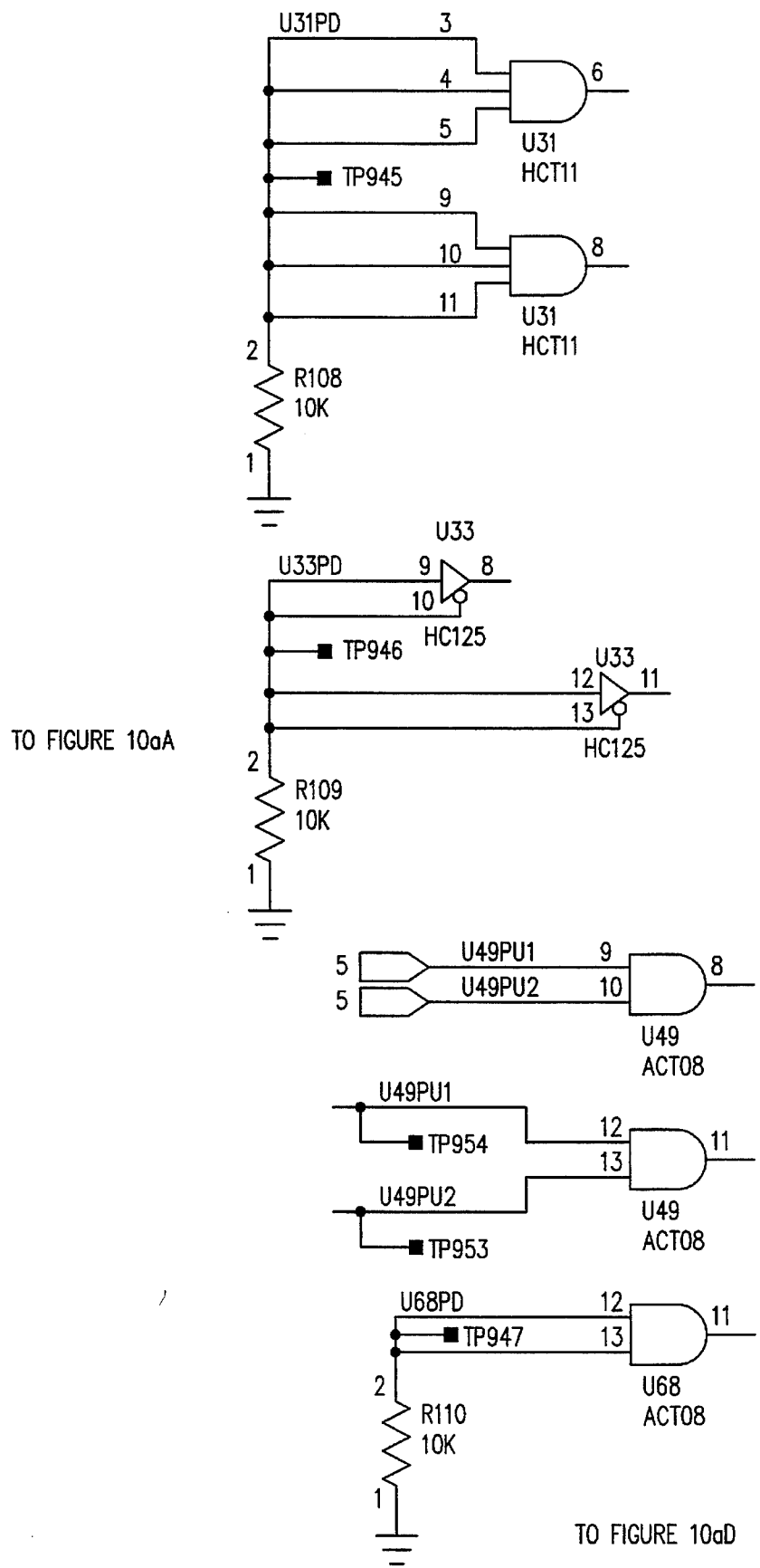
Figure 10A:
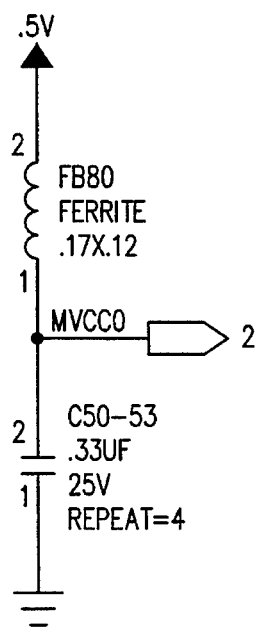
Figure 10A:
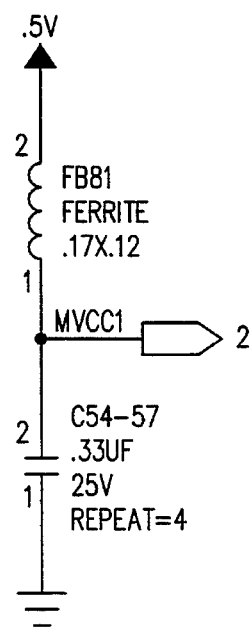
Figure 10A:
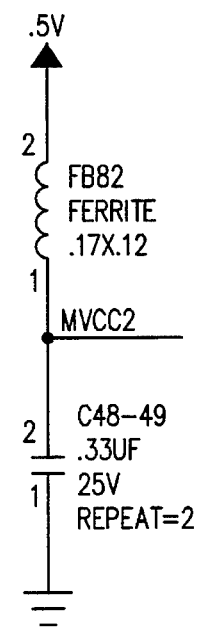
Figure 10B:
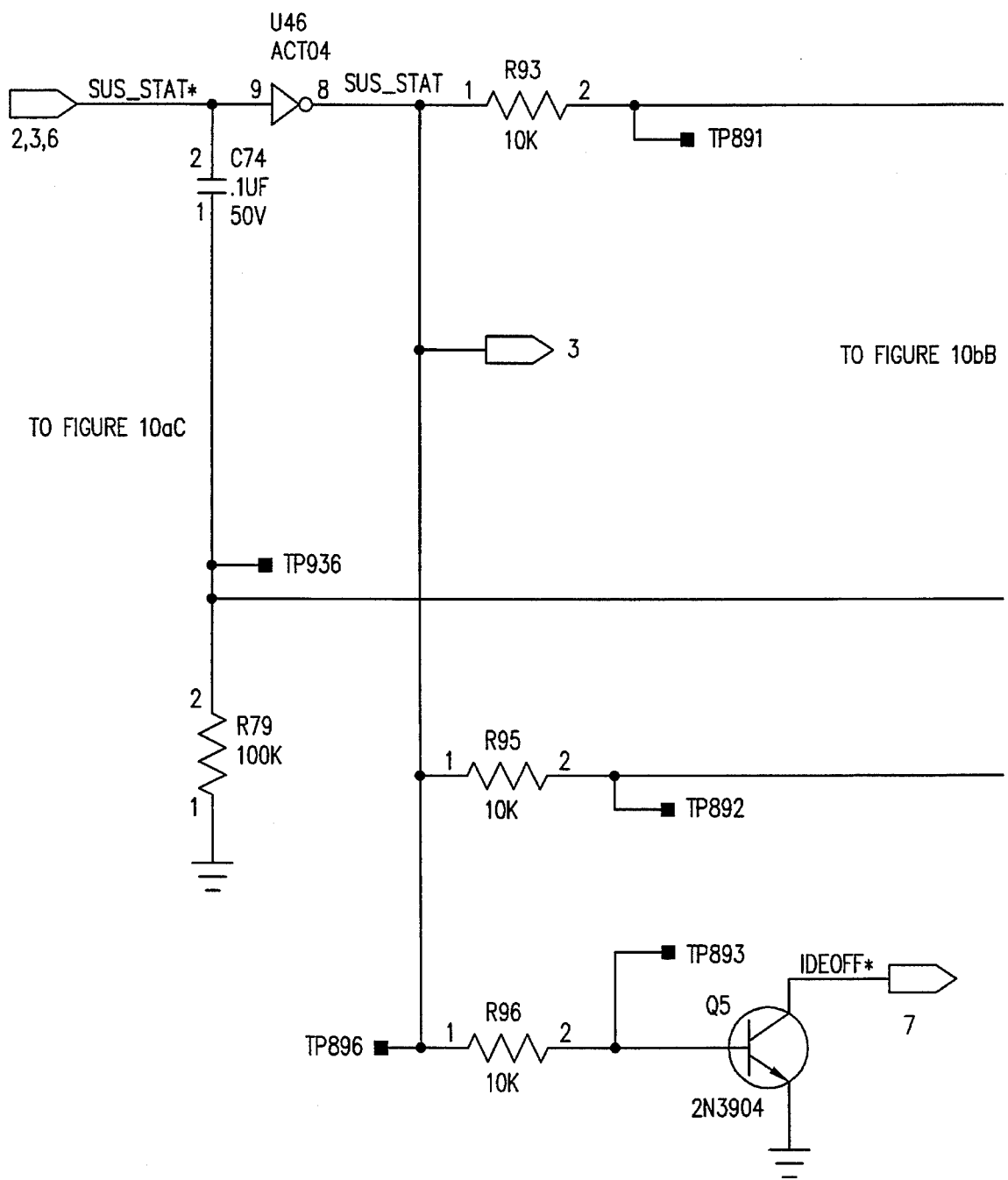
Figure 10B:
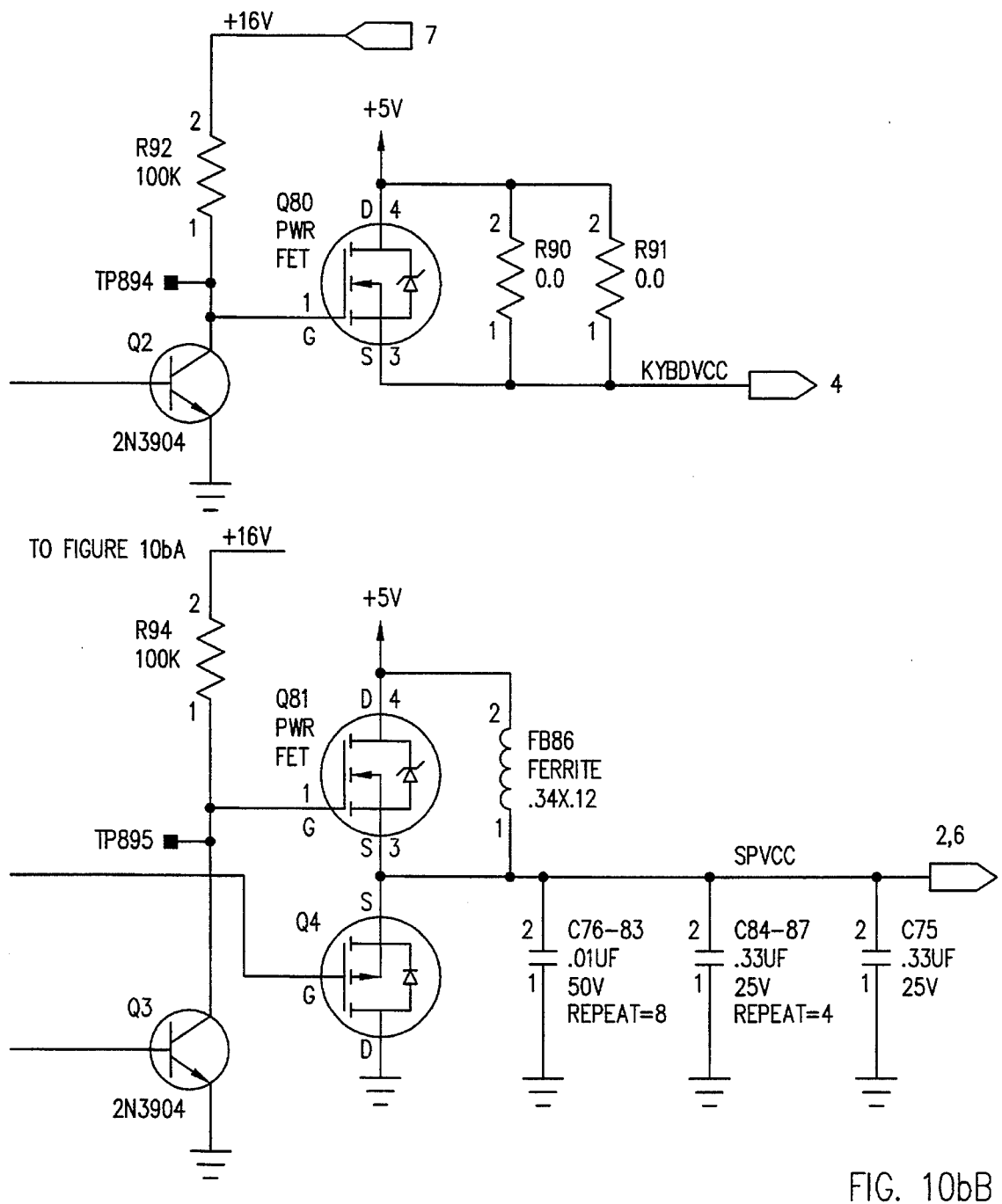
Figure 10B:
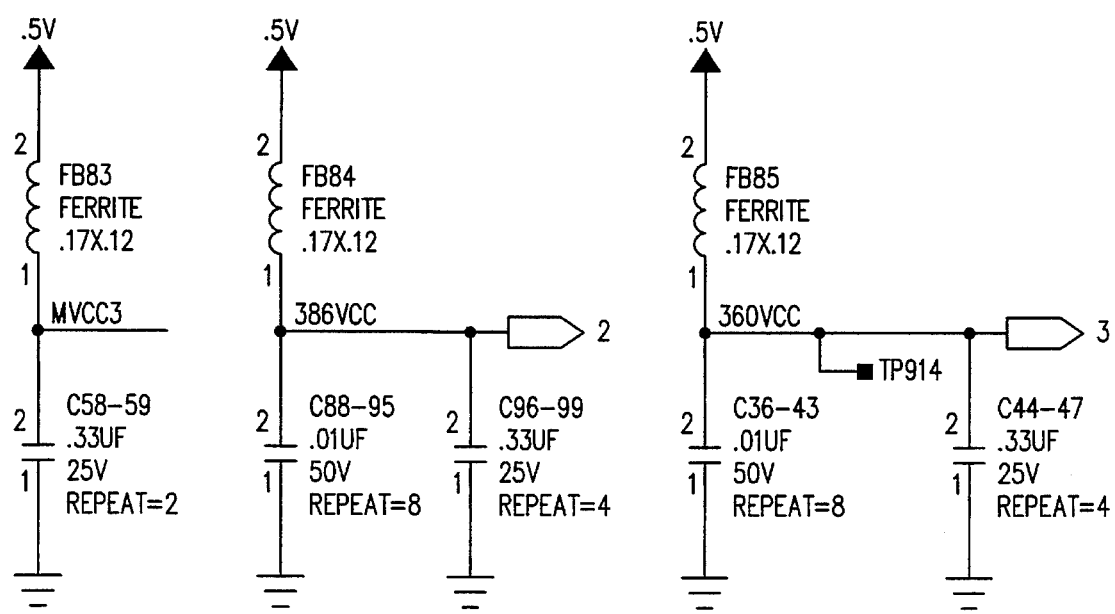

FIGS. 3a–b (which fit together to form one schematic diagram) indicate the functional portions of chips 202 and 206 and a slightly different selection of other items but does not include the items of FIG. 2 which are located on the bottom board (within broken line in the center of FIG. 2), and FIGS. 4a–10b illustrate the wiring in more detail. In particular, 80386SL chip 202 appears in FIG. 4b along with the cache 203A, DRAM memory 203, and math coprocessor 209 in FIG. 4a. 82360SL chip 206 appears in FIG. 5b along with EPROM 201 in FIG. 5a. Keyboard controller 210 is in FIG. 6a with the external keyboard connector and mouse connector in the lower righthand portion of FIG. 6b. Clock generator 204 appears in FIG. 8a.

The external clock is divided down to provide the CPU clock, any math coprocessor clock, and internal clock signals. The maximum CPU clock frequency is one half the EFI (external frequency input), but EFI may be further divided to generate the CPU clock: the contents of the CPUPWR-MODE register within 386SX core may provide further division by 2, 4, or 8 (or even stopping the CPU clock). The CPU clock frequency sets the machine cycle time, and thus basically the CPU clock frequency determines the number of transistor switchings per second. The power consumed by 80386SL 202, memory 203, 82360SL 206, . . . occurs primarily during transistor switchings; that is, the typical CMOS devices making up the circuitry have virtually zero static power consumption. Of course, power consumed by items such as display screen backlighting, DRAM refresh, and the real time clock will be independent of the machine cycle time; however, the bulk of the circuitry, which represents about half of the power in a backlit-screen system, will consume power roughly in proportion to the CPU clock frequency. System 100 also has APM advanced power management compatible BIOS.

Software Implementation Details

Following is a sample specific implementation of software portions of the disclosed innovations. This example is intended to better illustrate the disclosed generally applicable innovations, and to comply with the best-mode requirements of US patent law; but of course this specific implementation is subject to change (and will certainly be changed as time goes by), and can be altered, as will be apparent to those skilled in the art, in many details.

The code portions set forth below provide the most relevant portions of the code used, but of course these code portions are used in combination with large additional portions of code. In the presently preferred embodiment, the software structure given below is used in combination with Phoenix™ BIOS code; but several vendors (such as AMI) offer BIOS software, and the disclosed code can be used with another vendor's BIOS code if desired. (Of course, minor adjustments would have to be made to the called routine names, etc.)

large additional portions of code. In the presently preferred embodiment, the software structure given below is used in combination with Phoenix™ BIOS code; but several vendors (such as AMI) offer BIOS software, and the disclosed code can be used with another vendor's BIOS code if desired. (Of course, minor adjustments would have to be made to the called routine names, etc.)

```
;*********************************************
;
; KEYBOARD MOUSE IMPLEMENTATION
;
;*********************************************

;*********************************************
;
; SET UP MOUSE BYTE IF Fn plus appropriate key
;
;********************************************* kt1_proc1:
        mov     a,r3                    ;Silent Fn Test
        jb      acc.fn_silent_bit,befun
        mov     bMOUSE,#0               ;clear mouse byte
        jmp     not_fn                  ;jump if Fn state off befun:
;*********************************************
        call    check_mickey
        jc      jdone
        jmp     check_kbdsmi
jdone:
        jmp     done
;*********************************************
check_mickey:
        mov     a,bGHOST_CMD_NUM
        jnb     acc.bitEXT_MOUSE,int_mouse
        clr     c
        jmp     exit_mouse
int_mouse:
        mov     a,bMOUSE
```

```
            cjne    r1,#UP_ARROW,notmup
            setb    acc.5
            cjne    r2,#1,mup     ;jump if a make contact
            clr     acc.0
 5          jmp     notmup
        mup:
            setb    acc.0
        notmup:
            cjne    r1,#DOWN_ARROW,notmdown
10          setb    acc.5
            cjne    r2,#1,mdown ;jump if a make contact
            clr     acc.1
            jmp     notmdown
        mdown:
15          setb    acc.1
        notmdown:
            cjne    r1,#RIGHT_ARROW,notmright
            setb    acc.5
            cjne    r2,#1,mright       ;jump if a make contact
20          clr     acc.2
            jmp     notmright
        mright:
            setb    acc.2
        notmright:
25          cjne    r1,#LEFT_ARROW,notmleft
            setb    acc.5
            cjne    r2,#1,mleft ;jump if a make contact
            clr     acc.3
            jmp     notmleft
30      mleft:
            setb    acc.3
        notmleft:
            cjne    r1,#LEFT_BUTTON,notmlbut
            cjne    r2,#1,mlbut ;jump if a make contact
35          jnb     acc.6,notmlbut
            setb    acc.5
            clr     acc.6
            jmp     notmlbut
        mlbut:
40          jb      acc.6,notmlbut
            setb    acc.5
```

```
                setb    acc.6
        notmlbut:
                cjne    r1,#RIGHT_BUTTON,notmrbut
                cjne    r2,#1,mrbut ;jump if a make contact
                jnb     acc.7,notmrbut
                setb    acc.5
                clr     acc.7
                jmp     notmrbut
        mrbut:
                jb      acc.7,notmrbut
                setb    acc.5
                setb    acc.7
        notmrbut:
                cjne    r1,#SLOW_MOUSE,notmfast
                setb    acc.5
                cjne    r2,#1,mfast ;jump if a make contact
                clr     acc.4
                jmp     notmfast
        mfast:
                setb    acc.4
        notmfast:
                clr     c
                jnb     acc.5,exit_mouse  ;exit if no change
                clr     acc.5
        move_mouse:
                mov     bMOUSE,a
                %SET_MASK(bSERVICE,maskGHOSTCMD)   ;move that mouse!
                setb    c
        exit_mouse:
                ret ;*****************************************
;
; MOVE MOUSE ROUTINE - TO BE ADDED AS A TASK IN MAIN LOOP
;
;*****************************************

BUMP_MOUSE:
                %LOCK_SCAN
                clr     %bitIRQ_PCI              ; disable commands from PC
```

```
            mov     b,bMOUSE
            mov     a,#008h
            jnb     b.bitMOUSE_LEFT_BUTTON,nolb
            setb    acc.0
    nolb:
            jnb     b.bitMOUSE_RIGHT_BUTTON,norb
            setb    acc.1
    norb:
            jnb     b.bitMOUSE_DOWN,nodn
            setb    acc.5
    nodn:
            jnb     b.bitMOUSE_LEFT,nolf
            setb    acc.4
    nolf:
            call    SENDAUX_DATA            ; SEND TO PC mov     DPTR,#regPC_STAT
            mov     r7,#0                   ; retry counter
    wait4MB0:
            movx    a,@DPTR
            jnb     acc.bitPCS_OBF,mb0done  ; Clear out output buffer
            djnz    r7,wait4MB0
            jmp     mb2done
    mb0done:
            clr     a
            mov     b,bMOUSE
            jnb     b.bitMOUSE_RIGHT,noright
            mov     a,#003h
            jnb     b.bitMOUSE_SLOW,noright
            mov     a,#001h
    noright:
            jnb     b.bitMOUSE_LEFT,noleft
            mov     a,#0fdh
            jnb     b.bitMOUSE_SLOW,noleft
            mov     a,#0ffh
    noleft:
            call    SENDAUX_DATA            ; Send to PC mov     DPTR,#regPC_STAT
            mov     r7,#0
    wait4MB1:
```

```
                movx    a,@DPTR
                jnb     acc.bitPCS_OBF,mb1done    ; Clear out output buffer
                djnz    r7,wait4MB1
                jmp     mb2done
 5      mb1done:
                clr     a
                mov     b,bMOUSE
                jnb     b.bitMOUSE_UP,noup
                mov     a,#003h
10              jnb     b.bitMOUSE_SLOW,noup
                mov     a,#001h
        noup:
                jnb     b.bitMOUSE_DOWN,nodown
                mov     a,#0fdh
15              jnb     b.bitMOUSE_SLOW,nodown
                mov     a,#0ffh
        nodown:
                call    SENDAUX_DATA              ; Handle as normal mouse mov     DPTR,#regPC_STAT
20              mov     r7,#0
        wait4MB2:
                movx    a,@DPTR
                jnb     acc.bitPCS_OBF,mb2done    ; Clear out output buffer
                djnz    r7,wait4MB2
25      mb2done:

setb    %bitIRQ_PCI               ; enable commands from PC mov     DPTR,#regPC_STAT
                movx    a,@DPTR
                clr     acc.bitPCS_OBF            ; Clear out output buffer
30              movx    @DPTR,a

%UNLOCK_SCAN jmp     main_service
```

Further Modifications and Variations

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

Some innovative features of the preferred embodiment can be applied to non-portable computers. While such embodiments are less preferred, they may still provide some advantages derived from the disclosed innovative teachings.

For example, sequential logic can be used to trigger the pointing mode from other keystroke combinations which do not include the [Fn] key. This is less preferable, but could be used to attain some of the advantages of the claimed invention.

For another example, the pointing mode does not have to strictly emulate a target pointing device: other functions can be added, e.g. rapid change in the speed of cursor movement.

It should also be recognized that the inventions described are applicable to other architectures as well as to the particular style of architecture described. For example, an architecture does not have to be interrupt-driven to make use of the disclosed innovative ideas: these ideas can also be applied in architectures where a polled keyboard interface is used instead of the keyboard interrupt of the presently preferred embodiment. For another example, the disclosed inventions are not only applicable to uniprocessor architectures, but can also be applied to multiprocessor systems.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A computer system comprising:

at least one central processing unit (CPU) having a plurality of inputs, said CPU being configured to recognize a first combination of input signals as a keystroke interrupt and to recognize a second combination of input signals as a pointing-device interrupt;

a keyboard, having an array of binary keys including a special function key and a plurality of pointer keys; and processor means, operatively connecting said keyboard to said CPU, to detect keystrokes of said keyboard and to drive said inputs of said CPU, said processor means enabling said keyboard to operate in a keyboard mode and in a pointing-device mode in which said pointer keys are used to enter pointing information, said keyboard normally operating in said keyboard mode and being actuated to said pointing-device mode responsive to actuation of said special function key, said processor means being configured and programmed such that in response to actuation of any key or combination of keys thereof while said keyboard is in said keyboard mode, said processor means drives said first combination of input signals to said CPU, and in response to actuation of one or more of said binary keys or one or more pointer keys while said keyboard is in said pointing-device mode, said processor means drives said second combination of input signals to said CPU, wherein said one or more of said binary keys emulates one or more buttons of a pointing device and said pointing keys emulate directional movement of a pointing device.

2. The system of claim 1, wherein no joystick, mouse, or trackball is attached to said system.

3. The system of claim 1, wherein said system does not include any pointing device other than said keys of said keyboard.

4. The system of claim 1, wherein said system further includes a pointing device input connector which is operatively connected to provide input signals to said processor means, and wherein said processor means provides said second combination of input signals to said CPU in response to any input signals which may be received from a pointing device through said pointing device input connector.

5. The system of claim 1, wherein said keyboard is configured such that all of said binary keys are readily accessible from a standard touch-typing hand position.

6. The system of claim 1, wherein after a predetermined first sequence of keystrokes has occurred and until a predetermined second sequence of keystrokes has occurred, said processor means drives said second combination of input signals to said CPU, in response to actuation of one or more pointer keys without simultaneous actuation of said special function key.

7. The system of claim 1, wherein said plurality of pointer keys of said keyboard include at least four arrow keys.

8. The system of claim 1, further comprising nonvolatile memory which is connected to an address which is called by said CPU whenever said CPU emerges from reset, said nonvolatile memory containing bootstrap software and also containing basic system software which causes said CPU to recognize said first combination of signal inputs as a keystroke interrupt and to recognize said second combination of signal inputs as a pointing-device interrupt.

9. A computer system with an integrated typing and pointing capability, comprising:

at least one central processing unit (CPU) having a plurality of inputs, said CPU being configured to recognize a first combination of input signals as a keystroke input and to recognize a second combination of input signals as a pointing-device input;

a keyboard, having an array of binary keys including a special function key and a plurality of pointer keys, said keyboard normally operating in a keyboard mode and operating in a pointing-device mode responsive to actuation of said special function key; and processor means, operatively connecting said keyboard to said CPU, to detect keystrokes on said keyboard and to drive said inputs of said CPU, said processor means being configured and programmed such that in response to actuation of any key or combination of keys thereof while said keyboard is in said keyboard mode, said processor means drives said first combination of input signals to said CPU, and in response to actuation of one or more of said binary keys or at least one of said pointer keys while said keyboard is in said pointing-device mode, said processor means drives said second combination of input signals to said CPU, wherein said one or more of said binary keys emulates a button of a pointing device and said pointing keys emulate directional movement of a pointing device.

10. The system of claim 9, wherein no joystick, mouse, or trackball is attached to said system.

11. The system of claim 9, wherein said system does not include any pointing device other than said keys of said keyboard.

12. The system of claim 9, wherein said system further includes a pointing device input connector which is operatively connected to provide input signals to said processor means, and wherein said processor means provides said second combination of input signals to said CPU in response to any signals which may be received from a pointing device through said pointing device input connector.

13. The system of claim 9, wherein said keyboard is configured such that all of said binary keys are readily accessible from a standard touch-typing hand position.

14. The system of claim 9, wherein after a predetermined first set of keystroke inputs has occurred and until a predetermined second set of keystroke inputs has occurred, said processor means drives said second combination of signal input lines, in response to actuation of one or more of said pointer keys without simultaneous actuation of said special function key.

15. The system of claim 9, wherein said plurality of pointer keys of said keyboard include at least four arrow keys.

16. A method of operating a computer system comprising a central processing unit (CPU) having a plurality of inputs and configured to recognize a first combination of input signals as a keyboard interrupt and a second combination of input signals as a pointing-device interrupt, a keyboard having an array of binary keys including a special function key and a plurality of pointer keys, and a processor coupled between said CPU and said keyboard for detecting keystrokes on said keyboard and driving said inputs of said CPU, the method comprising the steps of:

detecting keystrokes on said keyboard;

responsive to actuation of said special function key, causing said keyboard to operate in a pointing device mode in which pointing information may be entered;

otherwise causing said keyboard to operate in a keyboard mode;

responsive to actuation of any of said binary keys while said keyboard is operating in said keyboard mode, driving said first combination of input signals to said CPU; and responsive to actuation of said binary keys while said keyboard is operating in said pointing-device mode, driving said second combination of signals to said CPU, wherein said second combination of signals emulates a button of a pointing device and directional movement of a pointing device.

17. The method of claim 16 further comprising the steps of, responsive to a first predetermined sequence of keystrokes being entered via said keyboard, driving said second combination of input signals to said CPU until a second predetermined sequence of keystroke is entered via said keyboard.

18. A computer system, comprising:

a central processing unit (CPU) configured to recognize a plurality of input types, including keyboard input and pointing-device input;

a keyboard having an array of binary keys including a plurality of pointing keys, said keyboard operating in keyboard mode or pointing-device mode; and a processor operatively connecting said keyboard to said CPU, whereby if said keyboard is operating in said keyboard mode, said processor drives keyboard input signals to said CPU, and if said keyboard is operating in said pointing-device mode, said processor drives pointing-device input signals to said CPU, whereby when said keyboard is in pointing-device mode, at least one of said binary keys emulates a button of a pointing device and a plurality of said pointing keys emulate directional movement of a pointing device.

19. The system of claim 18, wherein said keyboard includes a special function key, said keyboard operating in pointing-device mode after actuation of said special function key and one or more of said pointer keys.

20. The system of claim 18, wherein after actuation of a first sequence of keystrokes said keyboard operates in said pointing-device mode until actuation of a second sequence of keystrokes.

* * * * *